(12) United States Patent
Lee et al.

(10) Patent No.: US 10,902,390 B2
(45) Date of Patent: Jan. 26, 2021

(54) ELECTRONIC DEVICE AND PAYMENT METHOD USING THE SAME

(71) Applicant: Samsung Electronics Co., Ltd., Suwon-si (KR)

(72) Inventors: Woosup Lee, Suwon-si (KR); Eric Huang, Andover, MA (US); George Wallner, Miami Beach, FL (US); Kyeongjo Keum, Suwon-si (KR); Younju Kim, Suwon-si (KR); Hyunju Hong, Osan-si (KR); Jungsik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/577,397

(22) Filed: Sep. 20, 2019

(65) Prior Publication Data

US 2020/0019942 A1  Jan. 16, 2020

Related U.S. Application Data

(63) Continuation of application No. 15/209,263, filed on Jul. 13, 2016, now Pat. No. 10,423,942.

(30) Foreign Application Priority Data

Jul. 14, 2015 (KR) .................. 10-2015-0100122
Nov. 18, 2015 (KR) .................. 10-2015-0162158

(51) Int. Cl.
*H01Q 1/24* (2006.01)
*H01Q 7/00* (2006.01)
(Continued)

(52) U.S. Cl.
CPC ..... *G06Q 20/102* (2013.01); *G06K 19/07773* (2013.01); *G06Q 20/327* (2013.01);
(Continued)

(58) Field of Classification Search
CPC ...... H04B 5/00; H04B 5/0025; H04B 5/0031; H04B 5/0056; H04B 5/0081;
(Continued)

(56) References Cited

U.S. PATENT DOCUMENTS 8,313,037 B1    11/2012 Humphrey
8,467,742 B2    6/2013  Hachisuka et al.
(Continued)

FOREIGN PATENT DOCUMENTS

CN    102160061 A    8/2011
CN    103904411 A    7/2014
(Continued)

OTHER PUBLICATIONS

Chinese Office Action dated Oct. 23, 2018, issued in Chinese Patent Application No. 201711159064.6.

*Primary Examiner* — Blane J Jackson
(74) *Attorney, Agent, or Firm* — Jefferson IP Law, LLP

(57) ABSTRACT

An electronic device capable of communicating with a card reading apparatus and a payment method are provided. The electronic device includes a first cover configuring a front side of the electronic device, a second cover configuring a back side of the electronic device, a memory contained in a hollow area formed between the first and second covers, a display, at least part of which is contained in the hollow area and which is disclosed through the first cover, a processor that is contained in the hollow area and is electrically connected to the memory, and at least one loop antenna which is contained in the hollow area and electrically connected to the processor.

22 Claims, 54 Drawing Sheets

(51) Int. Cl.
*H04B 5/00* (2006.01)
*G06Q 20/32* (2012.01)
*G06Q 20/10* (2012.01)
*G06Q 20/34* (2012.01)
*G06Q 20/40* (2012.01)
*G06K 19/077* (2006.01)

(52) U.S. Cl.
CPC ......... *G06Q 20/3223* (2013.01); *G06Q 20/34* (2013.01); *G06Q 20/3572* (2013.01); *G06Q 20/409* (2013.01); *G06Q 20/40145* (2013.01)

(58) Field of Classification Search
CPC ........ H04B 5/0087; H01Q 1/24; H01Q 1/241; H01Q 1/242; H01Q 5/00; H01Q 7/00; H01Q 9/04; G06Q 20/32
See application file for complete search history.

(56) References Cited

U.S. PATENT DOCUMENTS

| | | |
|---|---|---|
| 8,690,059 B1 | 4/2014 | Wallner |
| 8,814,046 B1 | 8/2014 | Wallner |
| 8,827,153 B1 | 9/2014 | Rhoades et al. |
| 9,761,928 B2 * | 9/2017 | Han .................. H01Q 1/243 |
| 10,269,005 B2 * | 4/2019 | Lee .................. H01Q 1/243 |
| 2009/0159689 A1 | 6/2009 | Mullen et al. |
| 2010/0213265 A1 | 8/2010 | Narendra et al. |
| 2011/0140841 A1 | 6/2011 | Bona et al. |
| 2012/0052800 A1 | 3/2012 | Bona et al. |
| 2014/0144984 A1 | 5/2014 | Olson et al. |
| 2014/0249948 A1 | 9/2014 | Graylin et al. |
| 2014/0269946 A1 | 9/2014 | Wallner |
| 2015/0134537 A1 | 5/2015 | Hammad |
| 2015/0146818 A1 | 5/2015 | Kim et al. |
| 2016/0308587 A1 * | 10/2016 | Lee .................. H04B 5/0081 |
| 2018/0138746 A1 * | 5/2018 | Jang ................. H01Q 1/2225 |
| 2018/0248271 A1 * | 8/2018 | Noh .................. H01Q 1/526 |

FOREIGN PATENT DOCUMENTS

| | | | | |
|---|---|---|---|---|
| KR | 2017050044 A | * | 10/2015 | ............ H01Q 1/22 |
| KR | 101720329 B1 | * | 3/2017 | ............ H01Q 1/22 |
| WO | 2010/022129 A1 | | 2/2010 | |

* cited by examiner

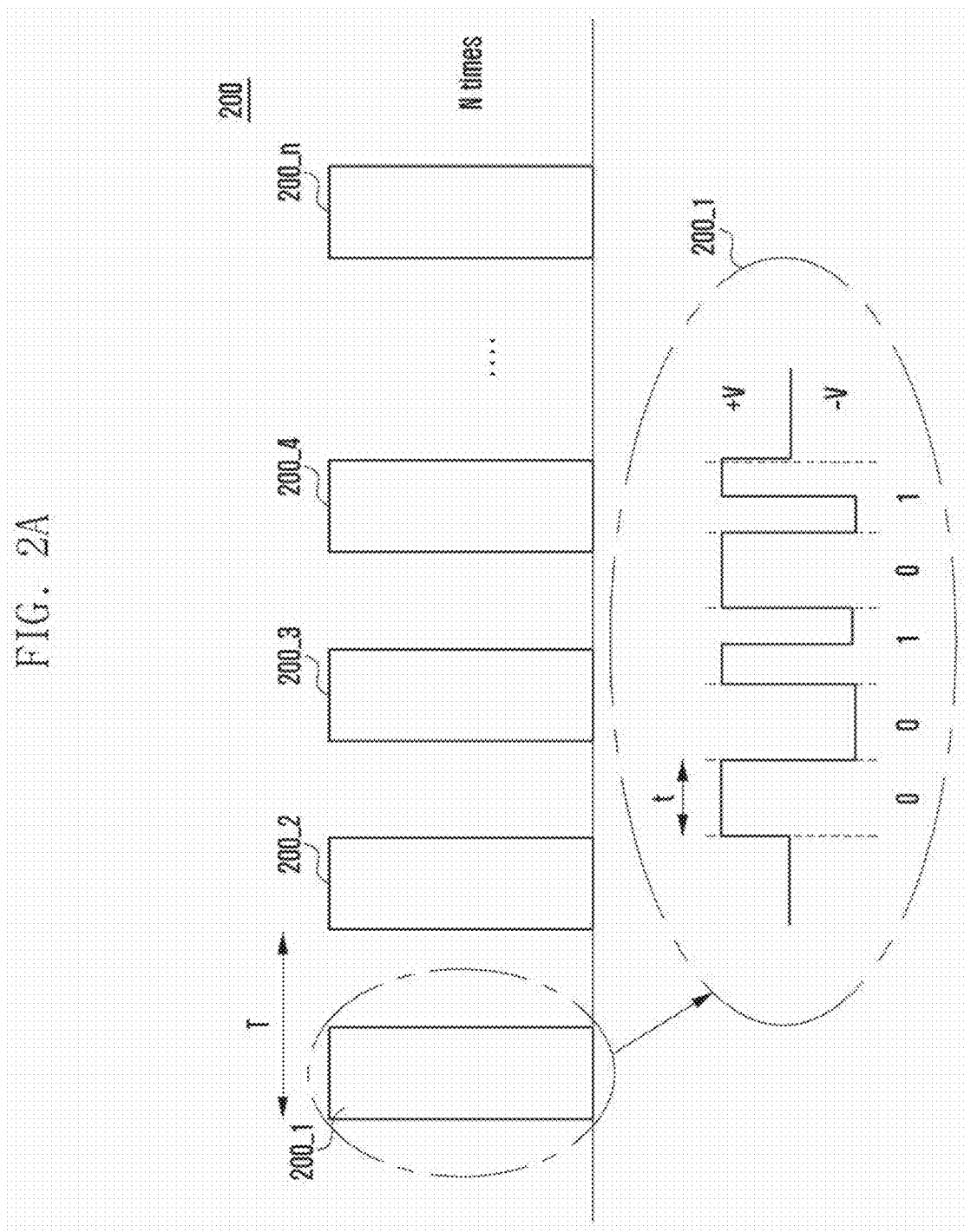

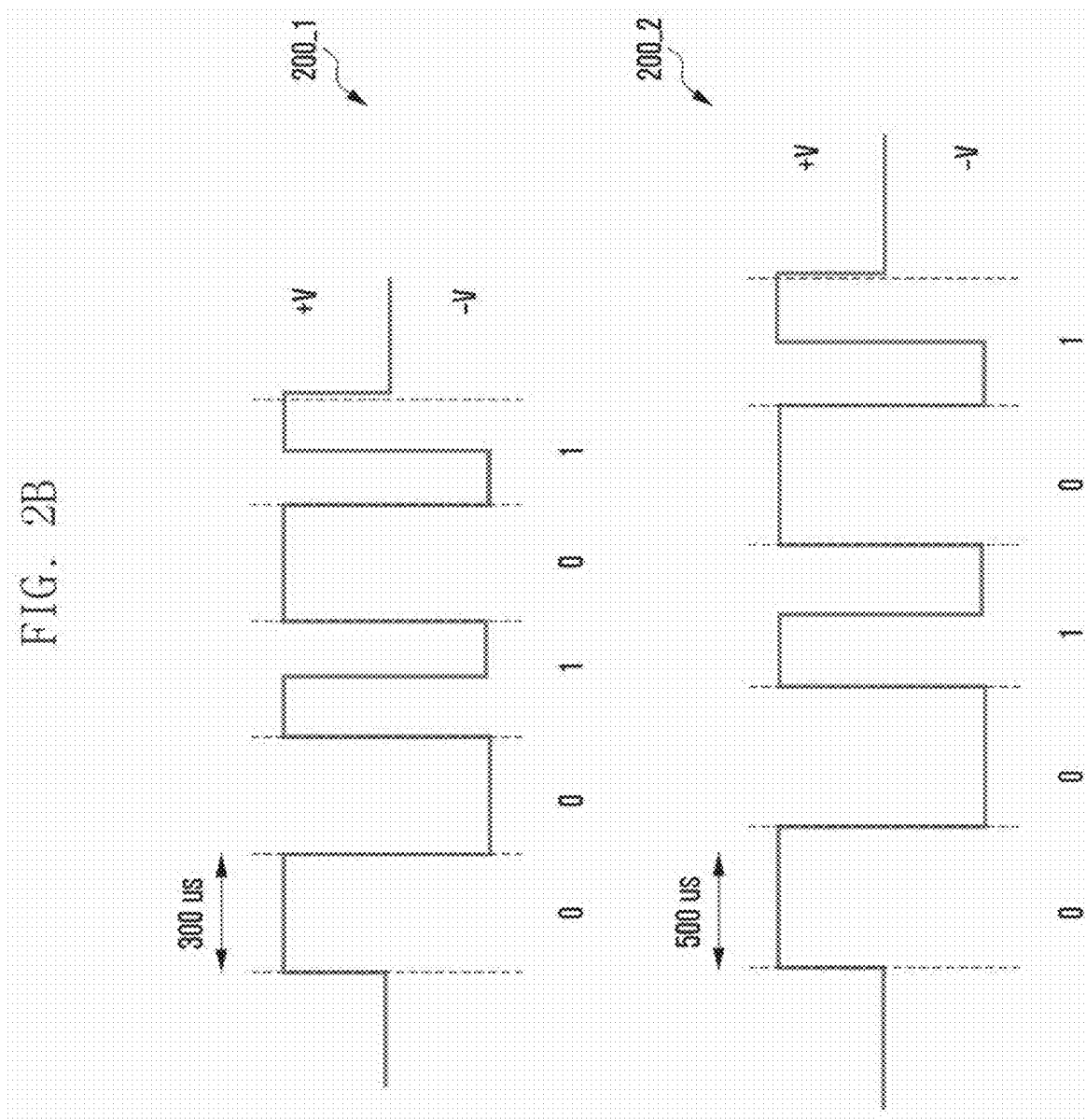

FIG. 3A

%B5178057716182832^HUANG/ENYANG ^13071010100000000000101404080000000?

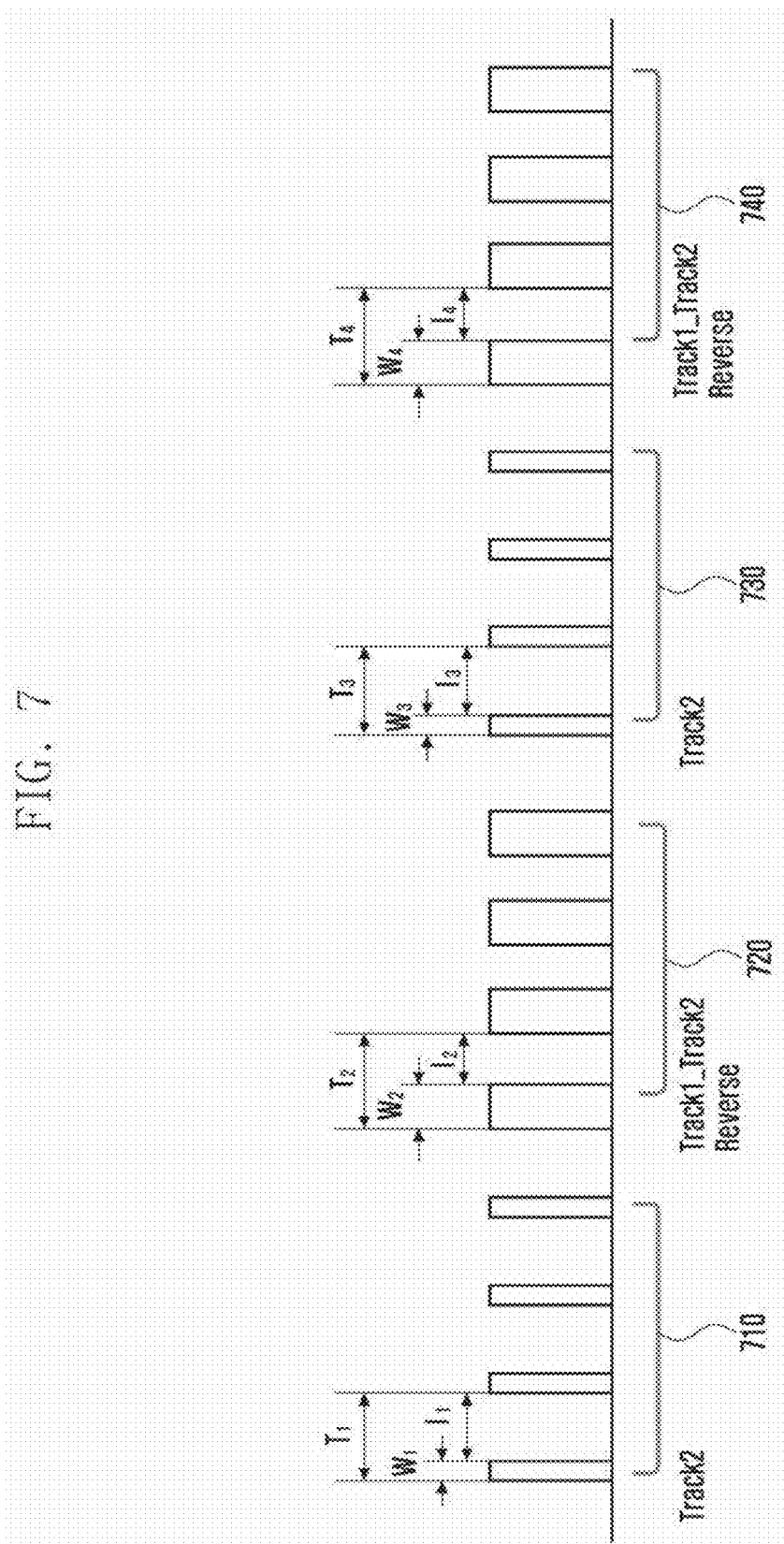

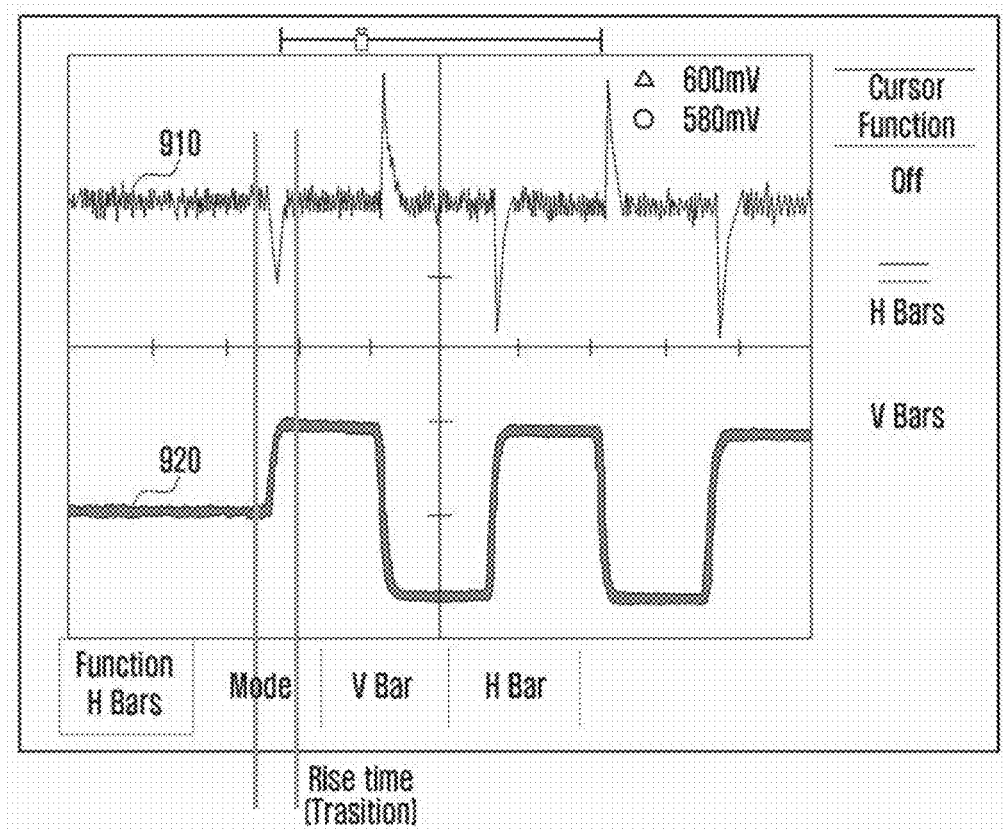

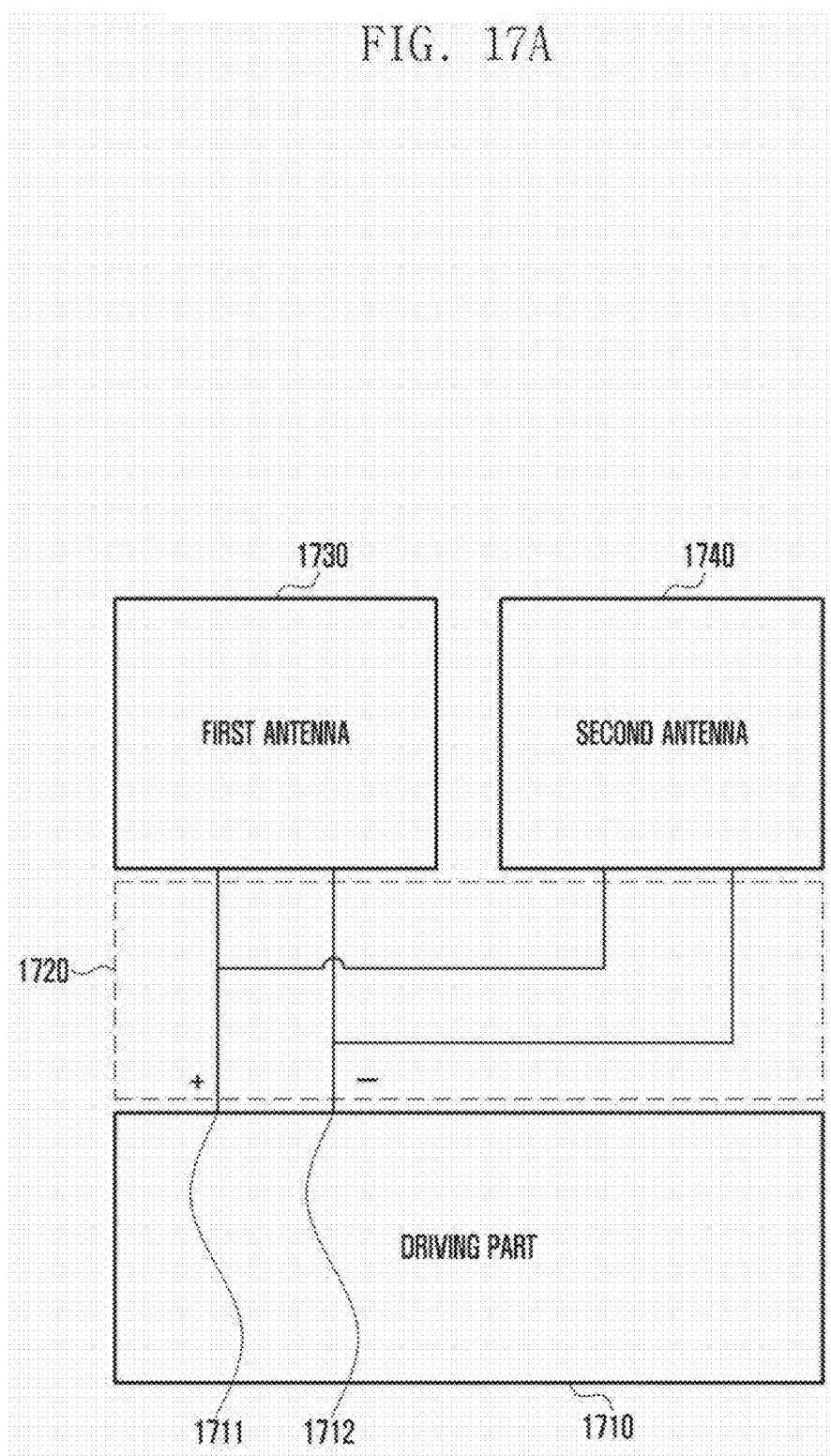

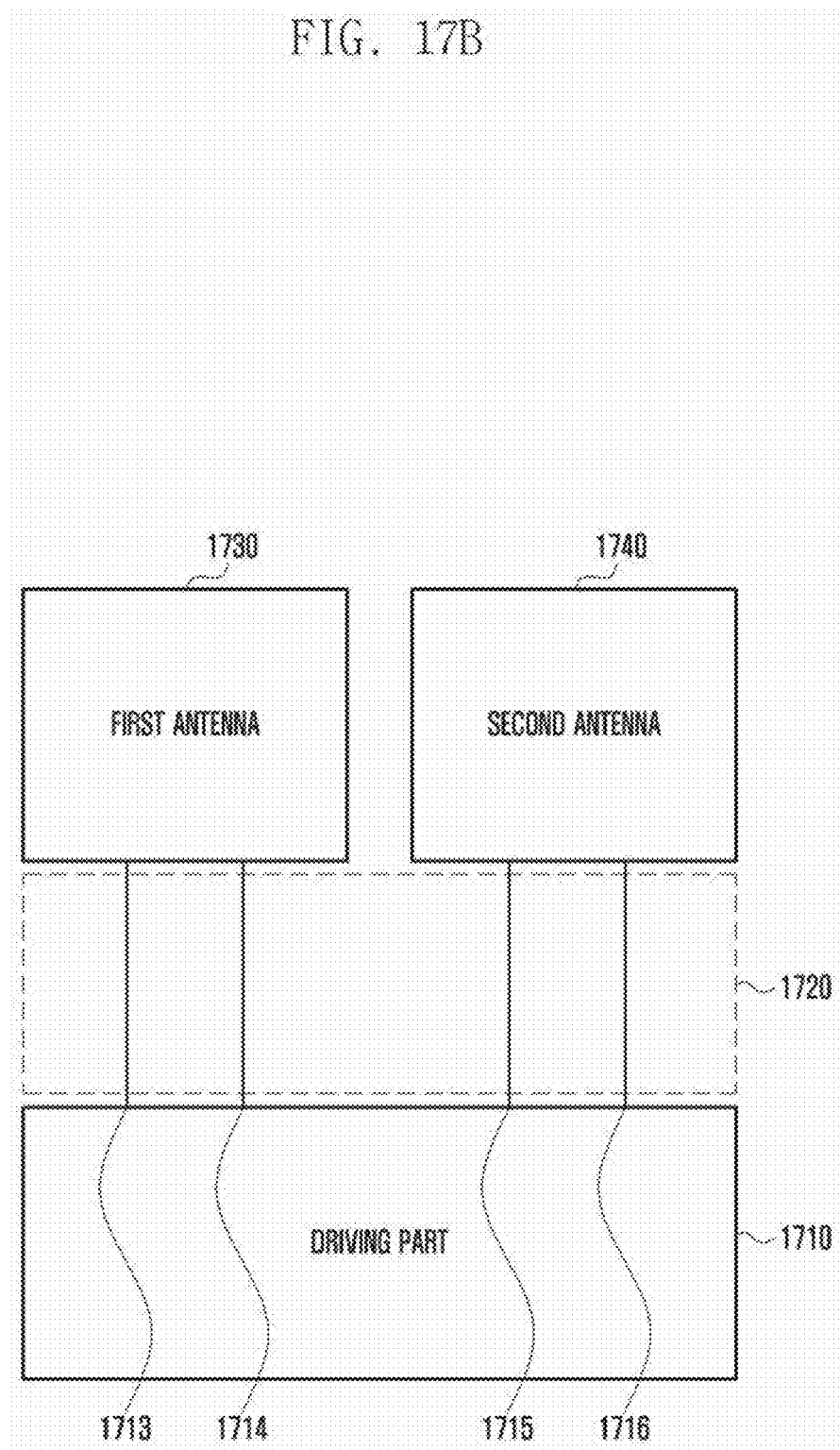

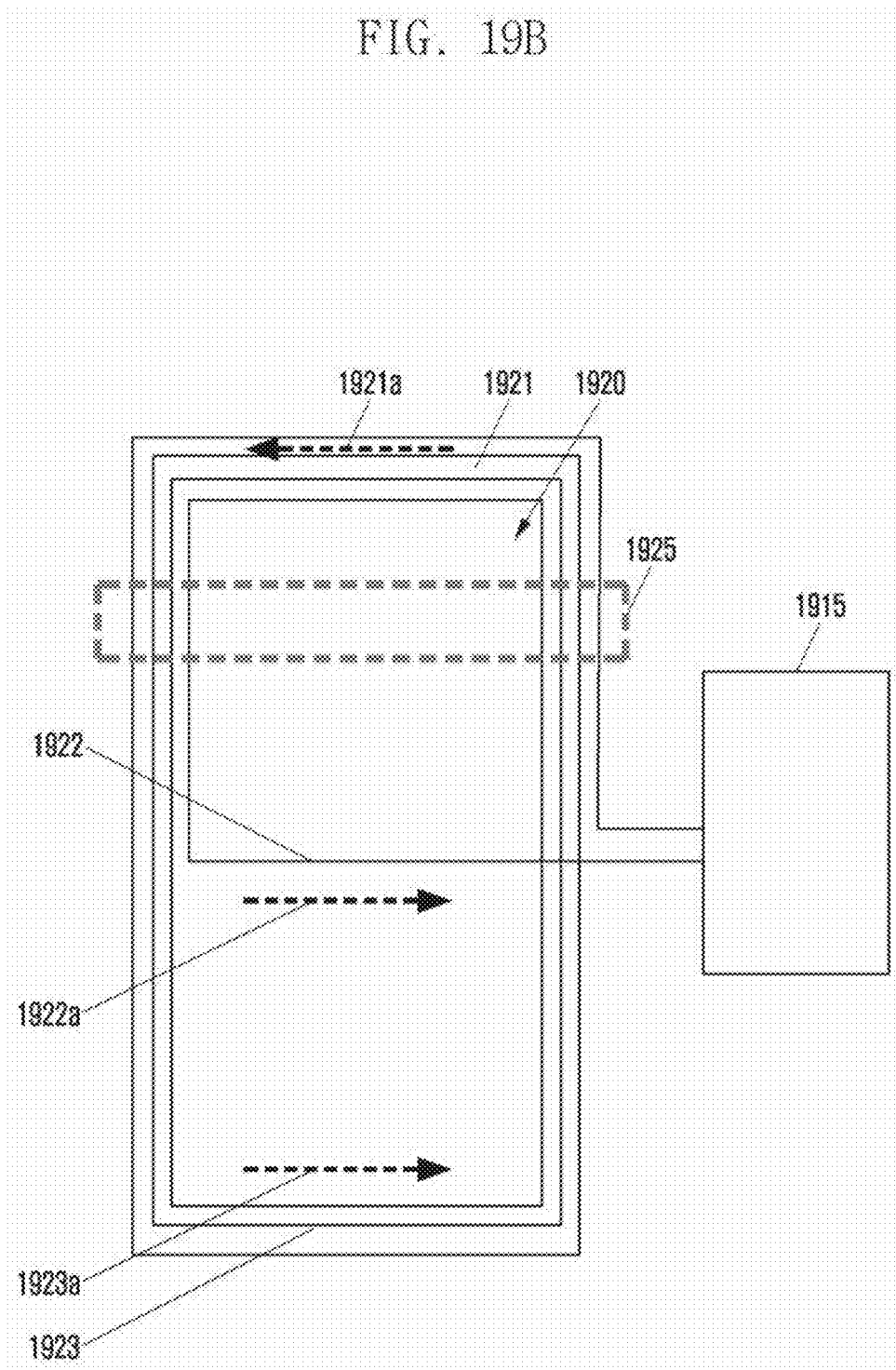

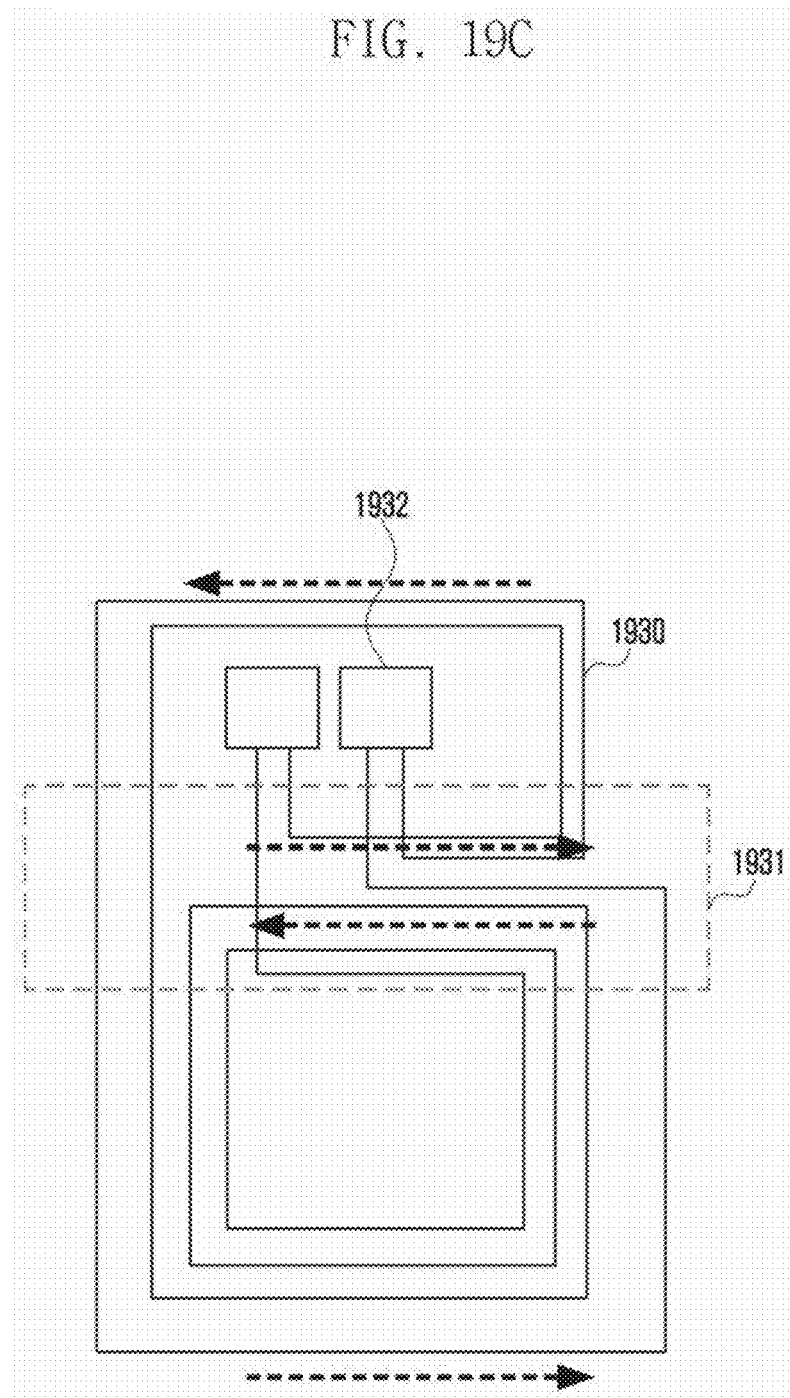

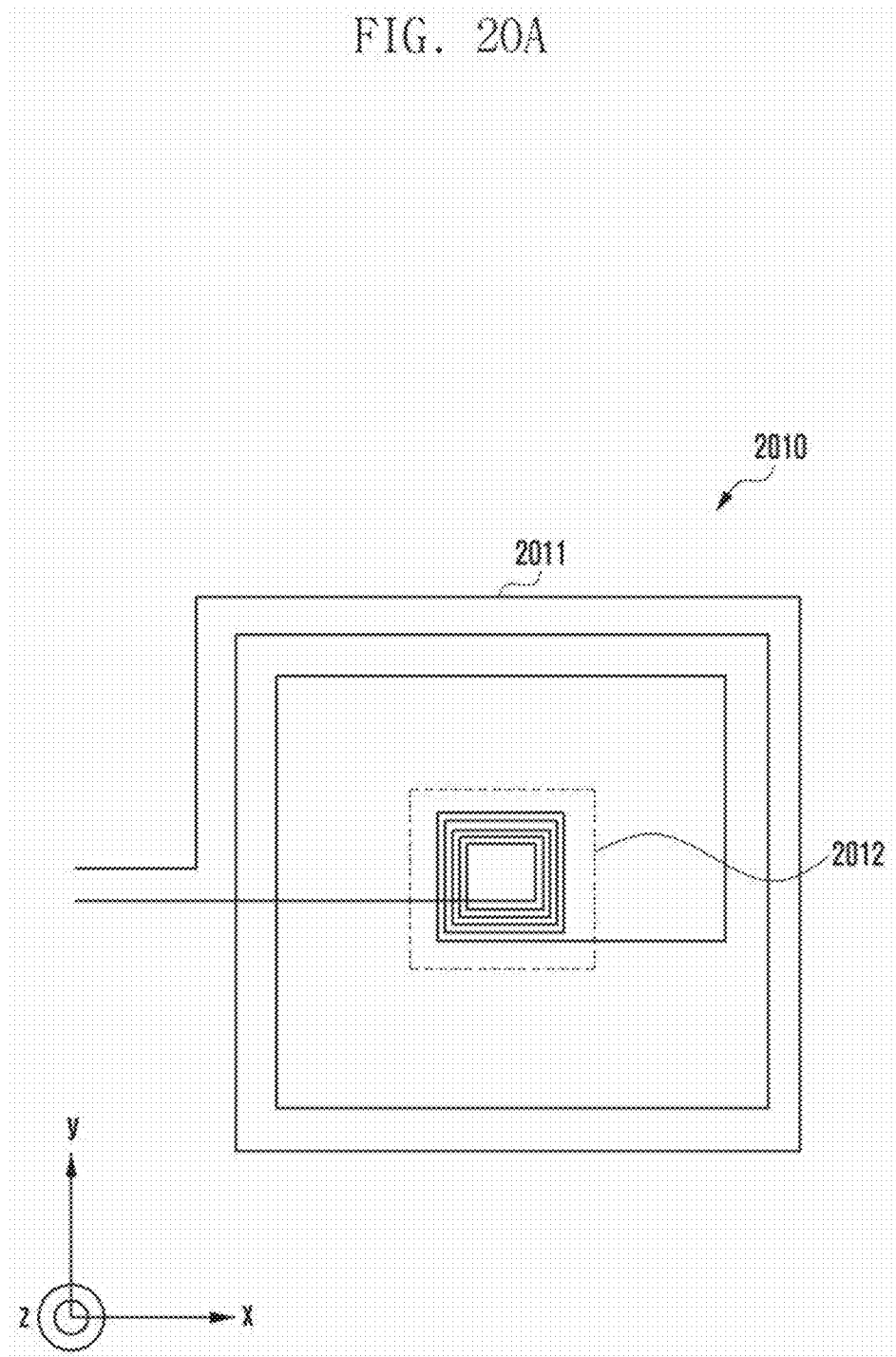

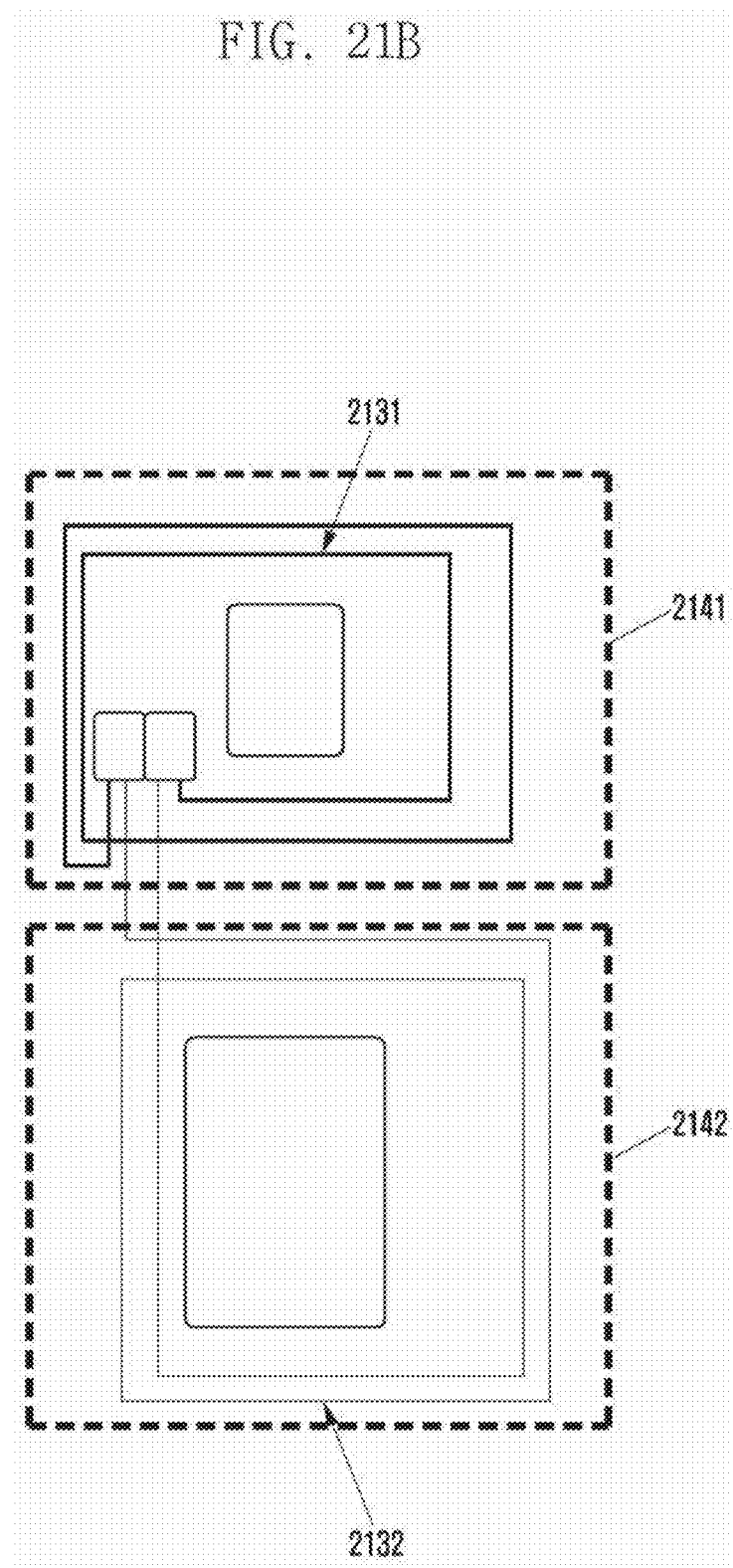

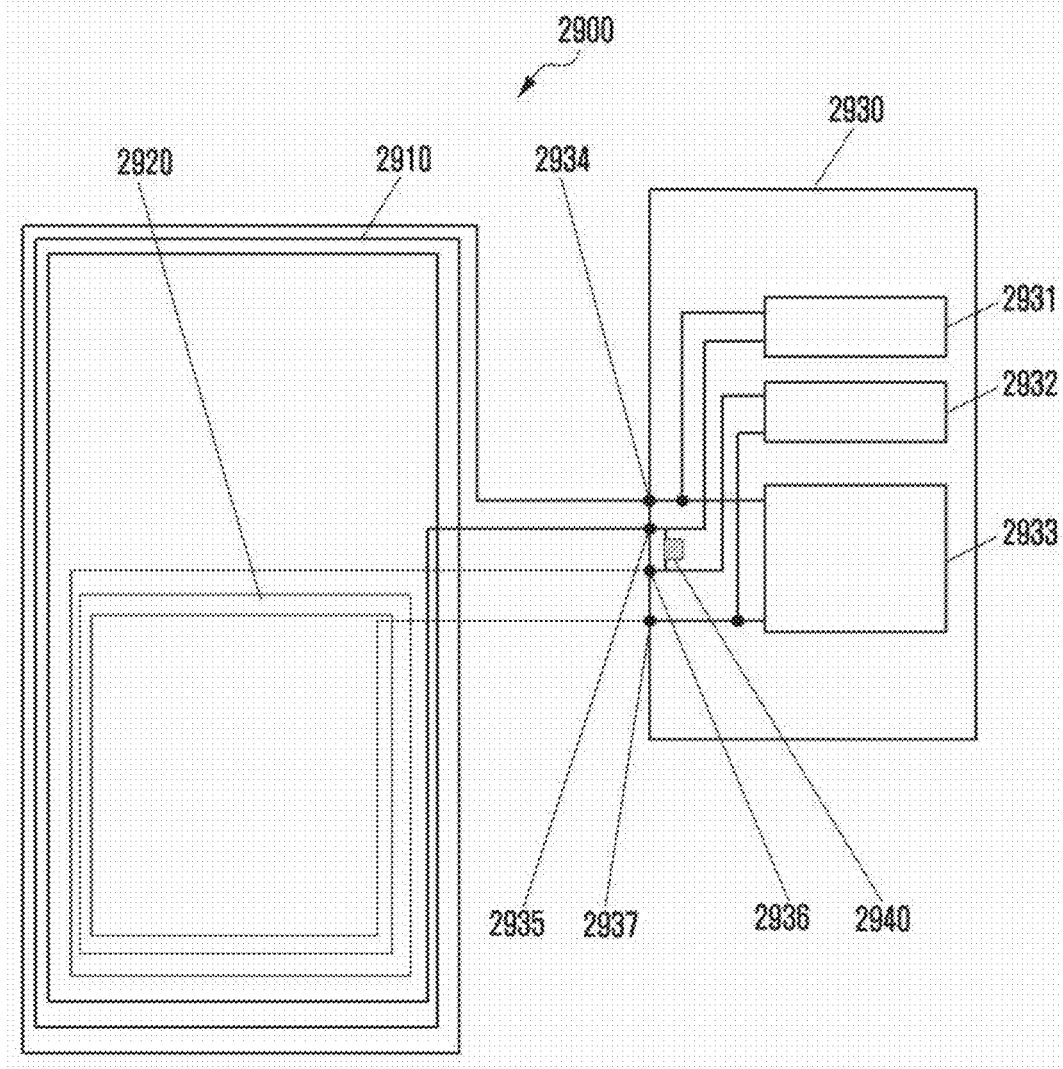

FIG. 33A

| SS | FC | PAN | FS | NAME | FS | ADDITIONAL DATA | FS | DISCRETIONARY DATA | ES | LRC |
|---|---|---|---|---|---|---|---|---|---|---|
| | | (19 Digits max) | | (26 alphanumeric characters Max) | | Expiration data (YYMM) 4<br>Service Code 3 | | -PVKI 1<br>-PW or Oset 4<br>-CVV or CVC 3<br>Some or all of the above elds may be found with the discretionary data | | |
| % | B | 1234123412341234 | < | TOM/SMITH | < | 1908201 | | 000000000000000011900000 | ? | LRC |

FIG. 33B

| SS | PAN (19 Digits max) | FS | ADDITIONAL DATA<br>No. of characters<br>Expiration data (YYMM) 4<br>Service Code 3 | FS | DISCRETIONARY DATA<br>·PVKI 1<br>·PVV or Oset 4<br>·CVV or ·CVC 3<br>Some or all of the above<br>elds may be found with<br>the discretionary data<br>Card Data Format – Track 3 (ISO 4909)<br>104 NUMERIC DATA CHARACTERS<br>SS | ES | LRC |
|---|---|---|---|---|---|---|---|
| ; | 1234123412341234 | = | 1905201 | | 000000119000000 | ? | LRC |

FIG. 33C

| SS | FC | PAN (19 Digits max) | FS | USE AND SECURITY DATA<br>No. of characters<br>County Code (optional) 3<br>Currency Code 3<br>Currency Exponent 1<br>Amybt Authorized per Cycle 4<br>Amybt Remaining this Cycle 4<br>Cycle Begin (Validity Data) 4<br>Cycle Length 2<br>Retry Count 1<br>PIN Control Parameters (optional) 6<br>Interchange Controls 1<br>PAN Service Restriction 2<br>SAN-1 Service Restriction 2<br>SAN-2 Service Restriction 2<br>Expiration Data (optional) 4<br>Card Sequence Number 1<br>Card Security Number (optional) 9 | ADDITIONAL DATA<br>First subsidiary Account No.<br>(optional)<br>CVV or CVC 3<br>Secondary subsidiary Account No.<br>(optional)<br>Relay Marker 1<br>Cryptographic Check Digits 6<br>(optional)<br>Discretionary Data | ES | LRC |
|---|---|---|---|---|---|---|---|
| ; | 01 | 1234123412341234 | = | 5634667805077040=41041030000000000000000000015000<br>0089991=5834667805000000000=Q=030777000000000004 | | ? | LRC |

FIG. 34B

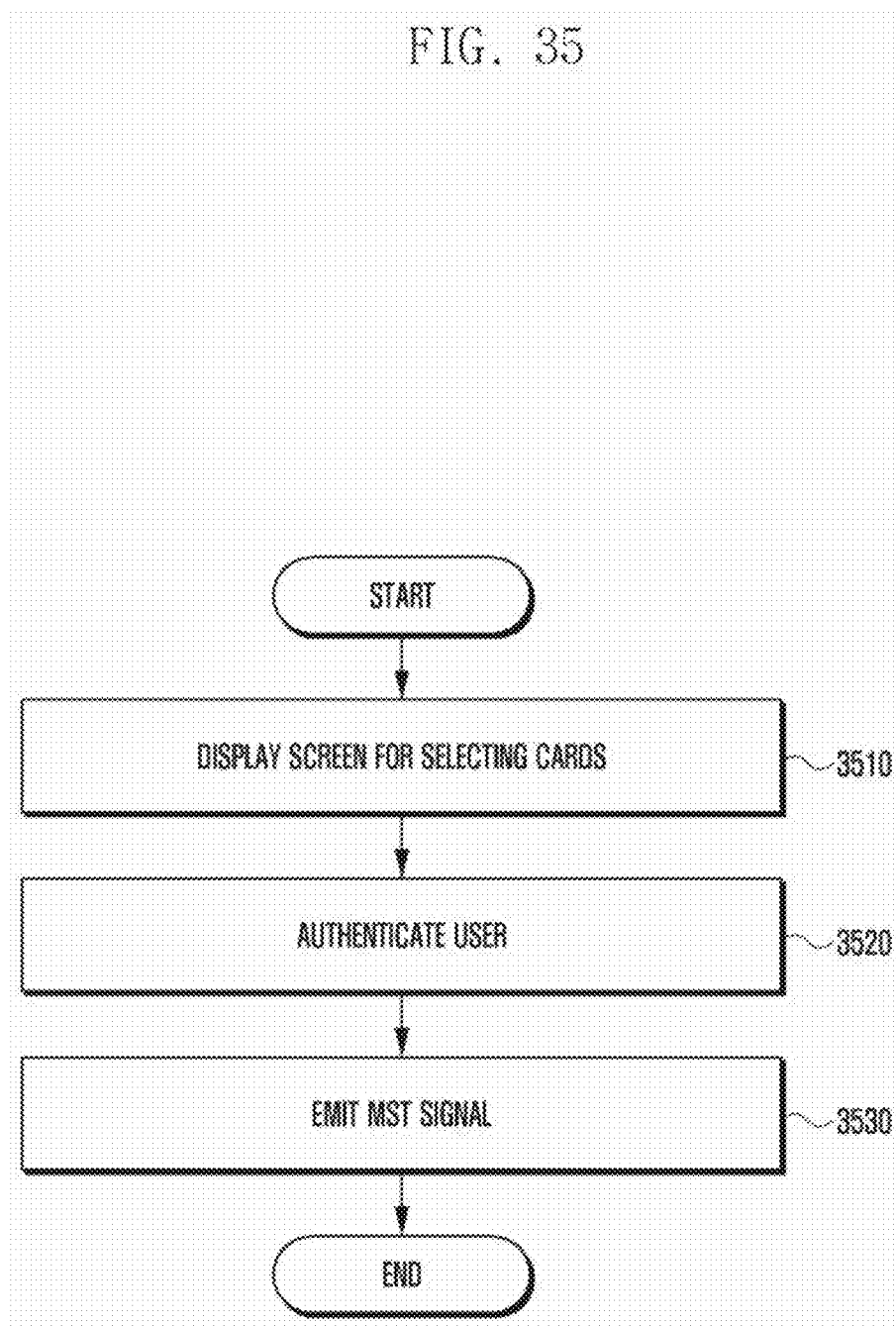

ELECTRONIC DEVICE AND PAYMENT METHOD USING THE SAME

CROSS-REFERENCE TO RELATED APPLICATION(S)

This application is a continuation application of prior application Ser. No. 15/209,263, filed on Jul. 13, 2016, which was based on and claimed priority under 35 U.S.C § 119(a) of a Korean patent application number 10-2015-0100122, filed on Jul. 14, 2015, in the Korean Intellectual Property Office and of a Korean patent application number 10-2015-0162158, filed on Nov. 18, 2015, in the Korean Intellectual Property Office, the disclosure of each of which is incorporated by reference herein in its entirety.

TECHNICAL FIELD

The present disclosure relates to an electronic device capable of communicating with a card reading apparatus, a method for the electronic device to make a payment via communication with the card reading apparatus, an electronic device with a payment function, and a payment method for the electronic device to make a payment using the payment function.

BACKGROUND

In general, card reading apparatuses, or point of sales (POS) terminals, are equipped with a coil and a header for reading information from tracks of a magnetic card. A track refers to card data recorded in a magnetic strip line (e.g., a magnetic black line) of a magnetic card, and has formats, e.g., start sentinel (SS), end sentinel (ES), longitudinal redundancy check character (LRC), and the like.

When a track of a magnetic card is swiped over the header of the rail of a card reading apparatus, the lines of magnetic force passing through the coil connected to the header change. The change in the lines of magnetic force induces current in the card reading apparatus. The card reading apparatus is capable of reading and processing information recorded in the card track from the induced current.

Electronic devices are capable of including a module for magnetic field communication, so that they can make a magnetic field communication with other devices via the module.

The above information is presented as background information only to assist with an understanding of the present disclosure. No determination has been made, and no assertion is made, as to whether any of the above might be applicable as prior art with regard to the present disclosure.

SUMMARY

A magnetic card may have a number of tracks. In order to read information from individual tracks, a card reading apparatus may be equipped with a number of reader channels. When a card is physically swiped over a card reading apparatus, the tracks may be transmitted to corresponding channels, respectively.

Aspects of the present disclosure are to address at least the above-mentioned problems and/or disadvantages and to provide at least the advantages described below. Accordingly, an aspect of the present disclosure is to provide an electronic device capable of recognizing information regarding credit cards via a point of sale (POS) terminal (reader) of a magnetic reading type, and a method of making a payment via the electronic device.

Most POS terminals (readers) used in markets proceed with payment when they receive valid data via one of the channels. However, part of the readers proceed with payment only after data is transmitted to all the channels (e.g., Channels 1 and 2), and may ignore received data when an error occurs or data is transmitted via magnetic secure transmission (MST). Since MST is a technology that transmits data to a reader by emitting magnetic fields, the reader may have a different range of pulse timing varying depending on its shape or location. Therefore, readers may not perform payment with respect to a particular range of pulse timing.

Another aspect of the present disclosure is to provide a method of making a payment via a reader, without conflicting between tracks, using MST, and an electronic device adapted to the method.

Another aspect of the present disclosure is to provide a method of making payment for charges using an MST and an electronic device adapted to the method.

Another aspect of the present disclosure is to provide a method of making payment for charges by adjusting a range of pulse timing without an error and an electronic device adapted to the method.

In accordance with an aspect of the present disclosure, an electronic device is provided. The electronic device includes a first cover configuring a front side of the electronic device, a second cover configuring a back side of the electronic device, a memory contained in a hollow area formed between the first and second covers, a display at least part of which is contained in the hollow area and which is disclosed through the first cover, a processor that is contained in the hollow area and is electrically connected to the memory, and at least one loop antenna which is contained in the hollow area and electrically connected to the processor. The memory stores instructions that enable the processor to store data corresponding to Track 1, Track 2, and Track 3 of a magnetic card in the memory, and emit a magnetic field signal containing data corresponding to at least two of the Track 1, Track 2 and Track 3, for one cycle, via the at least one loop antenna.

In accordance with another aspect of the present disclosure, a method of operating an electronic device is provided. The method includes displaying objects related to a card to make a payment, performing user authentication in response to a payment request of a user, and, controlling, after completing the user authentication, a magnetic field communication module to emit a magnetic field signal containing data corresponding to two or more of Track 1, Track 2 and Track 3 of the card, for one cycle.

In accordance with another aspect of the present disclosure, an electronic device is provided. The electronic device includes a housing including a first side and a second side facing a direction opposite to the first side, a user interface (UI) disclosed through the first side, a memory in the housing, a processor that is contained in the housing and is electrically connected to the memory and the UI, and at least one conductive pattern which is contained in the housing or formed as part of the housing and is electrically connected to the processor. The memory temporarily stores first payment information in a first format and second payment information in a second format. The memory stores instructions which enable the processor to create a number of signal sequences using the first payment information and/or second payment information, and magnetically emit the signal sequences to the outside, via the conductive pattern. At least one of the signal sequences includes pulses representing the entirety of the first payment information and/or the second payment information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2A is a diagram showing a magnetic secure transmission (MST) signal emitted from an MST module according to various embodiments of the present disclosure;

FIG. 2B shows diagrams of pulse timings of an MST signal according to various embodiments of the present disclosure;

FIGS. 3A and 3B show diagrams of character strings included in payment data corresponding to payment information according to various embodiments of the present disclosure;

FIGS. 4A and 4B show diagrams of binary strings encoded from information according to various embodiments of the present disclosure;

FIGS. 5A and 5B are diagrams showing track information transmitted via an emission of an MST signal according to various embodiments of the present disclosure;

FIGS. 6A to 6C are diagrams that describe a method of including a number of track information items in an MST signal according to various embodiments of the present disclosure;

FIG. 7 is a diagram showing a simple transmission sequence and a complex transmission sequence according to various embodiments of the present disclosure;

FIG. 9 illustrates results of measuring a signal emitted from an MST output module and a signal received by an external device according to various embodiments of the present disclosure;

FIGS. 17A and 17B are diagrams showing configurations of an MST module with two loop antennas according to various embodiments of the present disclosure;

FIGS. 19A to 19G are diagrams showing structures of loop antennas according to various embodiments of the present disclosure;

FIGS. 20A and 20B are diagrams showing structures of loop antennas according to various embodiments of the present disclosure;

FIGS. 21A and 21B are diagrams showing structures of a number of loop antennas according to various embodiments of the present disclosure;

FIG. 29 is a diagram showing an antenna device according to various embodiments of the present disclosure;

FIGS. 33A to 33C are diagrams illustrating formats of data recorded in tracks of magnetic cards according to various embodiments of the present disclosure;

FIGS. 34A and 34B are diagrams that describe data transmission methods according to various embodiments of the present disclosure;

FIG. 35 is a flowchart that describes a payment method according to various embodiments of the present disclosure;

Throughout the drawings, it should be noted that like reference numbers are used to depict the same or similar elements, features, and structures.

DETAILED DESCRIPTION

Figure 1A:
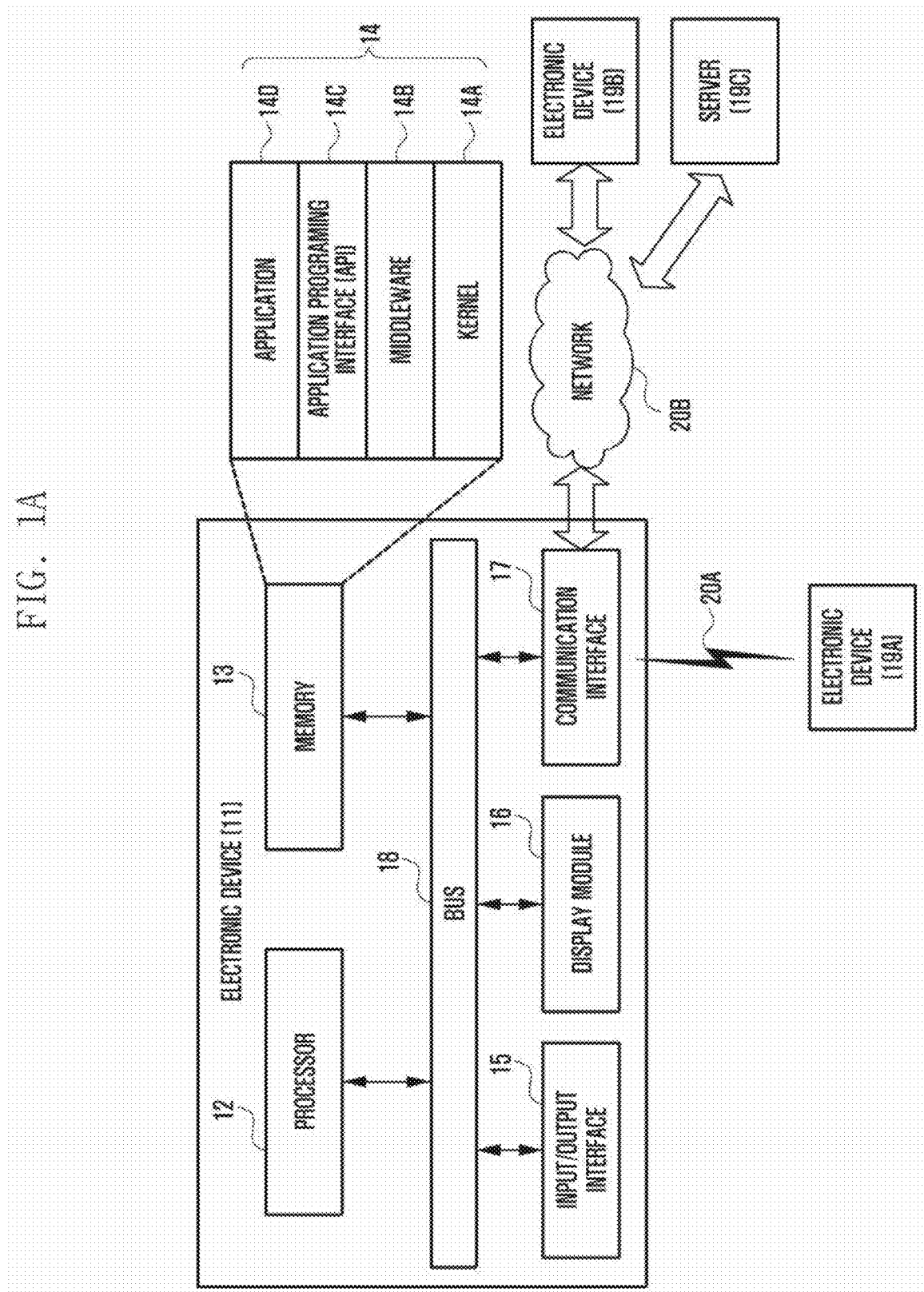
FIG. 1A is a diagram showing a network environment including a handheld electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms, such as "include" or "have" may be construed to denote a certain characteristic, number, operation, constituent element, component or a combination thereof, but may not be construed to exclude the existence of or a possibility of the addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device may indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, and a wearable device (e.g., a head-mounted-device (HMD), such as electronic glasses, electronic clothes, an electronic bracelet, an electronic necklace, an electronic accessory, an electronic tattoo, a smart watch, and the like).

According to some embodiments of the present disclosure, the electronic device may be a smart home appliance having a communication function. The smart home appliance may include at least one of a television (TV), a digital versatile disc (DVD) player, an audio player, an air conditioner, a cleaner, an oven, a microwave oven, a washing machine, an air cleaner, a set-top box, a TV box (e.g., Samsung HomeSync™, Apple TV™, or Google TV™), game consoles, an electronic dictionary, an electronic key, a camcorder, and an electronic frame.

According to some embodiments of the present disclosure, the electronic device may include at least one of various types of medical devices (e.g., magnetic resonance angiography (MRA), magnetic resonance imaging (MRI), computed tomography (CT), a scanner, an ultrasonic device and the like), a navigation device, a global navigation satellite system (GNSS) receiver, an event data recorder (EDR), a flight data recorder (FDR), a vehicle infotainment device, electronic equipment for a ship (e.g., a navigation device for ship, a gyro compass and the like), avionics, a security device, a head unit for a vehicle, an industrial or home robot, an automatic teller machine (ATM) of financial institutions, a point of sale (POS) device of shops, and a device for internet of things (IoT) (e.g., a fire alarm, various sensors, electric or gas meter units, a sprinkler, a thermostat, a streetlamp, a toaster, sport outfits, a hot-water tank, a heater, a boiler and the like).

According to some embodiments of the present disclosure, the electronic device may include at least one of furniture or a part of a building/structure, an electronic board, an electronic signature receiving device, a projector, and various types of measuring devices (e.g., a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (e.g., an artificial intelligence electronic device) which uses an electronic device.

FIG. 1A illustrates a network environment including an electronic device according to various embodiments of the present disclosure.

Referring to FIG. 1A, an electronic device 11 may include various components including a bus 18, a processor 12, a memory 13, an input/output interface 15, a display 16, and a communication interface 17.

The bus 18 may be a circuit connecting the above described components and transmitting communication (e.g., a control message) between the above described components.

The processor 12 may receive commands from other components (e.g., the memory 13, the input/output interface 15, the display 16, the communication interface 17, or a power management module) through the bus 18, analyze the received commands, and execute calculation or data processing according to the analyzed commands.

The memory 13 stores commands or data received from the processor 12 or other components (e.g., the input/output interface 15, the display 16, the communication interface 17, or the power management module) or generated by the processor 12 or other components. The memory 13 may store a software and/or a program. For example, a program 14 may include a kernel 14A, middleware 14B, an application programming interface (API) 14C, and an application program (or an application) 14D. At least part of the kernel 14A, the middleware 14B or the API 14C may refer to an operating system (OS).

The kernel 14A controls or manages system resources (e.g., the bus 18, the processor 12, or the memory 13) used for executing an operation or function implemented by the remaining other programming modules, for example, the middleware 14B, the API 14C, or the application 14D. Further, the kernel 14A provides an interface for accessing individual components of the electronic device 11 from the middleware 14B, the API 14C, or the application 14D to control or manage the components.

The middleware 14B performs a relay function of allowing the API 14C or the application 14D to communicate with the kernel 14A to exchange data. Further, in operation requests received from the application 14D, the middleware 14B performs a control for the operation requests (e.g., scheduling or load balancing) by using a method of assigning a priority, by which system resources (e.g., the bus 18, the processor 12, the memory 13 and the like) of the electronic device 11 can be used, to the application 14D.

The API 14C is an interface by which the application 14D can control a function provided by the kernel 14A or the middleware 14B and includes, for example, at least one interface or function (e.g., a command) for a file control, a window control, image processing, or a character control.

According to various embodiments of the present disclosure, the application 14D may include a short message service (SMS)/multimedia messaging service (MMS) application, an email application, a calendar application, an alarm application, a health care application (e.g., application measuring quantity of exercise or blood sugar) or an environment information application (e.g., application providing information on barometric pressure, humidity or temperature). Additionally, or alternatively, the application 14D may be an application related to an information exchange between the electronic device 11 and an external electronic device (e.g., the electronic device 19B). The application 14D related to the information exchange may include, for example, a notification relay application for transferring particular information to the external electronic device or a device management application for managing the external electronic device.

For example, the notification relay application may include a function of transmitting notification information generated by another application (e.g., an SMS/MMS application, an email application, a health care application or an environment information application) of the electronic device 11 to the external electronic device (e.g., the electronic device 19B). Additionally, or alternatively, the notification relay application may receive notification information from, for example, the external electronic device 19B, and provide the received notification information to the user. The device management application may manage (e.g., install, remove, or update) at least a part of functions of the electronic device. For example, the device management application may turn on/off the external electronic device (or some components of the external electronic device), control a brightness of the display of the external electronic device or communicate with the electronic device 11, an application executed in the external electronic device 19B, or a service (e.g., a call service or a message service) provided by the external electronic device 19B.

According to various embodiments of the present disclosure, the application 14D may include an application designated according to an attribute (e.g., a type of electronic device) of the external electronic device 19B. For example, when the external electronic device 19B is a moving picture experts group (MPEG-1 or MPEG-2) audio layer III (MP3) player, the application 14D may include an application related to music reproduction. Similarly, when the external electronic device 19B is a mobile medical device, the application 14D may include an application related to health care. According to an embodiment of the present disclosure, the application 14D may include at least one of an application designated to the electronic device 11 and an application received from an external electronic device (e.g., a server 19C or electronic device 19B).

The input/output interface 15 transmits a command or data input from the user through an input/output device 15 (e.g., a sensor, a keyboard, or a touch screen) to the processor 12, the memory 13, the communication interface 17, or the display control module 16 through, for example, the bus 18. For example, the input/output interface 15 may provide data on a user's touch input through a touch screen to the processor 12. Further, the input/output interface 15 may output a command or data received through, for example, the bus 18, from the processor 12, the memory 13, the communication interface 17, or the power management module through the input/output device (e.g., a speaker or a display). For example, the input/output interface 15 may output voice data processed through the processor 12 to the user through the speaker.

The display 16 may include, for example, liquid crystal display (LCD), flexible display, transparent display, light-emitting diode (LED) display, organic LED (OLED) display, microelectromechanical systems (MEMS) display, or electronic paper display. The display 16 may visually offer, for example, various contents (e.g., text, image, video, icon, symbol, and the like) to users. The display 16 may include a touch screen and receive, for example, a touch, gesture, proximity, or hovering input using an electronic pen or a user's body. According to an embodiment of the present disclosure, the display 16 may be one or more displays. For example, the display 16 may be included in the electronic device 11 or included in an external device (e.g., the electronic device 19A or 19B) having a wired or wireless connection with the electronic device 11, thus outputting information offered by the electronic device 11 to users.

According to an embodiment of the present disclosure, the display 16 may be attachable to or detachable from the electronic device 11. For example, the display 16 may include an interface which can be mechanically or physically connected with the electronic device 11. According to an embodiment of the present disclosure, in case the display 16 is detached (e.g., separated) from the electronic device 11 by a user's selection, the display 16 may receive various control signals or image data from the power management module or the processor 12, e.g., through wireless communication.

The communication interface 17 may establish communication between the electronic device 11 and any external device (e.g., the first external electronic device 19A, the second external electronic device 19B, or the server 19C). For example, the communication interface 17 may be connected with a network 20B through wired or wireless communication and thereby communicate with any external device (e.g., the first external electronic device 19A, the second external electronic device 19B, or the server 19C).

According to an embodiment of the present disclosure, the electronic device 11 may be connected with the first external electronic device 19A and the second external electronic device 19B without using the communication interface 17. For example, based on at least one of a magnetic sensor, a contact sensor, a light sensor, and the like that is equipped in the electronic device 11, the electronic device 11 may detect whether at least one of the first and second external electronic devices 19A and 19B is contacted with at least part of the electronic device 11, or whether at least one of the first and second external electronic device 19A and 19B, respectively, is attached to at least part of the electronic device 11.

Wireless communication may use, as cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, for example. A short-range communication 20A may include, for example, at least one of Wi-Fi, Bluetooth (BT), near field communication (NFC), magnetic secure transmission (MST) or near field magnetic data stripe transmission, and GNSS, and the like. The GNSS may include at least one of, for example, a global positioning system (GPS), a global navigation satellite system (GLONASS), a BeiDou navigation satellite system (hereinafter, referred to as "BeiDou"), and Galileo (European global satellite-based navigation system). Hereinafter, the "GPS" may be interchangeably used with the "GNSS" in the present disclosure. Wired communication may include, for example, at least one of universal serial bus (USB), high definition multimedia interface (HDMI), recommended standard-232 (RS-232), plain old telephone service (POTS), and the like. The network 20B may include telecommunication network, for example, at least one of a computer network (e.g., local area network (LAN) or wide area network (WAN)), internet, and a telephone network.

The first and second external electronic devices 19A and 19B may be identical to, or different from, the electronic device 11. According to an embodiment of the present disclosure, the first and second external electronic devices 19A and 19B may include, for example, a plurality of electronic devices. According to an embodiment of the present disclosure, the server 19C may include a single server or a group of servers. According to various embodiments of the present disclosure, all or part of operations executed in the electronic device 11 may be executed in other electronic device(s), such as the first and second electronic devices 19A and 19B or the server 19C.

According to an embodiment of the present disclosure, in case the electronic device 11 is required to perform a certain function or service automatically or by request, the electronic device 11 may request another device (e.g., the electronic device 19A or 19B or the server 19C) to execute instead, or additionally at least part, of at least one or more functions associated with the required function or service. The requested device may execute the requested function and deliver the result of execution to the electronic device 11. Then, the electronic device 11 may offer the required function or service, based on the received result or by processing the received result. For the above, cloud computing technology, distributed computing technology, or client-server computing technology may be used, for example.

Figure 1B:
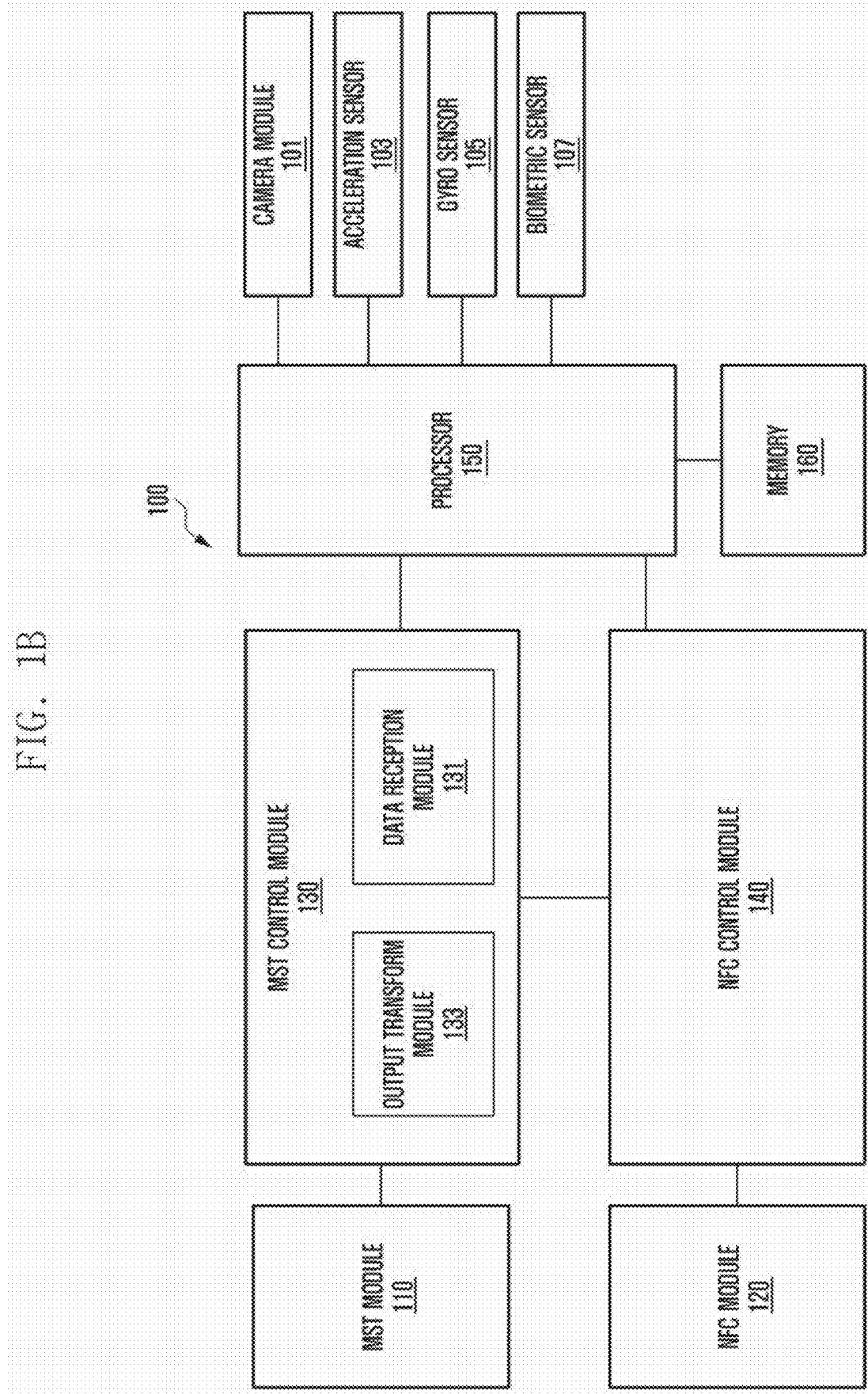
FIG. 1B is a block diagram showing a configuration of an electronic device capable of performing a payment function according to various embodiments of the present disclosure.

FIG. 1B is a block diagram showing a configuration of an electronic device capable of performing a payment function according to various embodiments of the present disclosure.

Referring to FIG. 1B, in an embodiment of the present disclosure, an electronic device 100 is capable of including a camera module 101, an acceleration sensor 103, a gyro sensor 105, a biometric sensor 107, an MST module 110, an NFC module 120, an MST control module 130, an NFC control module 140, a processor 150, and a memory 160.

In an embodiment of the present disclosure, the camera module 101 takes an image of a card to make a payment and obtains the card information. The camera module 101 is capable of recognizing card information (e.g., card issuing company, card number, expiration date, card holder name, and the like), recorded in a card, via an optical character reader (OCR) function. Alternatively, a user may directly input card information to his/her electronic device, using an input device of the electronic device, e.g., a touch panel, a pen sensor, keys, an ultrasonic input system, a microphone, and the like.

In an embodiment of the present disclosure, the acceleration sensor 103 or gyro sensor 105 is capable of obtaining location information regarding the electronic device when payment is performed, and transferring the obtained location information to the processor 150. The processor 150 controls the current supplied to an antenna (e.g., coil antenna) of the MST module 110, based on the location information regarding the electronic device, to control the intensity of magnetic field emitted to a POS terminal. Alternatively, when the MST module 110 has a number of coil antennas, the processor 150 may select a coil antenna which is used.

In an embodiment of the present disclosure, the biometric sensor 107 is capable of obtaining user biometric information (e.g., fingerprint or iris) to authenticate a card for payment or a user.

In an embodiment of the present disclosure, the MST module 110 is capable of including a coil antenna. The MST control module 130 is capable of supplying voltage to both ends of the coil antenna, in different polarity, according to data (e.g., a binary value, 0 or 1), thereby controlling the direction of electric current flowing in the coil antenna. The signal emitted from the coil antenna (or a magnetic field signal induced by electric current flowing in the coil) produces induced electromotive force in an POS terminal as if a magnetic card is read by the POS terminal.

In an embodiment of the present disclosure, the MST control module 130 is capable of including a data reception module 131 and an output transform module 133. The data reception module 131 is capable of receiving a logical high/low pulse containing payment information from the processor 150 (or a built-in security module of the electronic device 100).

In an embodiment of the present disclosure, the output transform module 133 is implemented with a circuit that is capable of transforming data, recognized by the data reception module 131, to a corresponding format of data to be transmitted to the MST module 110. The circuit may include an H-bridge configured to alternate the polarity of voltage supplied to both ends of the MST module 110.

In an embodiment of the present disclosure, the electronic device 100 is capable of receiving information regarding a card via the camera module 101 or an input device (e.g., a touch panel, a pen sensor, and the like), and payment information (e.g., Track 1, Track 2, Track 3 or token information), contained in at least part of the magnetic strip of the card (e.g., a magnetic card), from a card issuing company/bank server, via a communication module (not shown), based on the card information. The electronic device 100 is capable of storing the payment information, as a corresponding format, in the processor 150 or a built-in security module.

FIG. 2A is a diagram showing an MST signal emitted from an MST module according to various embodiments of the present disclosure. FIG. 2B shows diagrams of pulse timings of an MST signal according to various embodiments of the present disclosure. In the present disclosure, the expression "pulse timing" refers to a time interval from a start point of a pulse to a start point of the next pulse, and is also called "pulse duration or duration."

Referring to FIG. 2A, the electronic device (e.g., the electronic device 100 shown in FIG. 1B) is capable of emitting MST signals containing payment information via an MST module, a number of times (e.g., N times where N is a positive integer), every one cycle T. Each of the emitted MST signals, first MST signal 200_1 to n-th MST signal 200_n, may contain a logical low/high pulse corresponding to 0 or 1 binary value. For example, when a voltage formed in pulse does not change in level for a period of time t, the state represents '0' which is logical low. On the other hand, when a voltage formed in pulse changes in level (or in phase), the state is represents '1' which is logical high.

In an embodiment of the present disclosure, the MST module is capable of periodically emitting the same MST signal. For example, an MST signal may contain payment information recorded in at least part of a card. As shown in FIG. 2A, each of the MST signals 200, first MST signal 200_1 to n-th MST signal 200_n, may contain at least part of the following information regarding a card, Track 1, Track 2, Track 3, and token. For example, each of the first MST signal 200_1 to n-th MST signal 200_n may contain two or more of the following information regarding a card, Track 1, Track 2, Track 3, and token.

In an embodiment of the present disclosure, the MST module may periodically emit other MST signals. For example, while MST signals 200 are emitted, the first MST signal 200_1 to the n-th MST signal 200_n may contain track information items that differ from each other. For example, each of the MST signals, e.g., MST signals 200_1 to 200_n, may contain information items recorded in two or more of the following card tracks, Track 1, Track 2, and Track 3.

While MST signals 200 are emitted, MST signals 200_1 to 200_n may have formats that differ from each other. For example, MST signals may have pulse timings or cycles Ts, which differ from each other.

Referring to FIG. 2B, the electronic device (e.g., the electronic device 100 shown in FIG. 1B) is capable of emitting MST signals containing payment information via the MST module, at different pulse timings t. In an embodiment of the present disclosure, the MST signals, e.g., MST signals 200_1 to 200_n, may have different pulse timings t. For example, the first MST signal 200_1 may contain at least part of the following card information Track 1, Track 2, Track 3, and token, and in this case, each of the pulses may have a pulse timing of 300 μs. The second MST signal 200_2 may contain at least part of the following card information Track 1, Track 2, Track 3, and token, and in this case, each of the pulses may have a pulse timing of 500 μs. When the pulse timing t is small, an external device (e.g., a POS terminal) may receive a signal from the electronic device, similar to a signal when a card holder rapidly swipes the card over the external device. On the other hand, when the pulse timing t is large, an external device (e.g., a POS terminal) may receive a signal from the electronic device, similar to a signal when a card holder slowly swipes the card over the external device.

In an embodiment of the present disclosure, cycle T is variable. For example, each of the first MST signal 200_1 and the second MST signal 200_2 may contain at least part of the following card information Track 1, Track 2, Track 3, and token, and the first MST signal 200_1 and the second MST signal 200_2 may be emitted once per second. Each of the third MST signal 200_3 and the fourth MST signal 200_4 may contain at least part of the following card information Track 1, Track 2, Track 3, and token, and the third MST signal 200_3 and the fourth MST signal 200_4 may be emitted once per two seconds.

While the MST signal is emitted, an NFC module (e.g., NFC module 120 shown in FIG. 1B) may operate in polling mode.

FIGS. 3A and 3B show diagrams of character strings included in payment data corresponding to payment information according to various embodiments of the present disclosure.

Referring to FIGS. 3A and 3B, the electronic device (e.g., the electronic device 100 shown in FIG. 1B) is capable of emitting a signal containing payment data (e.g., payment information) using the MST module at cycle T (e.g., once per second). For example, a signal transmitted once per second may contain information regarding Track 1 as shown in FIG. 3A or information regarding Track 2 as shown in FIG. 3B. For example, a signal transmitted once per second may contain part of information regarding Track 1 as shown in FIG. 3A or information regarding Track 2 as shown in FIG. 3B.

Figures 4A, 4B:
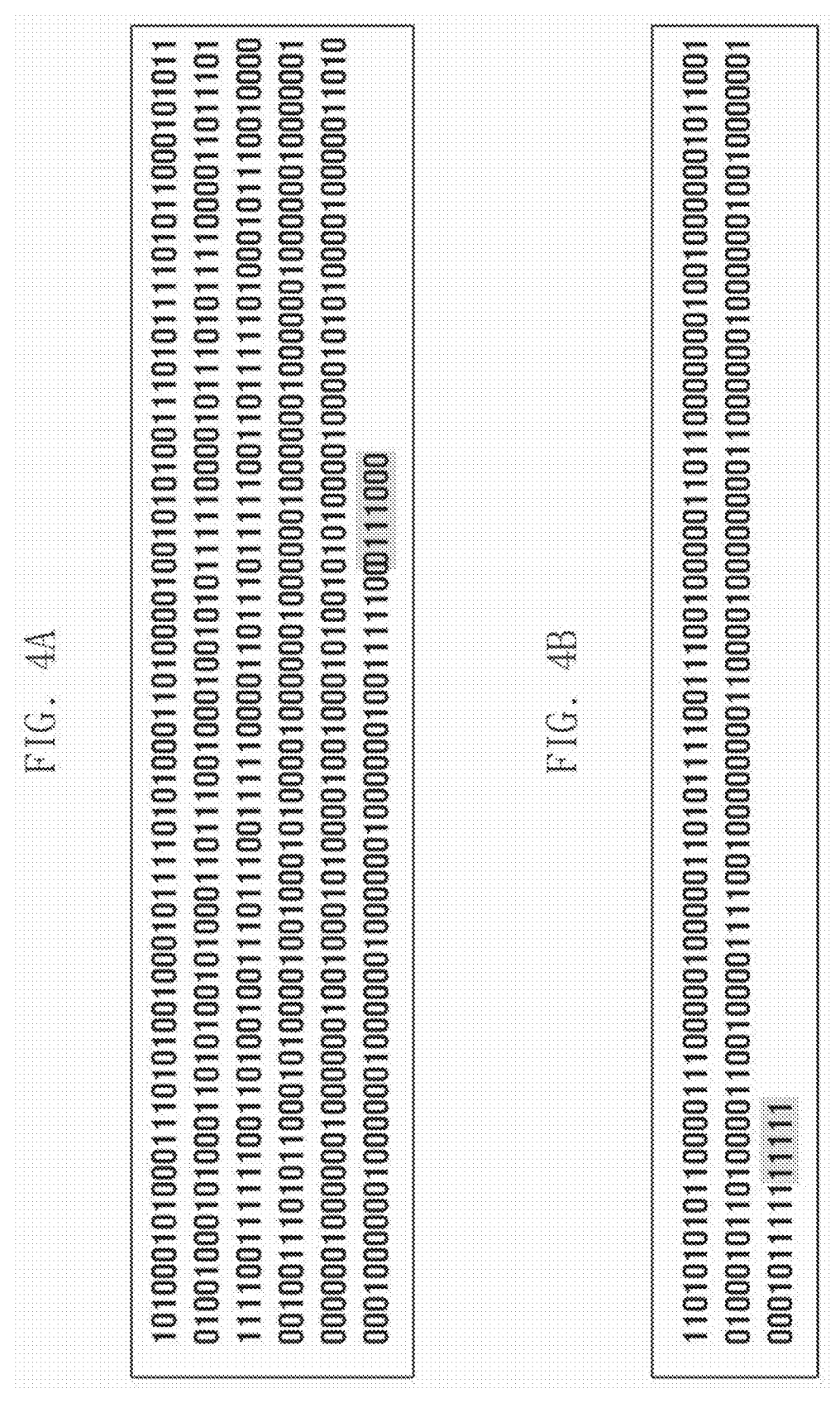

FIGS. 4A and 4B show diagrams of binary strings encoded from information according to various embodiments of the present disclosure.

Referring to FIGS. 4A and 4B, FIG. 4A shows a binary string of the data shown in FIG. 3A. The data may contain a longitudinal redundancy check character (LRC), e.g., "0111000," in the last (tail). FIG. 4B shows a binary string of the data shown in FIG. 3B. The data may contain an LRC, e.g., "11111," in the last (tail).

Figures 5A, 5B:
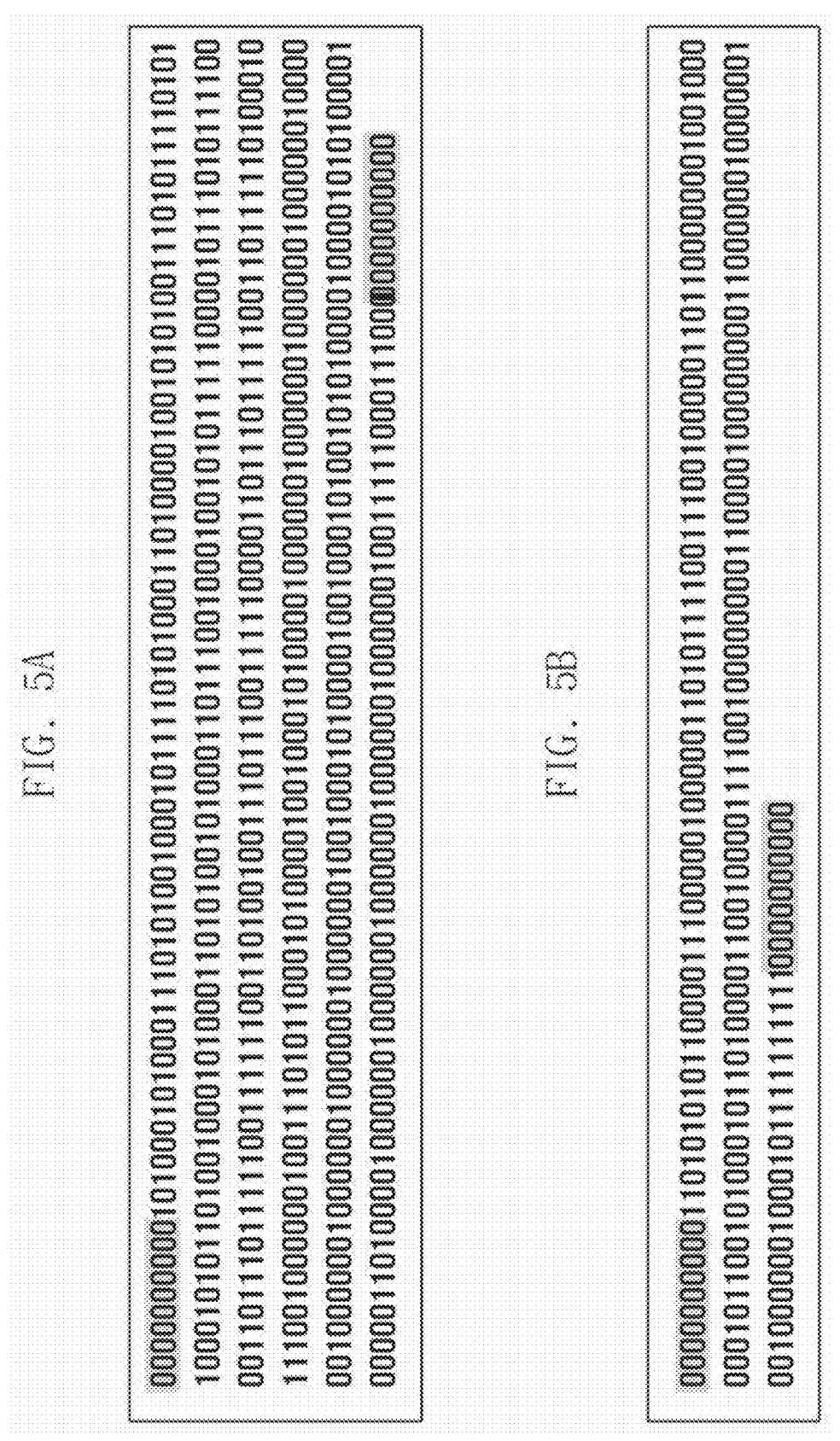

FIGS. 5A and 5B are diagrams showing track information transmitted via an emission of an MST signal according to various embodiments of the present disclosure.

Referring to FIGS. 5A and 5B, the data shown in FIG. 5A is created as data, e.g., "00000000," is added to the lead and tail of the binary string of FIG. 4A. The data shown in FIG. 5B is created as data, e.g., "00000000," is added to the lead and tail of the binary string of FIG. 4B.

In an embodiment of the present disclosure, the electronic device (e.g., the electronic device 100 shown in FIG. 1B) is capable of emitting information regarding one track via the MST module for a cycle T, and this emission is called a simple sequence. For example, an electronic device is capable of emitting an MST signal containing information regarding Track 1 (e.g., data shown in FIG. 5A) or information regarding Track 2 (e.g., data shown in FIG. 5B) via the MST module for a cycle T. In an embodiment of the present disclosure, an electronic device is capable of emitting signals containing information regarding a number of tracks for a cycle T, and this emission is called a complex sequence. Embodiments to implement the simple sequence and complex sequence are described as follows.

Figures 6A, 6B, 6C:
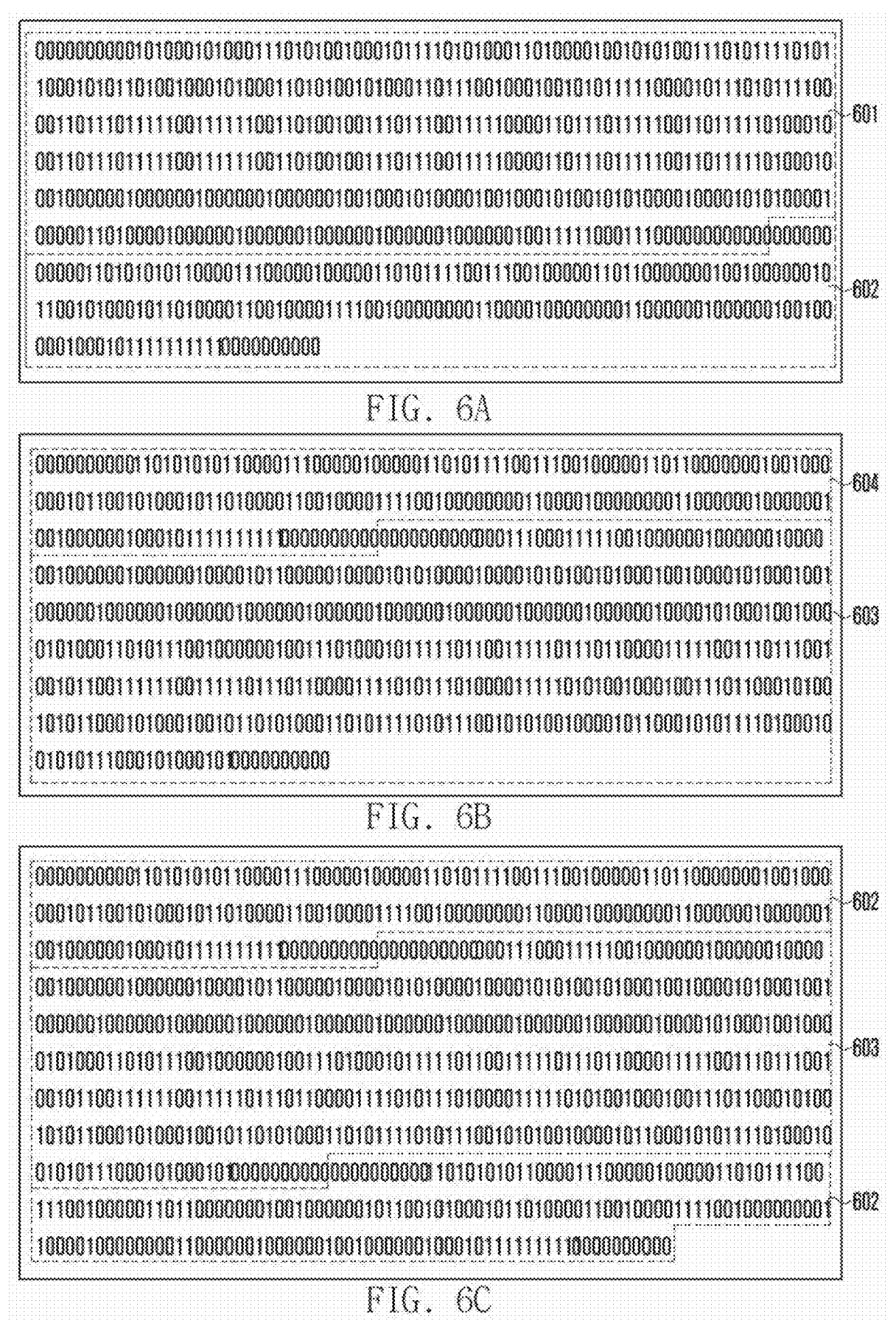

FIGS. 6A, 6B, and 6C are diagrams that describe a method of including a number of track information items in an MST signal according to various embodiments of the present disclosure.

Referring to FIG. 6A, the electronic device lumps Track 1 data 601 shown in FIG. 5A and Track 2 data 602 shown in FIG. 5B, together, sequentially, to configure one item of data, and emits the configured data for one cycle T. For example, data shown in FIG. 6A may be contained in at least one of the MST signals 200 shown in FIG. 2A.

Referring to FIG. 6B, the electronic device is capable of configuring at least part of the MST signal by arranging the binary numbers of data of at least one of the tracks in reverse order. For example, the electronic device configures the binary numbers of Track 1 data shown in FIG. 5A, in reverse order, thereby creating reversal Track 1 data 603. The electronic device sequentially lumps Track 2 data 604 shown in FIG. 5B and the reversal Track 1 data 603 together into one data item and emits the lumped data for one cycle T. The reversal Track 1 data 603 has the same effect as the card holder swipes the card over the external device in the reverse direction.

Referring to FIG. 6C, the electronic device sequentially lumps the Track 2 data 602 shown in FIG. 5B, the reversals Track 1 data 603 created as the Track 1 data of FIG. 5A is configured in the reverse order, and the Track 2 data 602 of FIG. 5B, to create one data item, and emits the lumped data for one cycle T. It should be understood that lumping or combining track data may also be performed in various ways other than the method described above. For example, Track 2 data and the reversal Track 2 data may be lumped sequentially.

Therefore, the electronic device is capable of including various formats of track information in at least one of the MST signals 200 periodically emitted by the MST module.

FIG. 7 is a diagram showing a simple transmission sequence and a complex transmission sequence according to various embodiments of the present disclosure.

Referring to FIG. 7, the electronic device (e.g., the electronic device 100 shown in FIG. 1B) is capable of performing emission in a first simple transmission sequence 710. For example, the electronic device emits an MST signal containing Track 2 information (e.g., data of FIG. 5B) successively, four times, periodically, where one time is one second (or cycle T1). The MST signal determines the width W based on the pulse timing. For example, the pulse timing of the first simple transmission sequence 710 is set to 300 μs.

The electronic device is capable of performing emission in a first complex transmission sequence 720. For example, the electronic device emits an MST signal, successively, four times, periodically (a cycle T2), where the MST signal contains information regarding Track 1 and reversal Track 2 (e.g., data created by sequentially lumping Track 1 data 601 and reversal Track 2 data created as the Track 2 data 602 is configured in reverse order). The electronic device reduces the pulse timing of the first complex transmission sequence 720 to equalize cycle T2 to cycle T1. As another example, the electronic device may equalize the pulse timing of the first complex transmission sequence 720 to that of the first simple transmission sequence 710. In this case, the amount of information transmitting for cycle T2 is greater than that for cycle T1, and thus the width W2 is also greater than W1. Therefore, when the intervals I2 and I1 are set to the same, cycle T2 is greater than cycle T1. When the electronic device reduces the interval I2 to be less than I1, cycle T2 may be identical to cycle T1.

The electronic device is capable of performing emission in a second simple transmission sequence 730. For example, the electronic device emits an MST signal containing Track 2 information (e.g., data of FIG. 5B) successively, four times, periodically (a cycle T3). In this case, the pulse timing of the second simple transmission sequence 730 may be greater than that of the first simple transmission sequence 710. For example, the first simple transmission sequence 710 has a pulse timing of 300 μs, and the second simple transmission sequence 730 has a pulse timing of 500 μs.

The electronic device is capable of performing emission in a second complex transmission sequence 740. For example, the electronic device emits an MST signal, successively, four times, periodically (a cycle T4), where the MST signal contains information regarding Track 1 and reversal Track 2 (e.g., data created as the binary numbers of the data of FIG. 5A and data of FIG. 5B are configured in reverse order). In this case, the pulse timing of the second complex transmission sequence 740 may be greater than that of the first complex transmission sequence 720. For example, the first complex transmission sequence 720 has a pulse timing of 300 μs and the second complex transmission sequence 740 has a pulse timing of 500 μs.

In various embodiments of the present disclosure, the electronic device (e.g., the MST control module 130 of the electronic device 100 shown in FIG. 1B) is capable of adjusting a pulse timing. Alternatively, the electronic device (e.g., the MST control module 130 of the electronic device 100 shown in FIG. 1B) is capable of adjusting a cycle of an MST signal. Alternatively, the electronic device is capable of performing emission in a simple transmission sequence. Alternatively, the electronic device is capable of performing emission in a complex transmission sequence. Alternatively, the electronic device is capable of combining a simple transmission sequence with a complex transmission sequence and performing the processes. For example, as shown in FIG. 7, the electronic device combines a simple transmission sequence with a complex transmission sequence 16 times for 20 seconds. It should be understood that the present disclosure is not limited by 16 times as the number of occurrences and 20 seconds as the period of time. One MST signal and other MST signals may differ from each other, in terms of at least one of the following type of data, cycle and pulse timing. For example, when an MST signal has a signal emission cycle of one second, another MST signal has a signal emission cycle of any other values, but not one second.

The MST signal may vary according to states of the electronic device, and the varied MST signal is emitted. For example, the electronic device obtains its location information (e.g., country code, internet protocol (IP) address, GPS data, and the like), recognizes its location using the obtained location information, and determines signal generating conditions (e.g., sequence combination, cycle, pulse timing, and the like) corresponding to the recognized location. For example, when the condition table has been stored in the memory of the electronic device, the processor obtains a condition corresponding to the recognized location from the condition table. The electronic device creates an MST signal based on the determined condition. In an embodiment of the present disclosure, the electronic device ascertains that a remaining battery capacity or a battery temperature. When a battery consumes its power or increases in temperature, the electronic device may emit a simple transmission sequence first. In an embodiment of the present disclosure, the electronic device may vary at least one of the following an emission cycle, pulse timing, and sequence, and emits an MST signal via cellular communication. For example, when the electronic device is implemented to perform GSM, it may adjust an emission cycle of an MST signal so that the MST signal cannot be affected by the time division multiple access (TDMA) cycle.

The MST signal may be varied and emitted by an external device located near the electronic device. For example, an electronic device (user equipment (UE)) receives characteristics of a POS terminal, related to, e.g., tracks, emission cycle, and the like, from a beacon terminal installed in a store, and adjusts at least one of the following an emission cycle, pulse timing, and sequence, based on the received values.

In an embodiment of the present disclosure, the electronic device alters an MST signal according to a type of card selected to make a payment and emits the altered MST signal. For example, a specific type of card (e.g., private label credit card (PLCC) is available only to pre-set stores. When a card available to a preset store is selected, the information regarding the selected card is transmitted to an external device (e.g., a payment server). In this case, the external device identifies the store using the received card information and transmits, to the electronic device, MST signal information corresponding to the store information. The electronic device alters at least one of the following an emission cycle, pulse timing and sequence, using the MST signal information received from the external device, and emits an MST signal. In an embodiment of the present disclosure, the MST signal information may be stored in the electronic device. For example, the electronic device has received MST signal information corresponding to stores from an external device (e.g., payment server). In this case, when a card available to only a pre-set store is selected, the electronic device identifies the store information via the selected card information, ascertains the MST signal information corresponding to the identified store information, varies at least one of the following, an emission cycle, pulse timing and sequence, to meet the MST signal information, and emits an MST signal.

Figure 8:
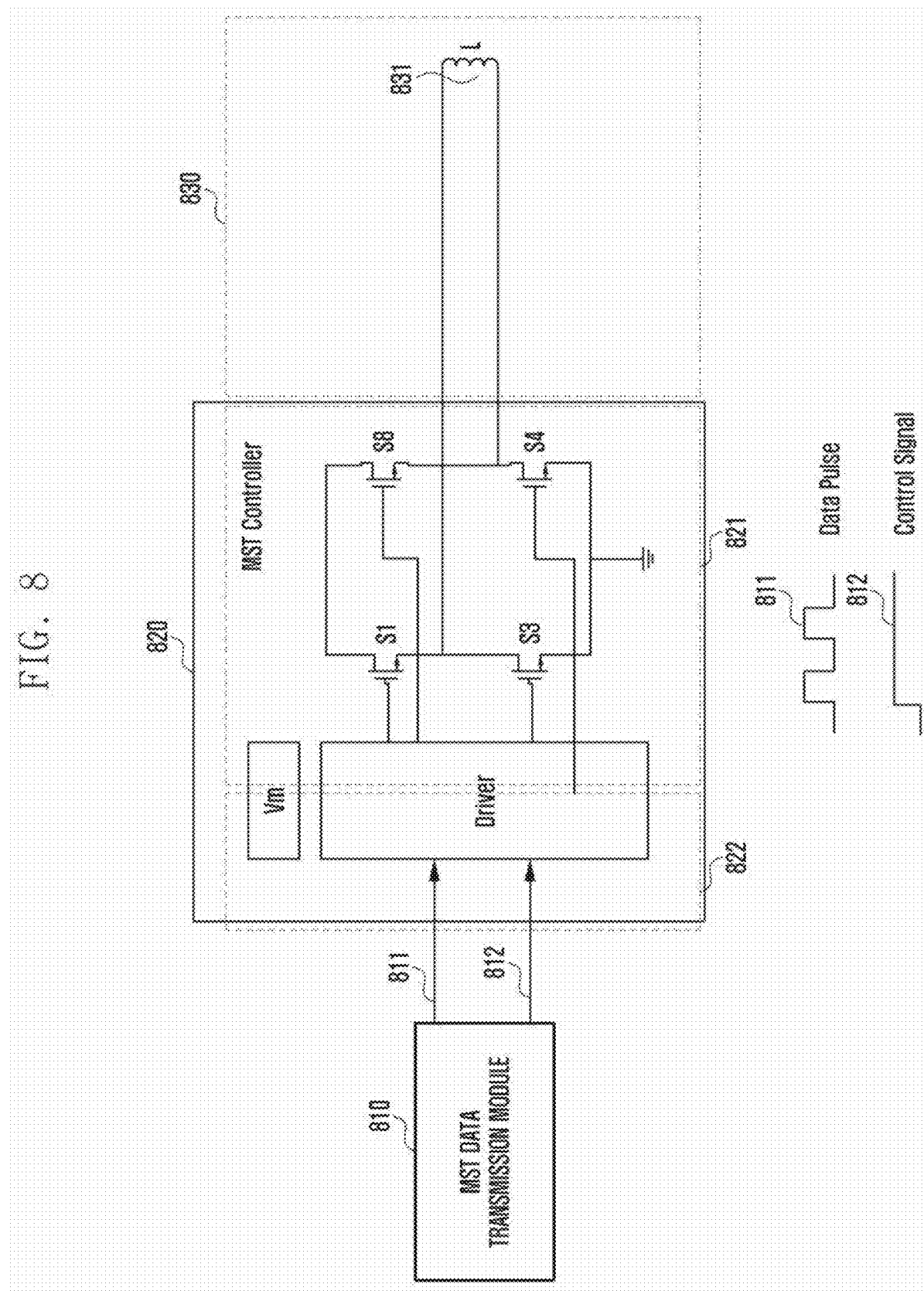
FIG. 8 is a diagram showing an electronic device capable of performing a payment function using MST according to various embodiments of the present disclosure.

FIG. 8 is a diagram showing an electronic device capable of performing a payment function using MST according to various embodiments of the present disclosure.

Referring to FIG. 8, an MST data transmission module 810 is capable of transmitting information required for payment (e.g., data shown in FIGS. 5A and 5B or 6A to 6C) to an MST control module 820. The MST data transmission module 810 may be a processor or a secure area (Trustzone, Secure World) in the processor. The MST data transmission module 810 may also be a security module (embedded secure element (eSE)/universal integrated circuit card (UICC)) embedded in an electronic device (e.g., the electronic device 100 shown in FIG. 1B). The MST data transmission module 810 is capable of transmitting, to the MST control module 820, a control signal 812, along with data pulse 811, for enabling an MST output module 830 to be activated for a required time (e.g., a period of time required to emit a preset number of MST signals periodically). In an embodiment of the present disclosure, the MST data transmission module 810 is capable of transmitting differential pairs of data which have different phases. In an embodiment of the present disclosure, the MST data transmission module 810 distinguishes Track 1, Track 2 or Track 3 data, contained in a magnetic card, from each other, based on times, and transmits them sequentially. Alternatively, the MST data transmission module 810 interleaves Track 1, Track 2 or Track 3 data with each other and transmits the interleaved results. In an embodiment of the present disclosure, the MST data transmission module 810 inverts at least part of the Track 1, Track 2 or Track 3 data (e.g., alters the order of 11110101 to 10101111) and then transmits the result. In an embodiment of the present disclosure, the MST data transmission module 810 may sequentially transmit the first simple transmission sequence 710, the first complex transmission sequence 720, the first simple transmission sequence 730 and the second complex transmission sequence 740, shown in FIG. 7.

In an embodiment of the present disclosure, a data reception module 822 of the MST control module 820 is capable of recognizing the state of the received pulse data, logical low/high, as data (e.g., a binary value of 0 or 1). Alternatively, the data reception module 822 detects the number of transitions between low and high states for a preset period of time, and recognizes the result as data. For example, when the data reception module 822 ascertains that the number of transitions between low and high state for a preset period of time is one and two, it recognizes the results as '0 (zero)' and '1 (one)' binary values, respectively.

In an embodiment of the present disclosure, the output transition module 821 of the MST control module 820 may include a circuit which transforms data recognized by the data reception module 822 to a corresponding format of data and transfers the transformed data to the MST module 830. The circuit is configured to include first, second, third and fourth switches S1, S2, S3 and S4. The first and fourth switches S1 and S4 may have the same control state. The second and third switch S2 and S3 may have the same control state. The polarity of voltage supplied to both ends of a coil antenna 831 may be altered according to the control states of the switches. In this case, the level of voltage supplied to the antenna is a logical value. For example, when a '0 (zero)' binary value is applied to the switches, the first and second switches are turned on and the second and third switches are turned off. Alternatively, when a '0 (zero)' binary value is applied to the switches, the first and second switches are turned off and the second and third switches are turned on. The output transition module 821 alters the polarity of voltage (direction of current) supplied to both ends of the coil antenna (L) according to the data recognized by the data reception module 822, and thus allows the coil antenna (L) to alter the direction of magnetic field emitted to an external device (e.g., POS terminal). This is a similar form as a magnetic field produced when a magnetic card is swiped over a POS terminal. The switches S1, S2, S3, and S4 may be implemented with N-type transistors, e.g., metal oxide semiconductor field effect transistor (MOSFET), P-type transistors, relays, and the like.

In an embodiment of the present disclosure, the MST output module 830 is capable of including a coil antenna L. The MST output module 830 may also include inductors, capacitors, resistors, and the like. In an embodiment of the present disclosure, the MST output module 830 may further include an amplifier for amplifying signals. The coil antenna L may also be used for NFC or wireless charging. In an embodiment of the present disclosure, a number of coil antennas may be employed by the module.

FIG. 9 illustrates results of measuring a signal emitted from an MST output module and a signal received by an external device according to various embodiments of the present disclosure.

Referring to FIG. 9, when an MST output module (e.g., MST output module 830 shown in FIG. 8) emits an MST signal 920 containing payment data, an external device (e.g., POS terminal) receives the signal 920 and recognizes data 910 based on the transition of the MST signal 920, e.g., rise time. In order to improve the recognition rate of an MST signal, the coil antenna may be optimized with an inductance value and the number of turns. For example, the inductance value may be greater than or equal to 10 µH.

Figures 10A, 10B, 10C:
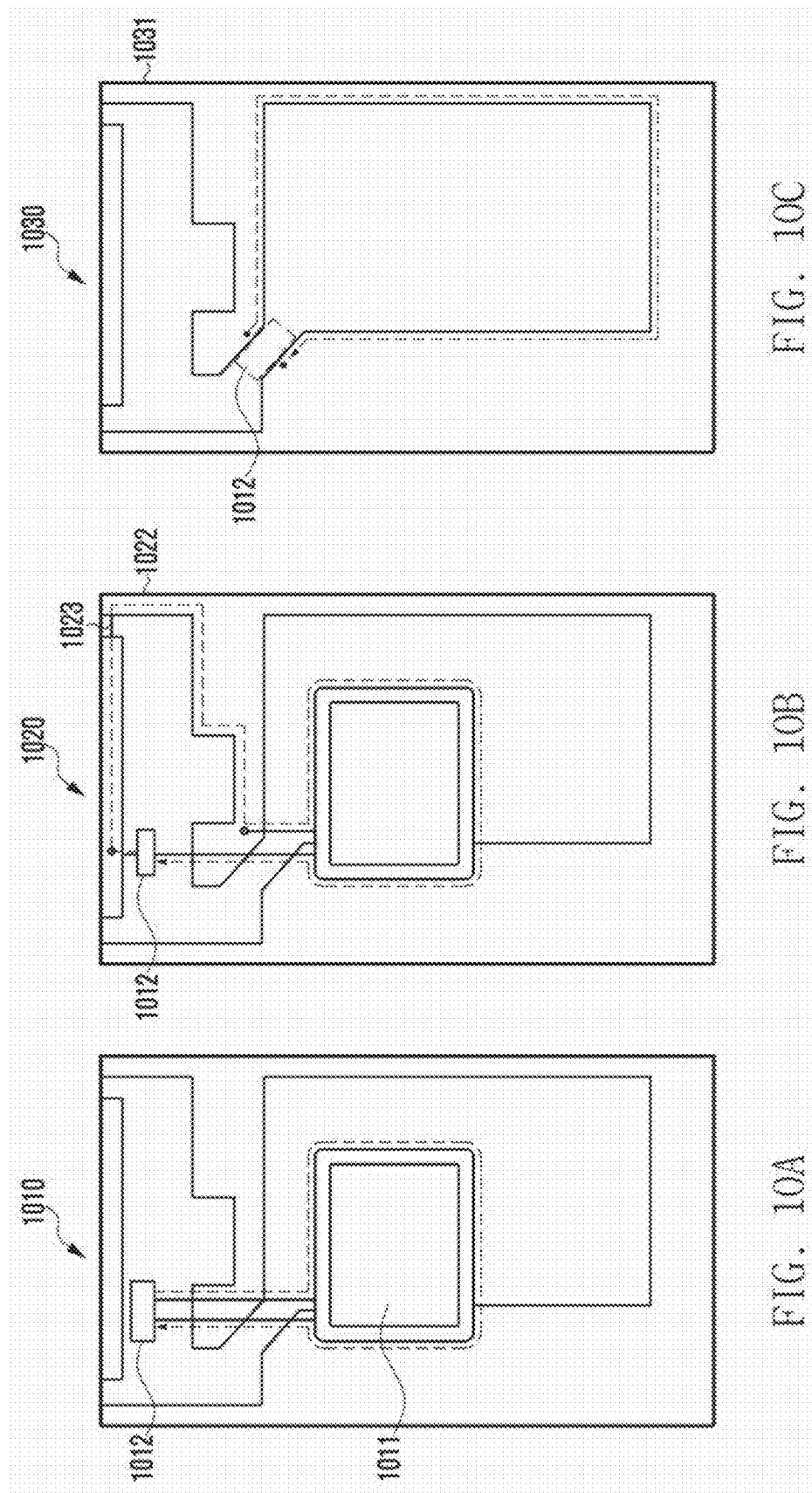
FIGS. 10A to 10C are diagrams showing various structures of loop antennas according to various embodiments of the present disclosure.

FIGS. 10A, 10B, and 10C are diagrams showing various structures of loop antennas according to various embodiments of the present disclosure. In various embodiments of the present disclosure, a loop antenna (e.g., a coil antenna) may be implemented as various forms for an electronic device (e.g., handheld electronic devices, a UE, and the like).

Referring to FIG. 10A, a loop antenna 1010 may be implemented in such a way that patterns are formed on flexible printed circuit board (FPCB) 1011. A path (or current path) indicted by dashed line is formed with the patterns on FPCB 1011 and is connected to an MST control module 1012 (e.g., MST control module 820 shown in FIG. 8). The FPCB 1011 may further include a loop antenna for wireless charging and NFC, in addition to a loop antenna for MST.

Referring to FIG. 10B, the loop antenna (e.g., a coil antenna 1020) may be implemented in such a way as to connect to at least part of physical components and the pattern of the FPCB 1021. For example, the outer case (e.g., a cover) of the electronic device may be implemented in such a way that its part 1022 is made of conduction materials (e.g., metal). When the conduction part 1022 is physically separated (electrically disconnected) from other parts, it may be electrically connected to them via a linking component 1023. The linking component 1023 may be passive elements, such as inductors, capacitors, and the like, or a conduction material structure.

Referring to FIG. 10C, the loop antenna (e.g., a coil antenna 1030) may be implemented in such a way as to use a part 1031 of a physical structure of the electronic device. The part 1031 of a physical structure may include a slit (not shown) to secure inductance required for communication. The part 1031 is connected to the MST control module 1012 via a current path formed near the slit.

Figure 11:
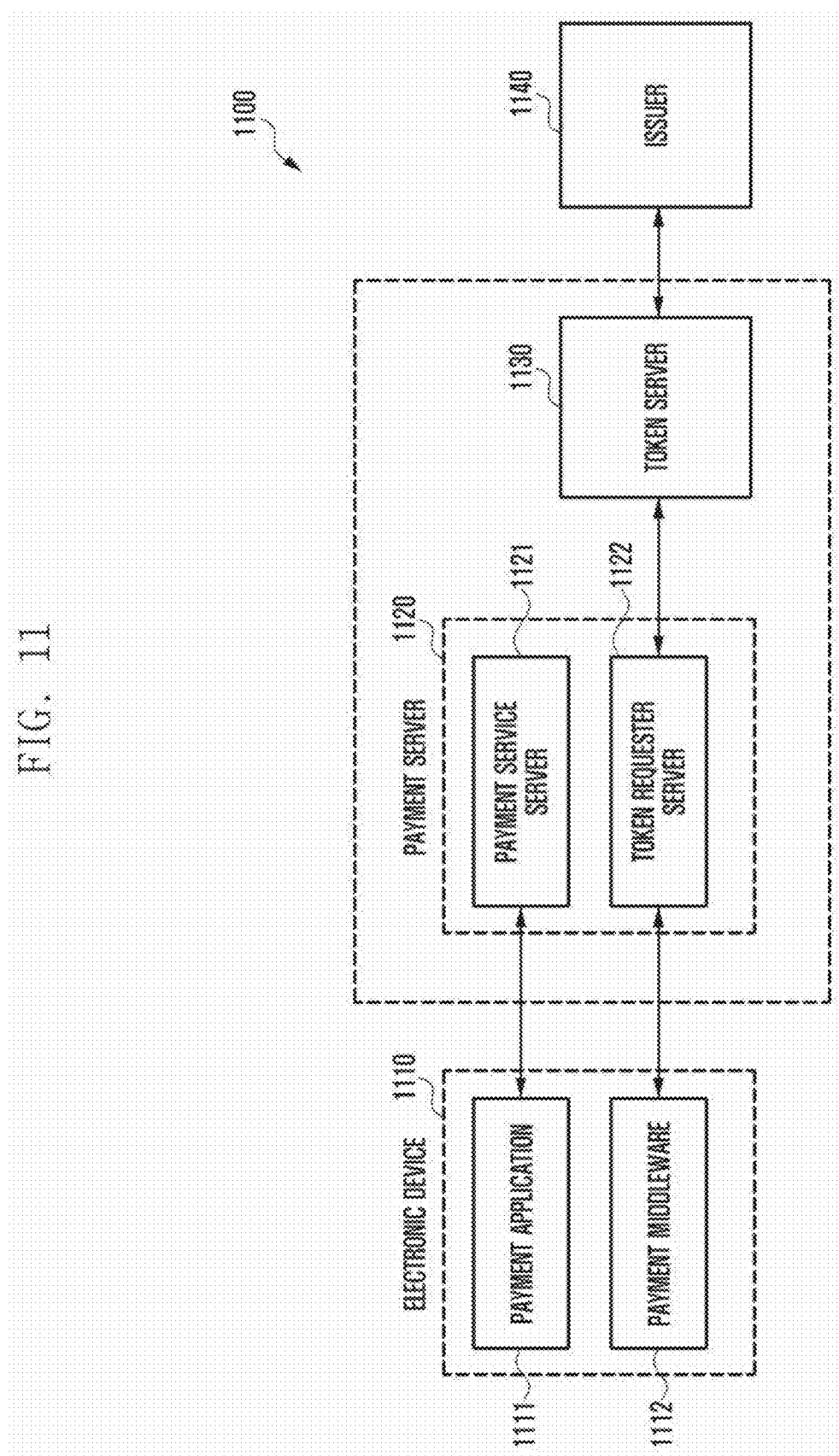
FIG. 11 is a block diagram showing a payment system according to various embodiments of the present disclosure.

FIG. 11 is a block diagram showing a payment system according to various embodiments of the present disclosure.

Referring to FIG. 11, a payment system 1100 is capable of including an electronic device 1110 (e.g., the electronic device 11 shown in FIG. 1A) and/or a server. The electronic device 1110 is capable of including a payment application (wallet application) 1111 and/or payment middleware 1112. The server is capable of including a payment server 1120, a token server (token service provider (TSP)) 1130, and an issuer 1140. The payment server 1120 is capable of including a payment service server 1121 and/or a token requester server (token requester) 1122.

In various embodiments of the present disclosure, the payment application 1111 may include, for example, Samsung Pay Application. The payment application 1111 is capable of providing user interface (UI) or user experience (UX) related to payment. The payment-related UI may include wallet UI/UX. For example, the payment application 1111 may provide UI related to card registration, payment, transaction, and the like. The payment application 1111 may provide interface related to card registration using an OCR or external inputs (e.g., user inputs). The payment application 1111 may provide interface related to user authentication via identification & verification (ID&V).

In various embodiments of the present disclosure, the electronic device 1110 is capable of performing payment or transaction, using the payment application 1111. For example, the payment application 1111 may provide the user with a payment function by executing a preset application or via Simple Pay or Quick Pay omitting at least part of the functions of the application. The user of the electronic device 1110 runs the payment application 1111 to make a payment and is provided with information related to the payment function.

In various embodiments of the present disclosure, the payment middleware 1112 may include information related to card issuing companies. For example, the payment middleware 1112 may include a software development kit (SDK) of a card issuing company.

In various embodiments of the present disclosure, the payment server 1120 is capable of including a management server configured to perform electronic payment or mobile payment. The payment server 1120 is capable of receiving payment-related information from the electronic device 1110 and transmitting it to the outside or processing it.

In various embodiments of the present disclosure, the payment server 1120 is capable of transmitting information between the electronic device 1110 and the token server 1130, using the payment service server 1121 and/or the token requester server 1122. The payment service server 1121 is capable of including a payment server 1120 (e.g., Samsung payment server). The payment service server 1121 is capable of managing card information associated with a user's account or service accounts (e.g., Samsung account). The payment service server 1121 is capable of including an API server (not shown) related to the payment application 1111. The payment service server 1121 is capable of providing an account managing module (e.g., account integration or Samsung account integration).

In various embodiments of the present disclosure, the token requester server 1122 is capable of providing interface for processing payment-related information. For example, the token requester server 1122 is capable of performing issuing, deleting or activating payment-related information (e.g., token). The token requester server 1122 is capable of controlling information required for payment, while being functionally connected with the payment middleware 1112.

In various embodiments of the present disclosure, the payment application 1111 of the electronic device 1110 is functionally connected to the payment service server 1121 of the payment server 1120. For example, the payment application 1111 is capable of transmitting/receiving payment-related information to/from the payment server 1120. In an embodiment of the present disclosure, the payment middleware 1112 of the electronic device 1110 is functionally connected to the token requester server 1122 of the payment server 1120. For example, the payment middleware 1112 is capable of transmitting/receiving payment-related information to/from the token requester server 1122.

In various embodiments of the present disclosure, the token server 1130 is capable of issuing or managing payment-related information (e.g., token). For example, the token server 1130 is capable of controlling a life cycle of token, including creating, modifying, or deleting. The token server 1130 is capable of including a token managing server. In this case, the token server 1130 is capable of performing token-provisioning, authentication via ID&V, replenishment, management of life cycle, and integration of banking servers.

In various embodiments of the present disclosure, the payment server 1120 and/or the token server 1130 may be located in the same area or a similar area or in separated individual areas. For example, the payment server 1120 may be included in a first server and the token server 1130 may be included in a second server. Alternatively, the payment server 1120 and/or the token server 1130 may be implemented within one server (e.g., a first server or a second server), but distinguished from each other therein.

In various embodiments of the present disclosure, the issuer (banking sever) 1140 is capable of issuing cards. For example, the issuer 1140 is capable of including a card issuing server. The issuer 1140 is capable of creating payment-related information to be provided to users. The payment-related information created by the issuer 1140 may be stored in the electronic device 1110 by using the payment application 1111. The issuer 1140 is functionally connected to the token server 1130 and transmits/receives payment-related information thereto/therefrom.

Although it is not shown, the electronic device 1110 may also transmit/receive, to/from the payment server 1120, payment-related data, or track information (Track 1, Track 2, and Track 3), as binary values.

Figure 12:
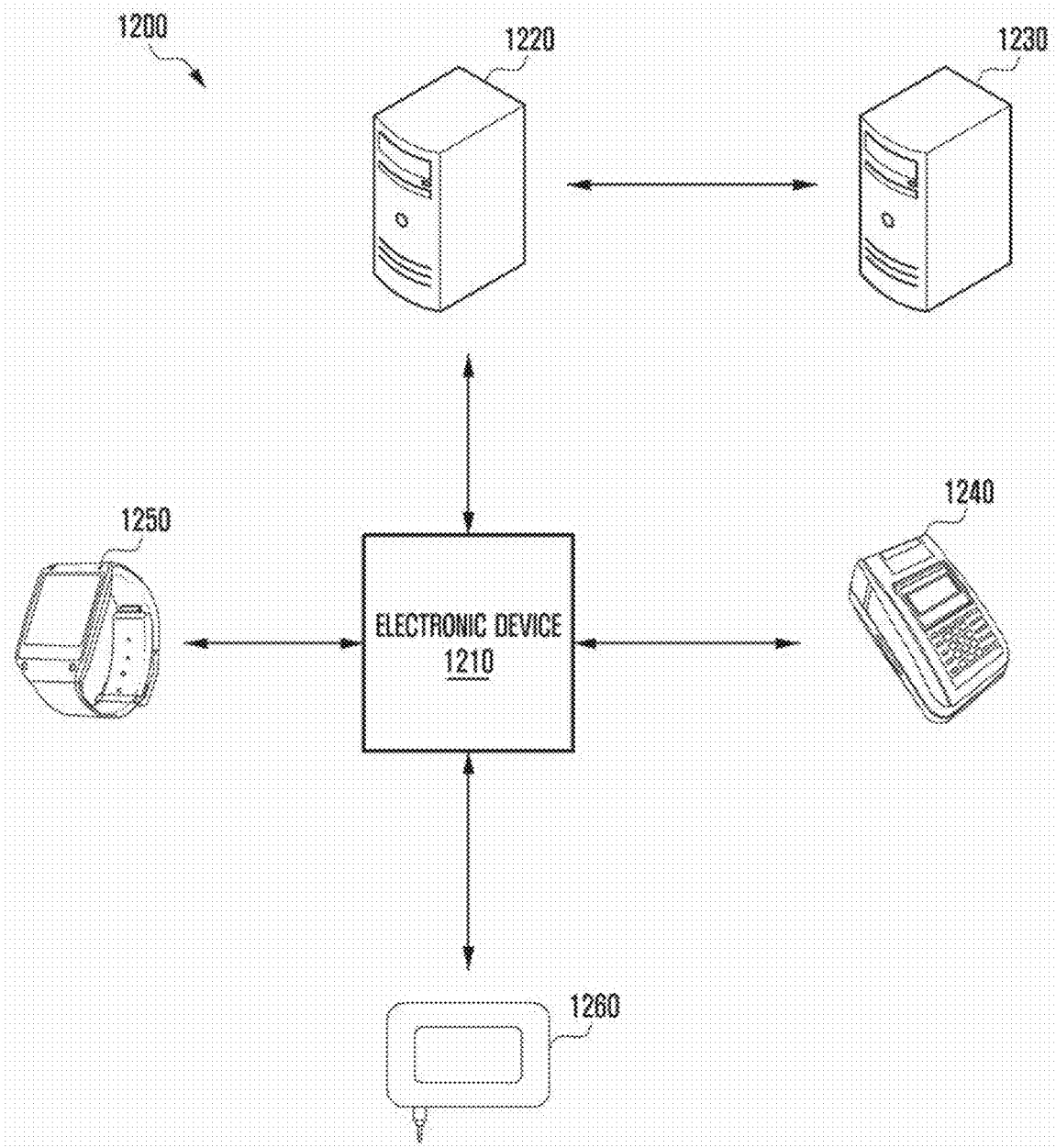
FIG. 12 is a diagram showing a network with a payment system according to various embodiments of the present disclosure.

FIG. 12 is a diagram showing a network with a payment system according to various embodiments of the present disclosure.

Referring to FIG. 12, a payment system 1200 is capable of including an electronic device 1210 (e.g., the electronic device 11 shown in FIG. 1A), a payment service server 1220, a TSP 1230 and a POS terminal 1240. In an embodiment of the present disclosure, the payment system 1200 may further include one or more electronic devices, e.g., electronic devices 1250, 1260, and the like. For example, the electronic device 1250 may be a wearable device (e.g., a smart watch) functionally connected (e.g., via communication) to the electronic device 1210. The electronic device 1260 may be an accessory (e.g., loop pay).

In an embodiment of the present disclosure, the electronic device 1210 is capable of performing a payment function. The electronic device 1210 is capable of registering a payment card (e.g., a master card, a visa card, and the like) therein or in the payment service server 1220 (e.g., a first external device). The payment service server 1220 is capable of managing information regarding a number of cards, e.g., the card registered by the electronic device 1210, another card registered by another electronic device (e.g., the electronic device 1250) of the user of the electronic device 1210, cards registered by other users' electronic devices, and the like. In an embodiment of the present disclosure, the payment service server 1220 is capable of obtaining a token corresponding to the registered card information from the TSP 1230 (e.g., a second external device), and transmitting it to the electronic device 1210.

The TSP 1230 is capable of issuing a token used in the payment process. In an embodiment of the present disclosure, a token refers to a value substituting a primary account number (PAN) as information regarding a card. In an embodiment of the present disclosure, a token may be created by using a bank identification number (BIN), and the like. The created token may be encoded by the TSP 1230. Alternatively, the created token may be transferred, without being encoded, to the payment service server 1220, and then encoded by the payment service server 1220. The encoded token is transmitted to the electronic device 1210 via the payment service server 1220. The electronic device 1210 decodes the encoded token. In an embodiment of the present disclosure, the token is created and encoded in the TSP 1230 and the processed token is transmitted to the electronic device 1210, not through the payment service server 1220. In an embodiment of the present disclosure, the payment service server 1220 may be equipped with a token creating function. In this case, the payment system 1200 may be implemented without the TSP 1230.

In a state where the electronic device 1210 is functionally connected to other electronic devices 1250 and 1260 via short-range wireless communication (e.g., BT or Wi-Fi), the electronic device 1210 is capable of making a payment using at least one of the other electronic devices 1250 and 1260. In an embodiment of the present disclosure, an example of the other electronic device 1250 (e.g., a third external device) is a wearable device (e.g., a smart watch). In this case, the electronic device 1210 is capable of making a payment, cooperating with the wearable device. For example, the electronic device 1210 may transmit a card image to the smart watch. The smart watch may transmit a payment command signal in response to the transmission of a card image to the electronic device 1210. The electronic device 1210 receives the payment command signal and emits an MST signal. In an embodiment of the present disclosure, an example of the other electronic device 1260 (e.g., a fourth external device) is an accessory (e.g., Loop-Pay™ fob). In this case, the electronic device 1210 is functionally connected to the accessory (e.g., loopy fob) via the input/output interface (e.g., earphones).

Figure 13:
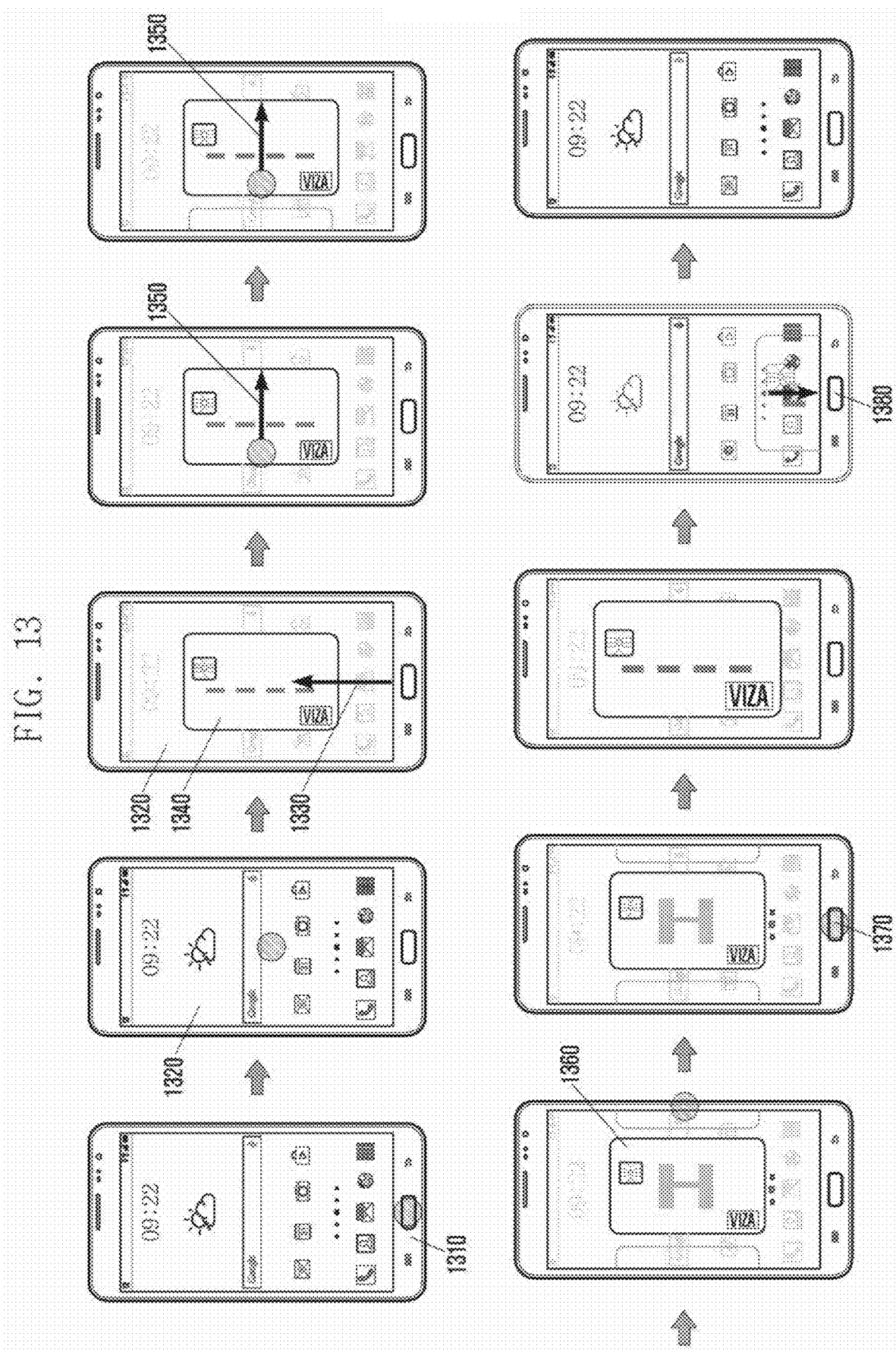
FIG. 13 illustrates diagrams that describe a method of interacting with a payment user interface (UI) of an electronic device according to various embodiments of the present disclosure.

FIG. 13 shows diagrams that describe a method of interacting with a payment UI of an electronic device according to various embodiments of the present disclosure.

Referring to FIG. 13, an electronic device 1310 (e.g., the electronic device 11 shown in FIG. 1A) receives user inputs and runs a payment application. For example, the electronic device 1310 may run a payment application (e.g., Samsung Pay) in response to a user input 1330 (e.g., a swipe on the bezel area 1210 toward a display 1320). Alternatively, the electronic device 1310 may show, on the display 1320, a card image 1340 corresponding to at least one of the cards registered therein, in response to a user input 1330.

In an embodiment of the present disclosure, the electronic device 1310 is capable of selecting one of a number of registered cards as a payment card to make a payment, in response to a user input. For example, the electronic device 1310 selects a card to make a payment in response to a user input 1350 (e.g., a side scrolling), and shows the corresponding card image 1360. The electronic device 1310 may request the user to make an authentication in order to make a payment using the selected card. The authentication may be performed using the user's biometric information. For example, the electronic device 1310 scans the user's fingerprint 1370 via a fingerprint detecting module in order to make a payment. When the user has been authenticated by the fingerprint detecting module, the electronic device 1310 may perform emission in a simple transmission sequence (e.g., transmitting an MST signal containing Track 2 information a certain number of times).

In an embodiment of the present disclosure, the user authentication may be re-performed in order to re-perform the payment process. For example, when the user authentication is terminated which is because a certain period of time has elapsed, the electronic device 1310 may alter the current method, transmitting the MST signal again. For example, the electronic device 1310 may alter an emission cycle or a pulse timing. Alternatively, the electronic device 1310 may alter information contained in an MST signal to information according to a complex transmission sequence. In an embodiment of the present disclosure, in order to re-perform a payment operation, the user may separate the electronic device 1310 from the terminal and then tag it thereto again. The user's tagging operation may be detected by various types of sensors installed to the electronic device 1310 (e.g., acceleration sensor 103, gyro sensor 105, proximity sensor, heart rate monitor (HRM) sensor, and the like). In response to the tagging operation, the electronic device 1310 alters an MST signal in at least one of the following an emission cycle, pulse timing and sequence, and emits the altered MST signal. Each time that the user performs a tagging operation, the electronic device 1310 alters the MST signal in at least one of the following, an emission cycle, pulse timing and sequence, and emits the altered MST signal.

In an embodiment of the present disclosure, when the user authentication has been completed, the electronic device 1310 is capable of simultaneously or sequentially transmitting NFC and MST signals. For example, a processor (e.g., the processor 150 shown in FIG. 1B) of the electronic device controls an NFC control module (e.g., 140 shown in FIG. 1B) and an MST control module (e.g., 130 shown in FIG. 1B) to activate an NFC module (e.g., 120 shown in FIG. 1B) (e.g., NFC module is set in polling mode) in order to detect a card reading apparatus, and simultaneously creates an MST signal via the MST module (e.g., 110 shown in FIG. 1B). The processor determines whether it receives a signal (e.g., a ping) from the card reading apparatus via the NFC module. When the processor ascertains that it receives a signal (e.g., a ping), it stops the operation of the MST module. The processor may provide information regarding a card to make a payment to the card reading apparatus (e.g., NFC reader) via the NFC module. On the other hand, when the processor ascertains that it has not received a signal (e.g., a ping), it controls the MST control module to create an MST signal containing payment information.

In an embodiment of the present disclosure, when payment has been completed, the user presses the button (e.g., a home button 1380) of the electronic device, thereby ending the payment application. Alternatively, when payment has been completed, the electronic device 1310 (UE) detects the payment completion and thus stops creating an MST signal. For example, when a card issuing company has ascertained that payment has been made, it informs the UE of the payment result via a network, so that the UE stops creating an MST signal. The result of payment may be transmitted to the UE, by a value added network (VAN), a POS terminal, and the like, in addition to a card issuing company.

Figure 14:
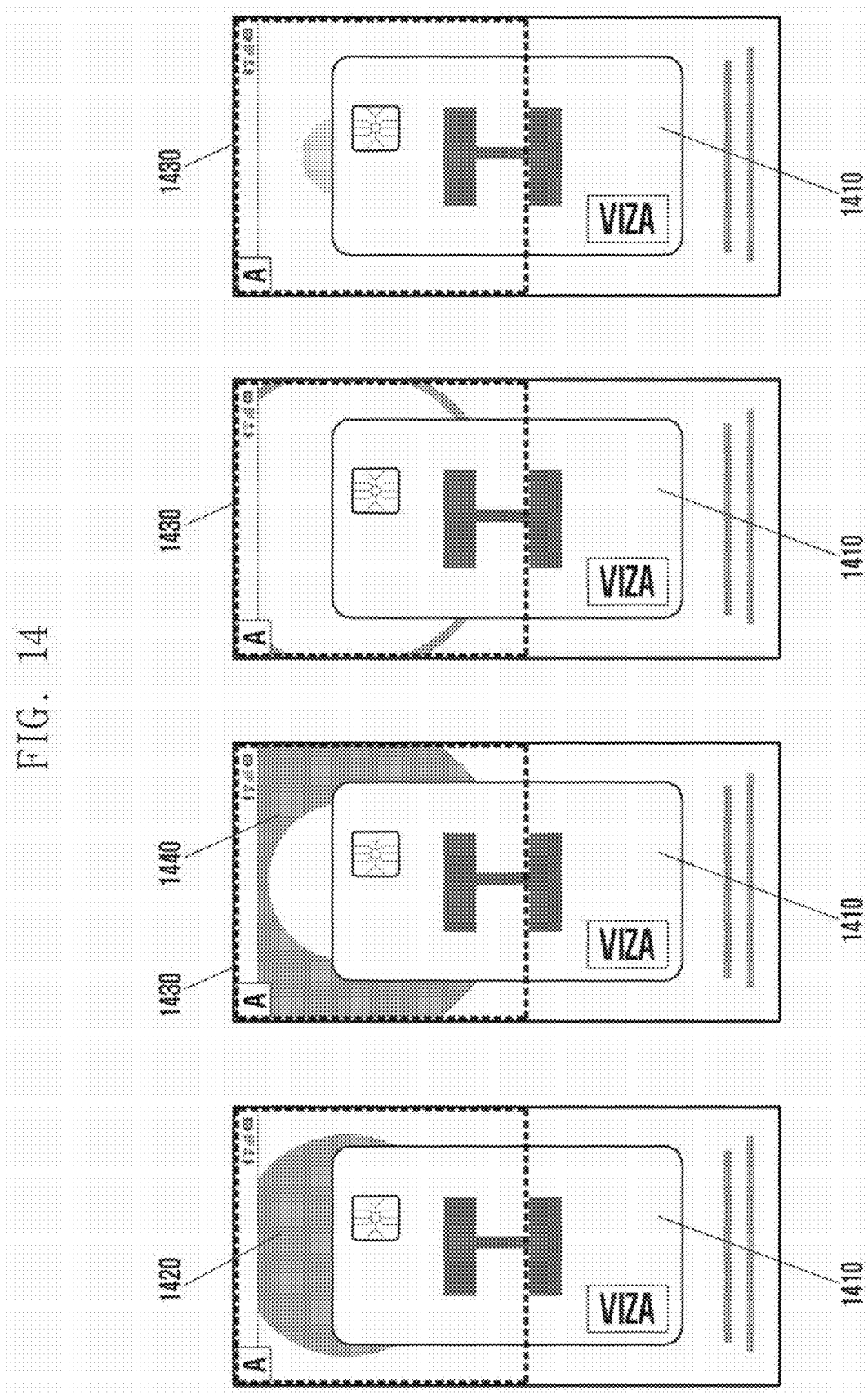
FIG. 14 illustrates diagrams that describe a method of interacting with a payment UI of an electronic device according to various embodiments of the present disclosure.

FIG. 14 illustrates diagrams that describe a method of interacting with a payment UI of an electronic device according to various embodiments of the present disclosure.

Referring to FIG. 14, while payment is in progress after the user authentication is completed, the electronic device may display a state that payment is possible (or a state that payment information is in transmission to an external device from the electronic device. For example, an electronic device (e.g., the electronic device 11 shown in FIG. 1A) displays a part 1420 of a translucent circle behind a card image 1410 on the screen and shows an effect 1440 as the circle increases in size in the box 1430. The box 1430 may correspond to the location of a loop antenna emitting an MST signal. The use may recognize the location of the antenna, referring to the box 1430. The user may recognize that payment is ongoing, referring to the effect 1440 as the circle increase in size within the box 1430.

Figure 15C:
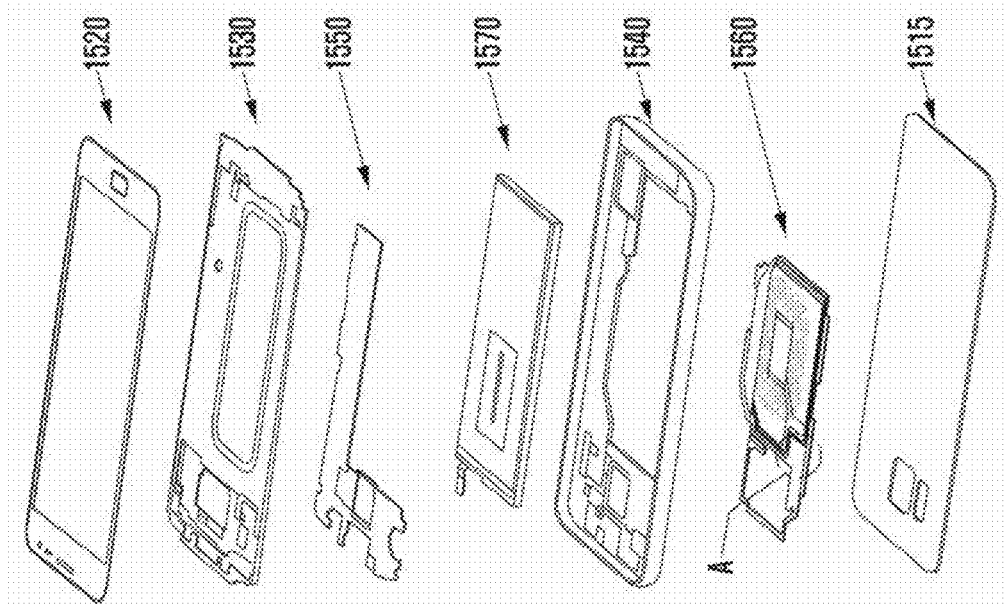
FIGS. 15A to 15C are diagrams showing configurations of a handheld electronic device with an antenna for magnetic payment and the antenna according to various embodiments of the present disclosure.
Figure 15A:
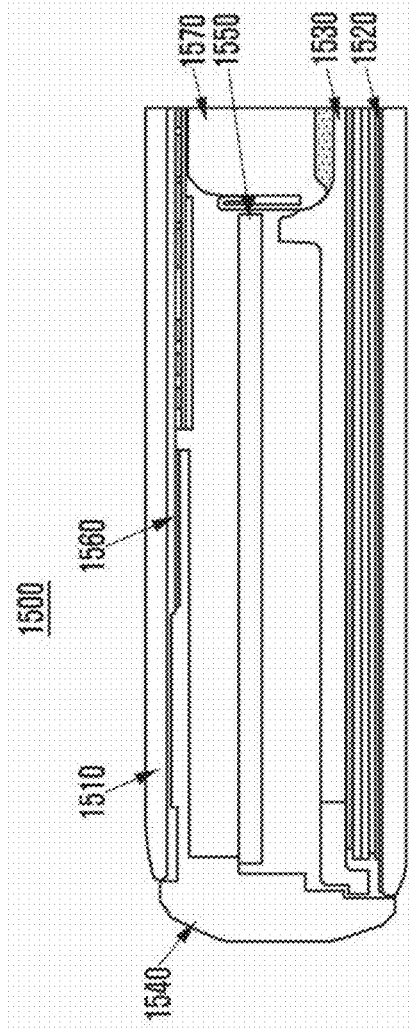
Figure 15B:
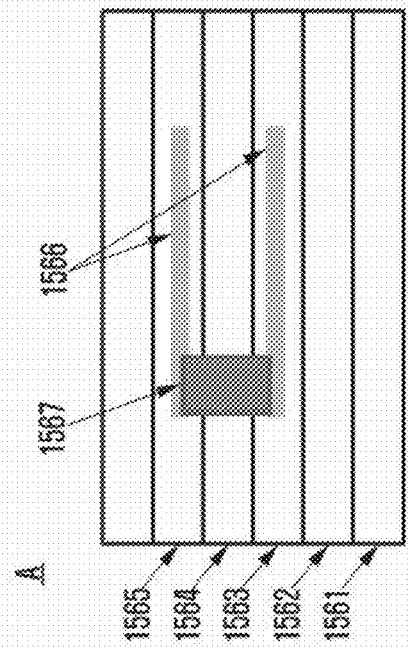

FIGS. 15A, 15B, and 15C are diagrams showing configurations of an electronic device with an antenna for magnetic payment and the antenna according to various embodiments of the present disclosure.

Referring to FIGS. 15A and 15B, an electronic device 1500 (e.g., the electronic device 11 shown in FIG. 1A) is capable of including an upper housing 1510, a lower housing 1520, and a side housing 1540, located to disclose at least part of the appearance of the electronic device 1500, and an internal support 1530 located inside the handheld electronic device. The side housing 1540 is made of a single material or a mixture of heterogeneous materials. The side housing 1540 may be arranged to support at least part of the upper housing 1510 and the lower housing 1520. The internal support 1530 is made of a single material or a mixture of heterogeneous materials. The internal support 1530 may be arranged to support at least part of the lower housing 1520. At least part of the upper housing 1510 and the lower housing 1520 may include the display area. For example, a display module (e.g., display module 16 shown in FIG. 1A) may be disclosed through a part of the upper housing 1510. The upper housing 1510, side housing 1540 and the support 1530 form an enclosure. The enclosure is capable of including a PCB 1550 and a battery 1570.

In various embodiments of the present disclosure, the electronic device 1500 is capable of including an antenna (e.g., a coil antenna) 1560 for magnetic payment. The antenna 1560 is located to cover at least part of the side housing 1540 and the battery 1570. The antenna 1560 is connected to the PCB 1550 through an opening of the side housing 1540 to make a communication of data for payment with a communication module (e.g., MST control module 130 shown in FIG. 1B) or a processor (e.g., processor 150 shown in FIG. 1B) located on the PCB 1550. The side housings 1540 and the upper housing 1510 may be formed in such a way that part of the area to which the antenna 1570 is attached differs in height or thickness from the surrounding area.

In various embodiments of the present disclosure, the side housing 1540 may be formed in such a way that an area where a coil (e.g., a metal pattern) of the antenna 1560 is located is made of a material that differs from that of another area where the coil is not located. For example, the area where the coil of the antenna 1560 is located may include a non-conductive material (e.g., plastic). The area where the coil of the antenna 1560 is not located may include a conductive material (e.g., metal).

Referring to FIG. 15C, the antenna 1560 may be formed using an FPCB including multi-layers 1563~1565. At least one of the multi-layers 1563~1565 is capable of including a chip via 1567 and wires 1566 forming an antenna coil. The antenna 1560 may be configured with a single coil. The antenna 1560 may also be configured with two or more coils that differ from each other. In various embodiments of the present disclosure, the antenna 1560 is capable of including a layer 1561 for shielding noise. The shield layer 1561 may be formed with a material, such as graphite, and the like. In an embodiment of the present disclosure, the antenna 1560 may further include a magnetic body layer 1562 for increasing the intensity of magnetic field signals produced by the coil. The magnetic body layer 1562 may be formed with a permanent magnet, ferromagnetic material, and the like.

In an embodiment of the present disclosure, a fingerprint sensor for authenticating a payment card or the user may be included in a home key on the front side, a key on the side, or a key on the back 1515 of the electronic device. Alternatively, the fingerprint sensor may be included in at least part of the display panel.

Figure 16A:
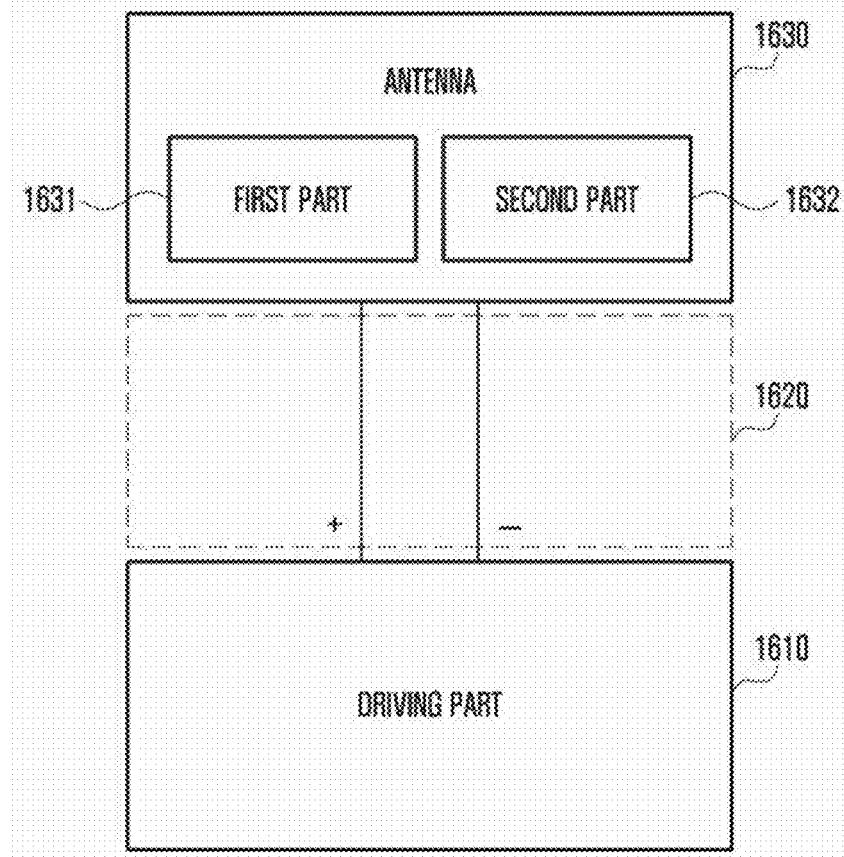
FIGS. 16A and 16B are diagrams showing configurations of an MST module with one antenna according to various embodiments of the present disclosure.
Figure 16B:
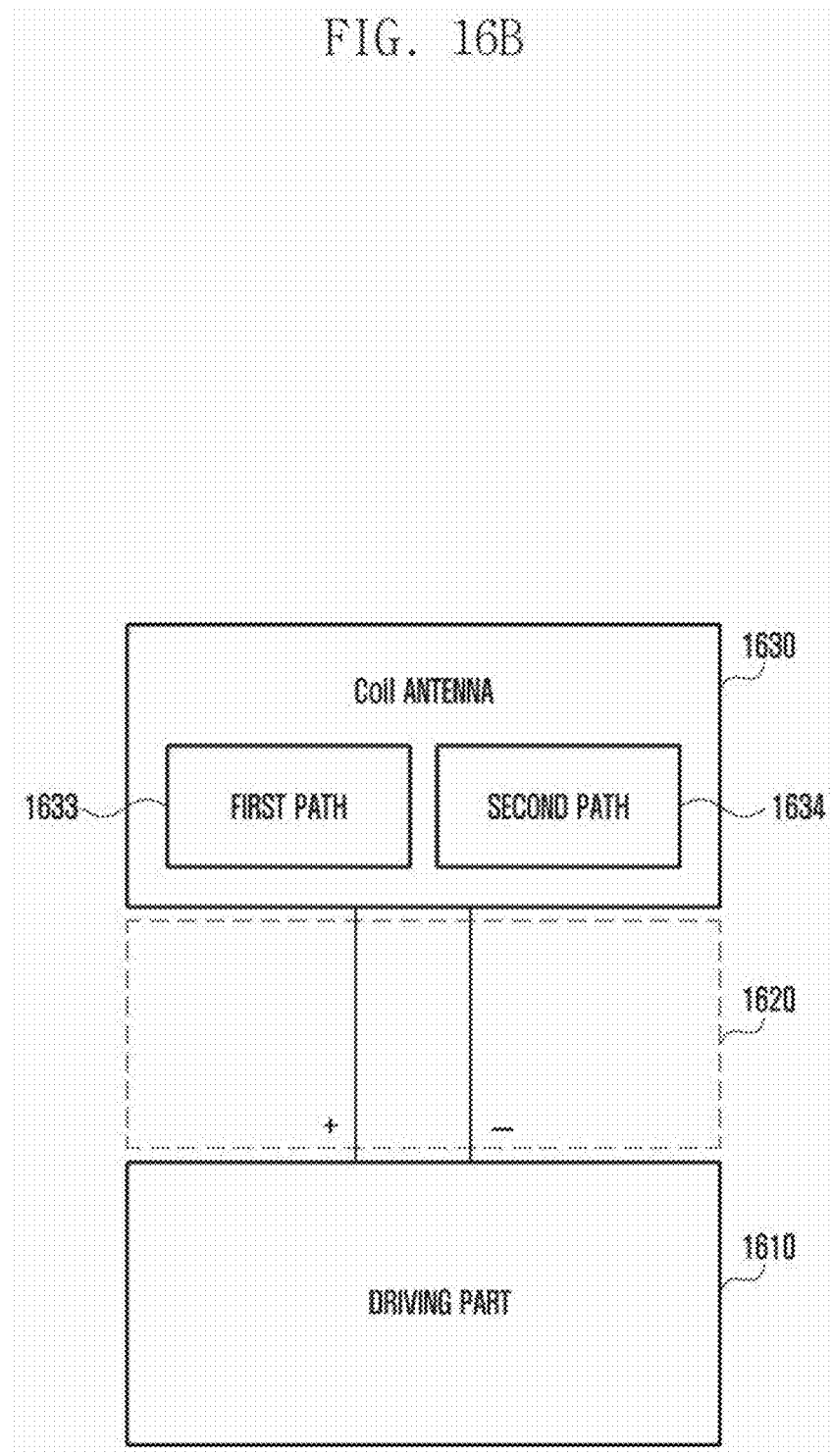

FIGS. 16A and 16B are diagrams showing configurations of an MST module with one antenna according to various embodiments of the present disclosure.

Referring to FIGS. 16A and 16B, an MST module (e.g., the MST module 110 shown in FIG. 1B) is capable of including a driving part 1610, a linking part 1620 and an antenna 1630. The linking part 1620 flows electric current from the driving part 1610 to the antenna 1630. The antenna 1630 produces a magnetic field by the received current and emits an MST signal of a particular frequency to the outside. For example, the antenna 1630 receives sequences shown in FIG. 7 from the driving part 1610 via the linking part 1620, coverts the sequences into radio frequency (RF) signals, and sequentially emits the RF signals to the outside.

In an embodiment of the present disclosure, the antenna 1630 may be designed to produce different intensities of magnetic fields from one part to another. For example, as shown in FIG. 16A, when the antenna 1130 receives electric current, its first part 1631 and second part 1632 may produce different intensities of magnetic fields from each other.

In an embodiment of the present disclosure, the antenna 1630 may be designed to form a number of paths (current paths) from one part to another. For example, as shown in FIG. 16B, when the coil antenna 1630 receives electric current, one part of the coil antenna 1630 forms a first path 1633 and another part of the coil antenna 1630 forms a second path 1634.

FIGS. 17A and 17B are diagrams showing configurations of an MST module with two loop antennas according to various embodiments of the present disclosure.

Referring to FIGS. 17A and 17B, an MST module (e.g., the MST module 110 shown in FIG. 1B) is capable of including a driving part 1710, a linking part 1720, a first antenna 1730 and a second antenna 1740.

In an embodiment of the present disclosure, the first antenna 1730 and the second antenna 1740 may transmit the same MST signal. Referring to FIG. 17A, the driving part 1710 forms a first electrode 1711 and a second electrode 1712. The linking part 1720 electrically connects the first electrode 1711 to the first antenna 1730 and the second antenna 1740, and the second electrode 1712 to the first antenna 1730 and the second antenna 1740. The first antenna 1730 and the second antenna 1740 receive electric current from the first electrode 1711 or the second electrode 1712 via the linking part 1720, produce magnetic fields by the received current, and emit magnetic field signals (MST signals) of particular frequencies, respectively. For example, the first antenna 1730 and the second antenna 1740 receive sequences shown in FIG. 7 from the driving part 1710 via the linking part 1720, coverts the sequences into RF signals, and sequentially emits the RF signals to the outside In an embodiment of the present disclosure, the first antenna 1730 and the second antenna 1740 may transmit different MST signals, respectively. Referring to FIG. 17B, the driving part 1710 forms a pair of electrodes, third electrode 1713 and fourth electrode 1714, and another pair of electrodes, fifth electrode 1715 and sixth electrode 1716. The linking part 1720 electrically connects the third electrode 1713 and fourth electrode 1714 to the first antenna 1730, and the fifth electrode 1715 and sixth electrode 1715 to the second antenna 1740. The first antenna 1730 receives current from the third electrode 1713 or the fourth electrode 1714 via the linking part 1720, produces a magnetic field by the received current, and emits an RF signal of a particular frequency to the outside. Similarly, the second antenna 1740 receives current from the fifth electrode 1715 or the sixth electrode 1715 via the linking part 1720, produces a magnetic field by the received current, and emits an MST signal of another frequency to the outside. For example, the sequences shown in FIG. 7 may be emitted in the following order the first simple transmission sequence 710 by the first antenna 1730, the first complex transmission sequence 720 by the second antenna 1740, the second simple transmission sequence 730 by the first antenna 1730, and the second complex transmission sequence 740 by the second antenna 1740. Alternatively, the sequences shown in FIG. 7 may be emitted in the following order: the first simple transmission sequence 710 and the second complex transmission sequence 720 sequentially by the first antenna 1730, and the second simple transmission sequence 730 and the second complex transmission sequence 740 sequentially by the second antenna 1740.

Figure 18:
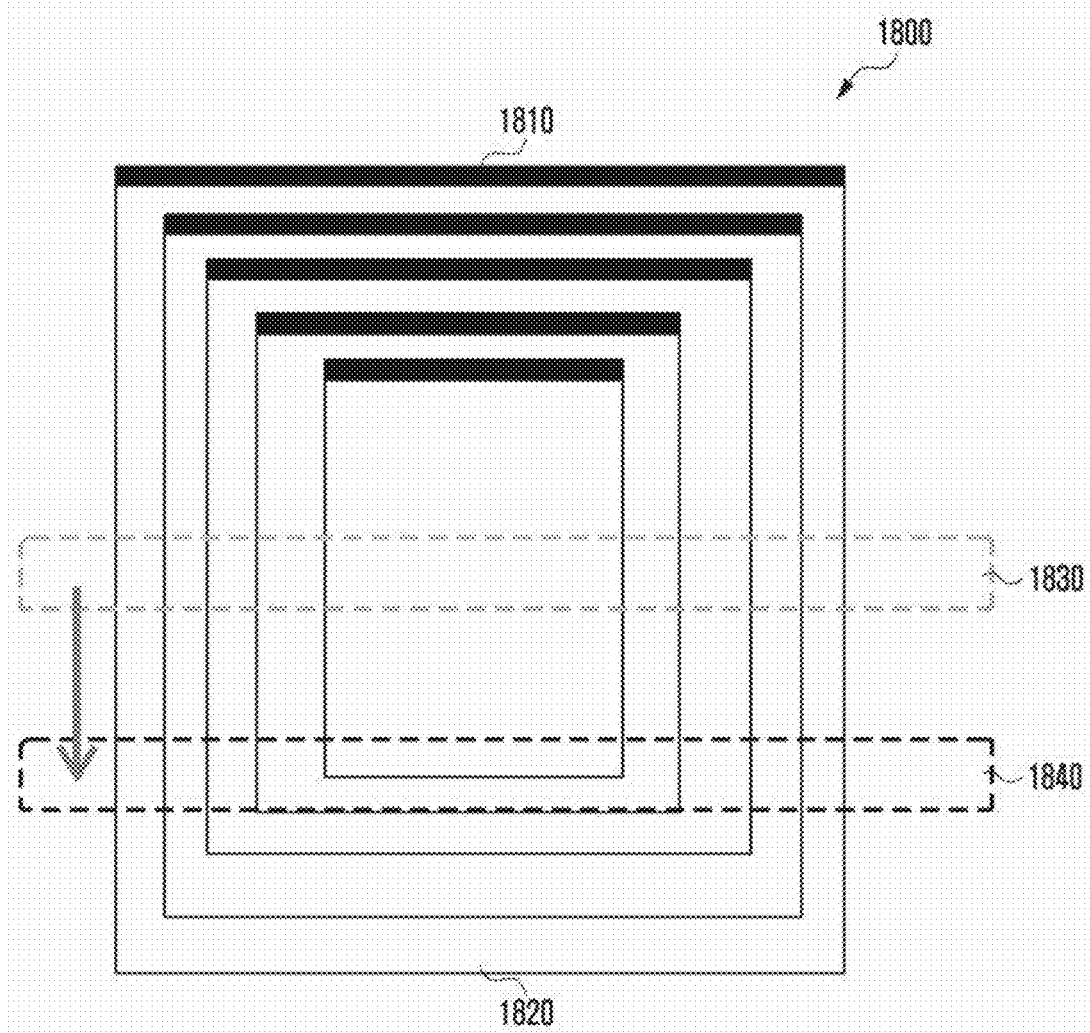
FIG. 18 is a diagram showing a loop antenna according to various embodiments of the present disclosure.

FIG. 18 is a diagram showing a loop antenna according to various embodiments of the present disclosure.

Referring to FIG. 18, a loop antenna 1800 may be designed to produce different intensities of magnetic fields from one part to another. This indicates that the null point of the loop antenna 1800 may be formed in different locations according to the parts in the electronic device. For example, as shown in FIG. 18, the antenna pattern (e.g., coil) of a first part 1810 is implemented to have a width greater than the antenna pattern of second part 1820. In this case, the first part 1810, through which current flows, has a smaller electrical resistance than the second part 1820. Therefore, the first part 1810 produces a higher intensity of magnetic field than the second part 1820 does. In this case, a null point of the loop antenna 1800 may be formed in a bottom portion 1840 of the electronic device, not in a center portion 1830. For example, when the width of the antenna pattern of the first part 1810 is identical in size to that of the antenna pattern of the second part 1820, the null point may be formed in the center portion 1830 of the electronic device. When the width of the antenna pattern of the first part 1810 is greater than that of the antenna pattern of the second part 1820, the null point may be formed in the bottom portion 1840 of the electronic device. For example, as shown in FIG. 14, while payment is in progress, the electronic device (e.g., the electronic device 100 as shown in FIG. 1B) displays an MST recognition range (e.g., an area between the center and the top of the electronic device, corresponding to the box 1430) on the screen, and this allows the user to easily recognize the MST recognition range and move the electronic device near the reader. Therefore, the loop antenna system makes the electronic device improve the MST recognition rate.

FIGS. 19A, 19B, 19C, 19D, 19E, 19F, and 19G are diagrams showing structures of loop antennas according to various embodiments of the present disclosure.

Figure 19A:
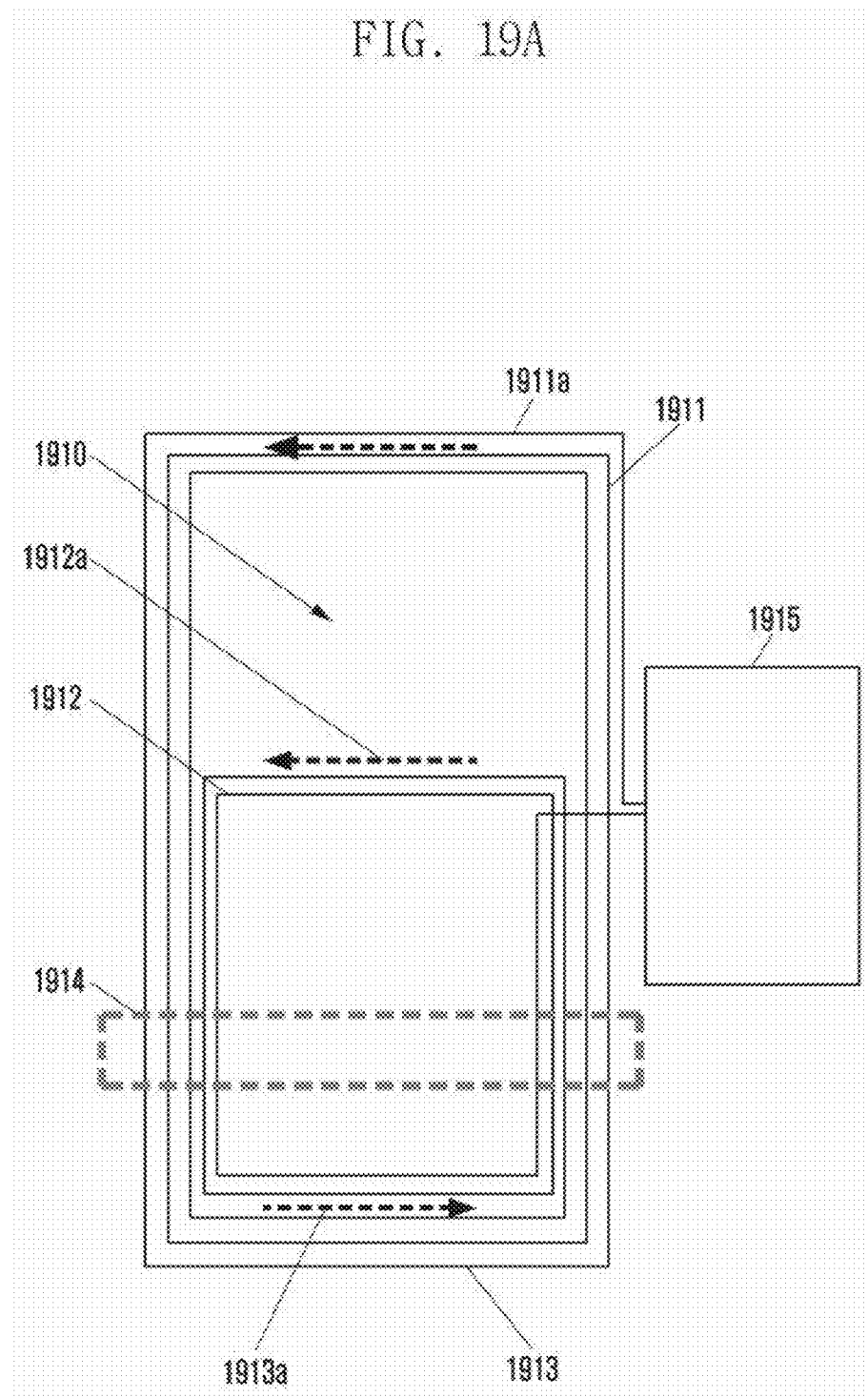
Figure 19D:
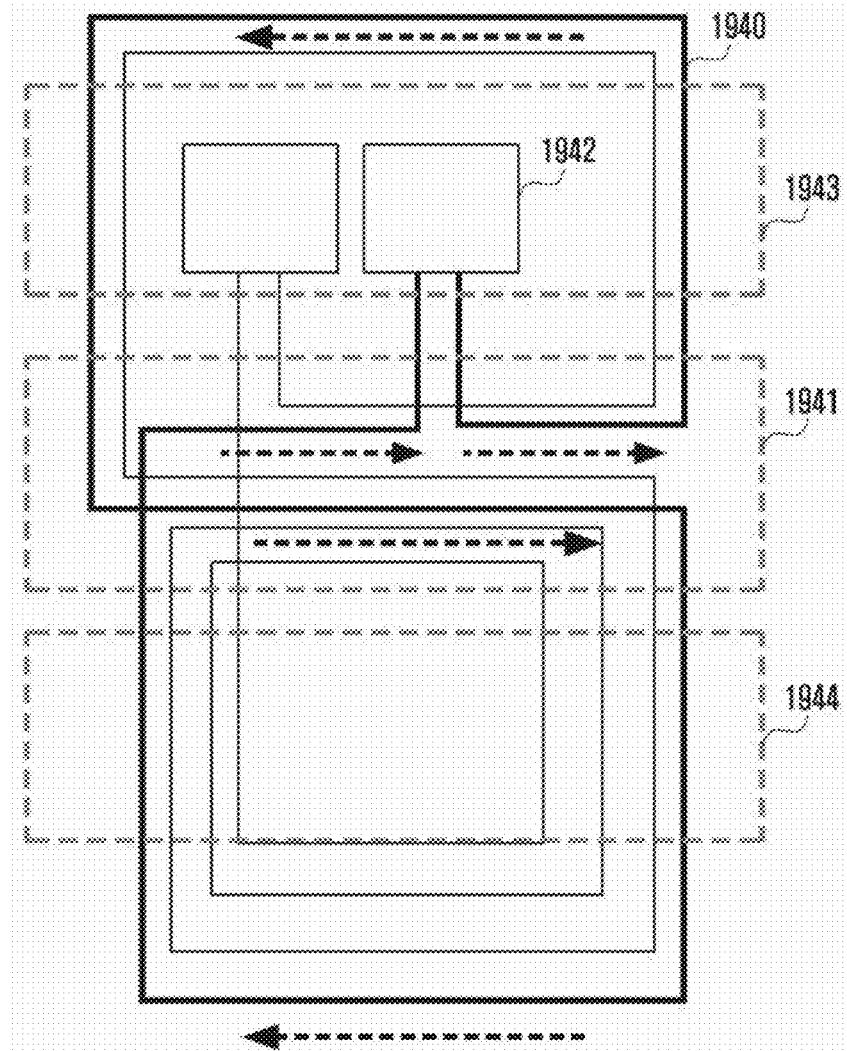

Referring to FIGS. 19A to 19G, as shown in FIG. 19A, the loop antenna 1910 is designed in such a way that the first path 1911 is formed in the top of the electronic device (e.g., smartphone), the second path 1912 is in the center, and the third path 1913 is in the bottom. In addition, the direction of current 1911a flowing in the first path 1911 is identical to that of current 1912a flowing in the second path 1912. In this case, the current direction 1911a of the first path 1911 is opposite the direction of current 1913a flowing in the third path 1913. When the loop antenna 1910 produces a magnetic field by current from the communication module 1915 (e.g., MST module 110 shown in FIG. 1B), the intensity of the magnetic field in the center and bottom is greater than in the bottom, and thus the null point 1914 is formed near the bottom of the electronic device.

In an embodiment of the present disclosure, referring to 19B, the loop antenna 1920 is designed in such a way that the direction of current 1923a flowing in the third path 1923 is identical to that of current 1922a flowing in the second path 1922. In this case, the current direction 1923a and the current direction 1922a are opposite to the direction of current 1921a flowing the first path 1921. Therefore, the null point 1925 is formed near the top of the electronic device.

In an embodiment of the present disclosure, referring to 19C, the paths of the loop antenna 1930 connected to the communication module 1932 (e.g., MST module) are shaped as the letter 'B' (i.e., the flow of electric current flows in the paths like the letter 'B'), where currents flowing in the paths in the center portion 1931 are in the opposite directions to each other. Therefore, the center portion 1931 is a null point. The loop antenna 1930, shaped as the letter 'B,' results in an effect distributing the null point to both sides (the top and bottom), compared with the loop antenna 1800 shown in FIG. 18.

In an embodiment of the present disclosure, referring to 19D, the paths of the loop antenna 1940 connected to the communication module 1942 (e.g., MST module) are shaped as the figure '8,' where currents flowing in the paths in the center portion 1941 are in the same direction. Therefore, the intensity of magnetic field is the largest in the center portion 1941. The null points are formed in the top portion 1943 and the bottom portion 1944.

Figure 19E:
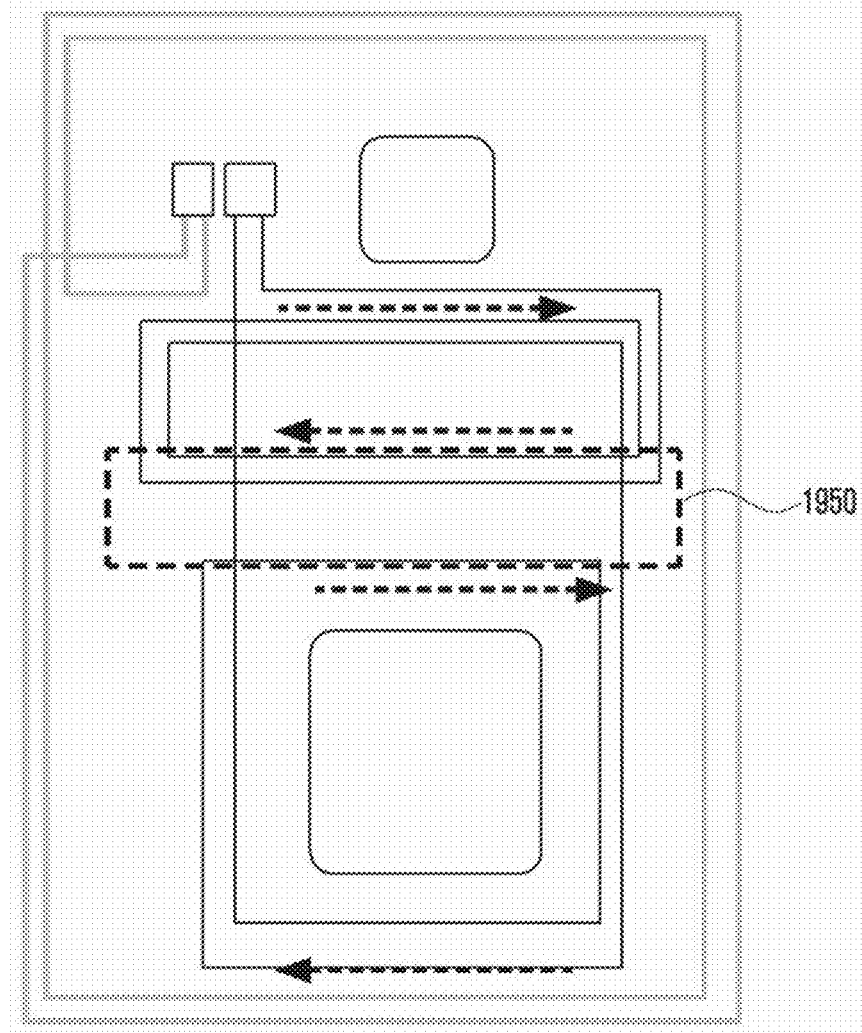
Figure 19F:
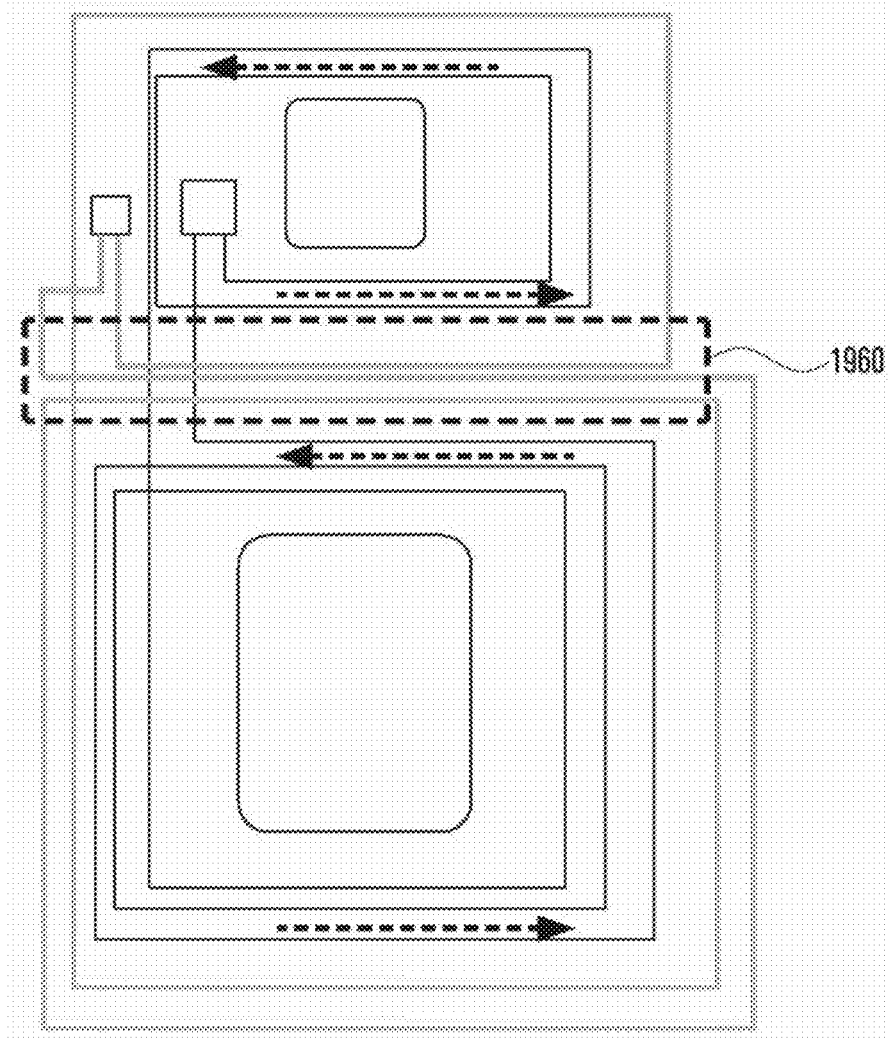
Figure 19G:
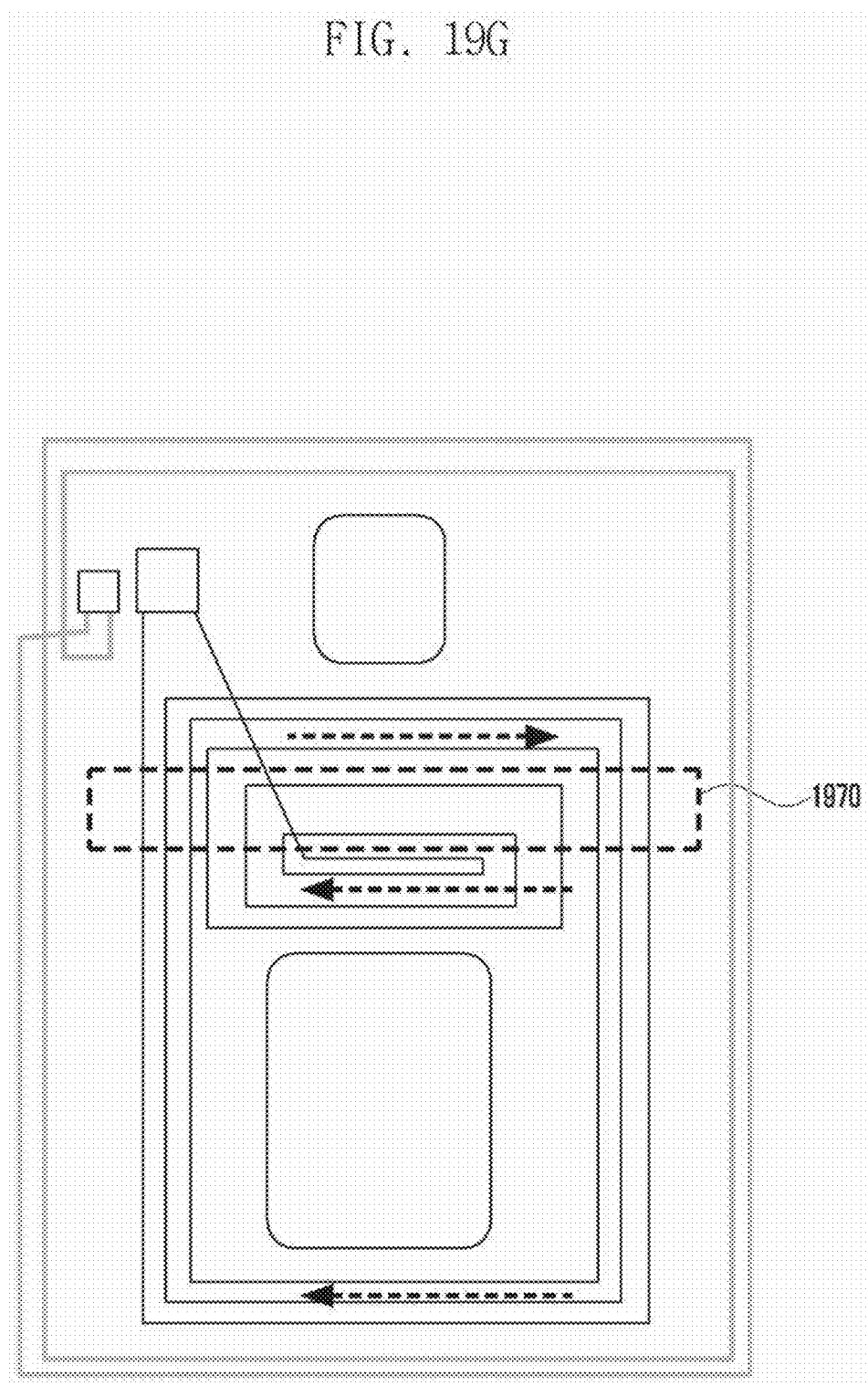

In addition, the loop antenna may also be designed to have various shapes of paths, e.g., paths shaped as the letter 'B,' shown in FIGS. 19E to 19G. In the drawings, the arrows represent the direction of current and the portions 1950, 1960, and 1970, where the directions of current are opposite to each other, are null points.

As described above referring to FIGS. 19A to 19G, the null points of the loop antennas vary according to the locations of paths (current paths) and the directions of current. Therefore, when an antenna is designed to increase an MST recognition rate, the locations of null points need to be considered.

Figure 20B:
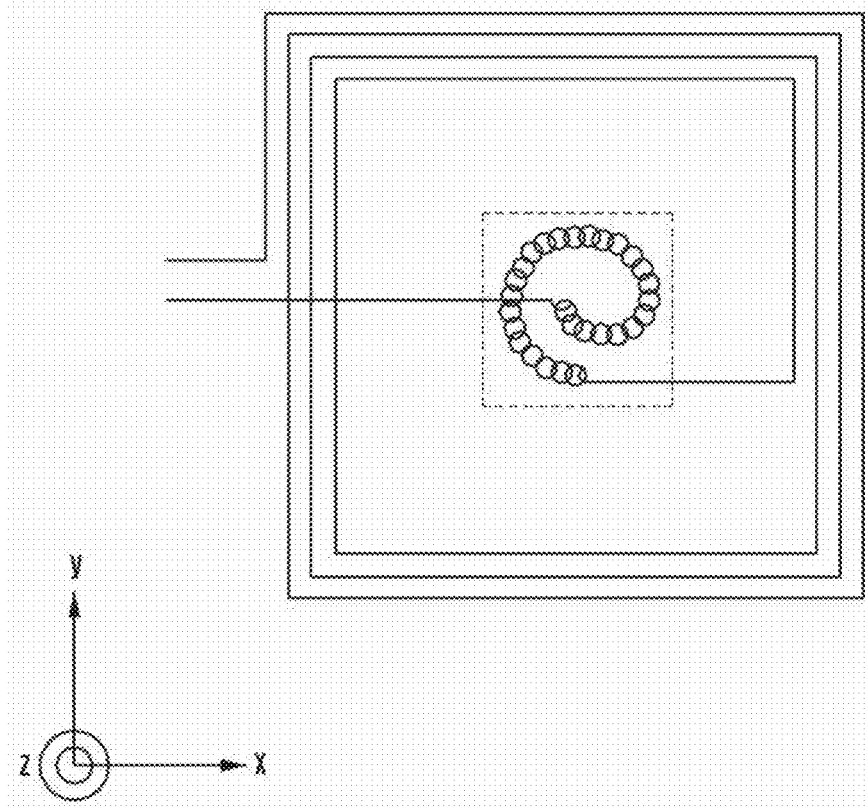

FIGS. 20A and 20B are diagrams showing structures of loop antennas according to various embodiments of the present disclosure.

Referring to FIGS. 20 and 20B, a loop antenna 2010 shown in FIG. 20A may be applied to the antenna 1630 shown in FIG. 16B. The loop antenna 2010 is implemented in such a way that a first path 2011, forming the outer portion, is a flat type of coil and the second path 2012, forming the inner portion, is a solenoid coil. For example, the flat coil may be a coil that is wound without overlapping on the X-Y plane. The solenoid coil may be a coil that is wound with respect to the Z-axis a number of times. As shown in FIG. 20B, the solenoid coil may be a coil that is wound on an axis perpendicular to the Z-axis a number of times. As the number of turns of a coil arranged in each section and the area where the coil is arranged vary, the null point moves from the center portion of the loop antenna to the outer side, thereby emitting a relatively large amount of magnetic flux from the second path 2012.

Figure 21A:
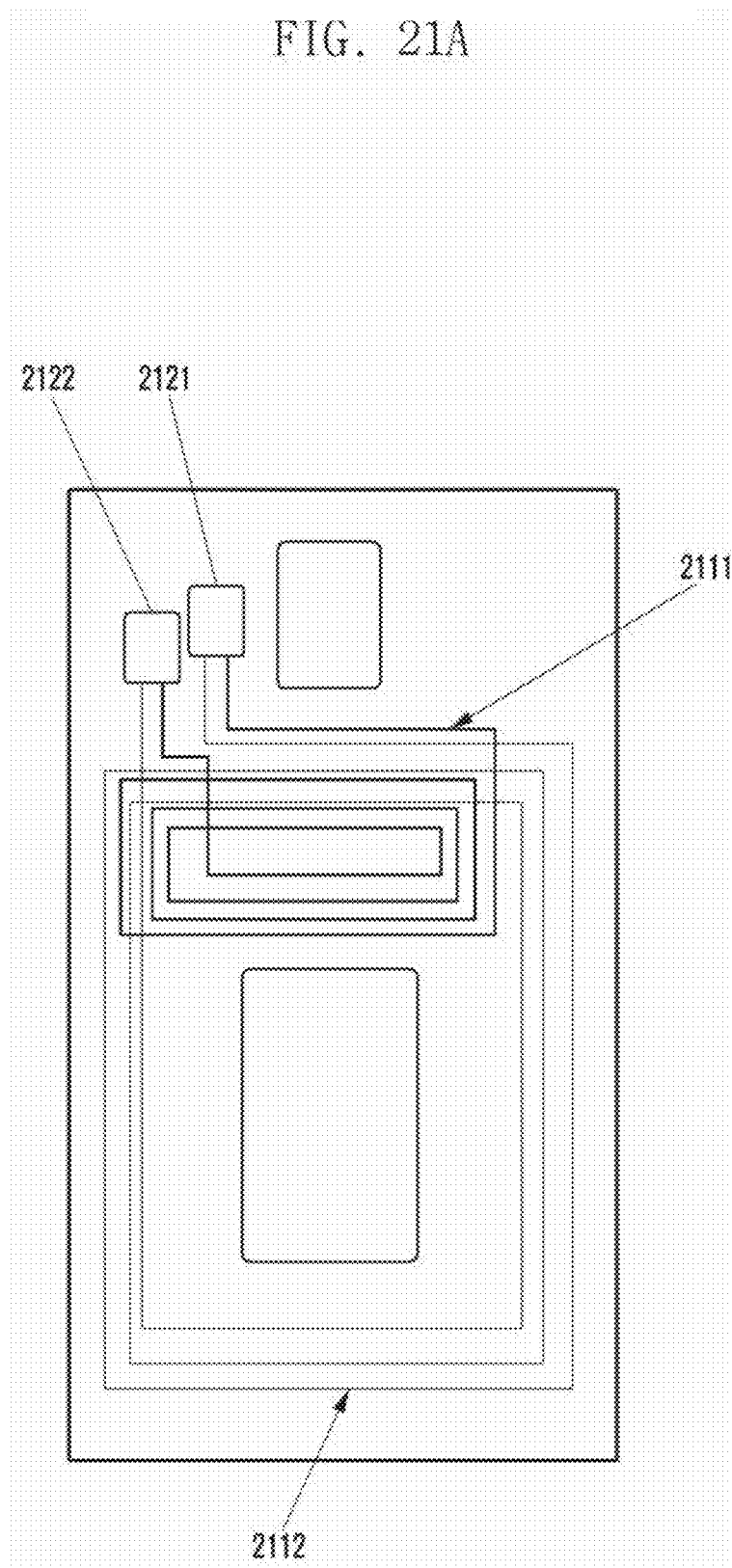

FIGS. 21A and 21B are diagrams showing structures of a number of loop antennas according to various embodiments of the present disclosure.

Referring to FIGS. 21A and 21B, a number of loop antennas, e.g., first and second antennas 2111 and 2112, are connected to the same output part of an MST control module. The first and second antennas 2111 and 2112 may transmit the same signal at the same time. For example, as shown FIG. 21A, one end of each of the first and second antennas 2111 and 2112 is connected to a first electrode 2121 (e.g., the first electrode 1711), and the other end of each of the first and second antennas 2111 and 2112 is connected to a second electrode 2122 (e.g., the second electrode 2112). The first and second antennas 2111 and 2112 may be configured on the different layers of the FPCB. For example, with respect to the Z-axis, the first and second antennas 2111 and 2112 are formed on the bottom and top layers of the FPCB, respectively. Alternatively, the loop antennas may also be formed on the same layer. For example, as shown in FIG. 21B, first and second antennas 2131 and 2132 may be formed on the top and bottom portions 2141 and 2142 of the X-Y plane, respectively.

Figure 22A:
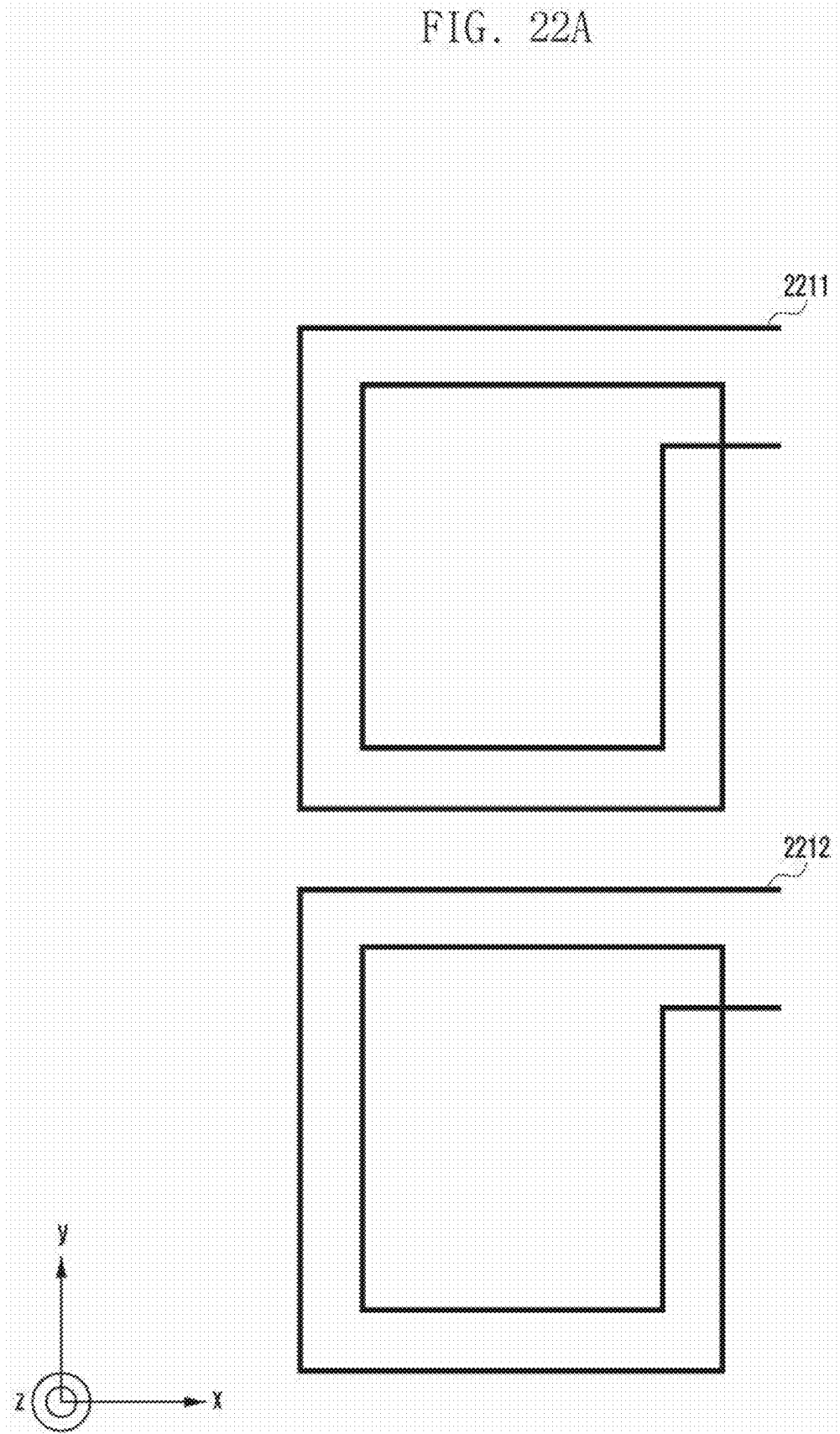
FIGS. 22A and 22B are diagrams showing structures of a number of coil antennas according to various embodiments of the present disclosure.
Figure 22B:
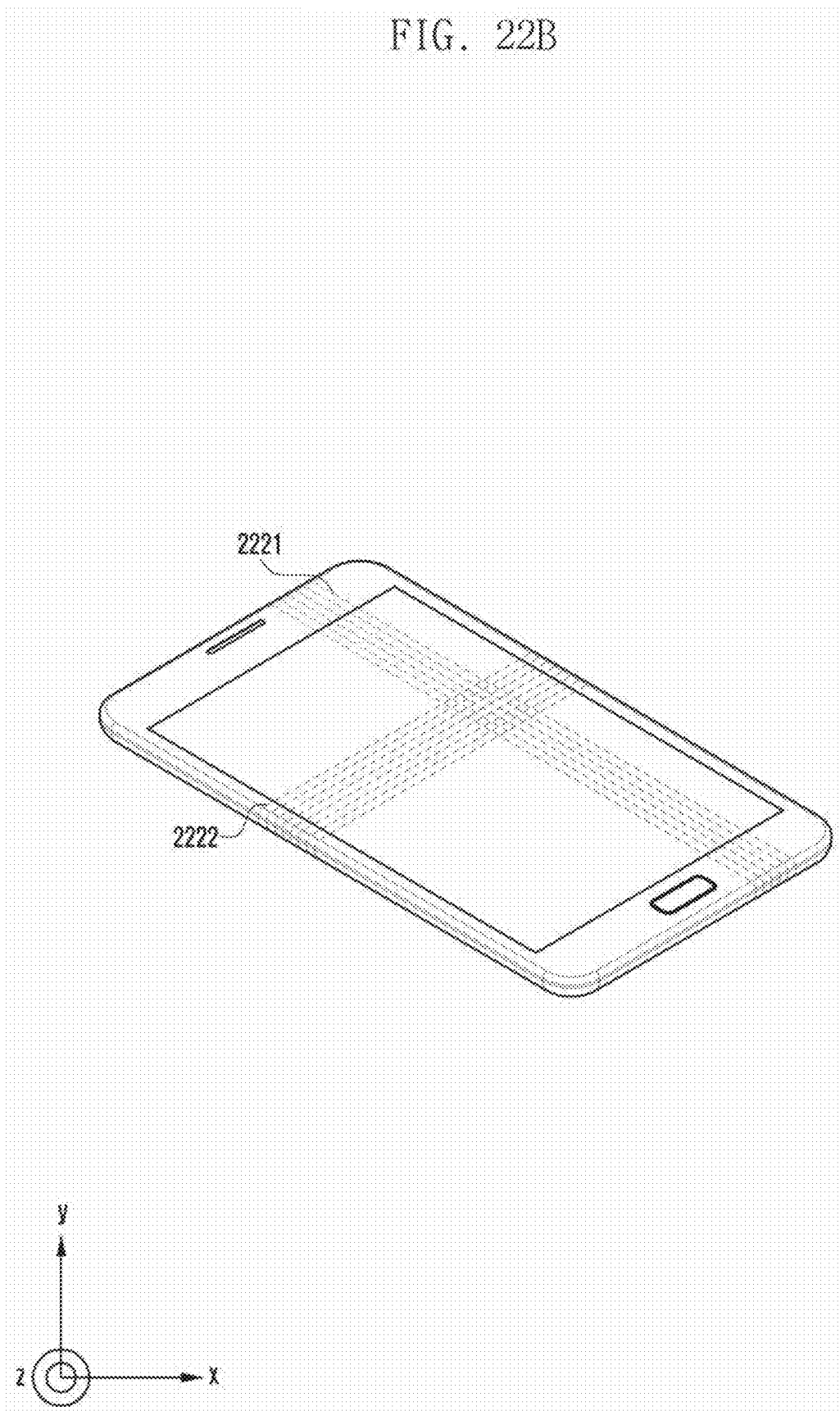

FIGS. 22A and 22B are diagrams showing structures of a number of coil antennas according to various embodiments of the present disclosure.

Referring to FIG. 22A, a number of coil antennas, e.g., first and second antennas 2211 and 2212, are formed on the same plane (e.g., X-Y plane). In an embodiment of the present disclosure, a loop antenna for MST (or MST loop antenna) may be implemented as various forms to improve the recognition of magnetic field emitted to an external device (e.g., POS terminal). For example, the paths of the coil antenna may be implemented as a shape of the letter 'B' shown in FIG. 19C or the figure '8' shown in FIG. 19D. The coil antenna may be implemented in such a way that, when the electronic device moves close to an external device (e.g., POS terminal), the paths (current paths) are maximally formed, which are perpendicular to the direction along which a magnetic card is swiped over the external device (e.g., POS terminal). The first and second antennas 2211 and 2212 may transmit different MST signals. For example, the first antenna 2211, e.g., the first antenna 1730 shown in FIG. 17B, may emit part of the sequences shown in FIG. 7. Similarly, the second antenna 2212, e.g., the second antenna 1740 shown in FIG. 17B, may emit another part of the sequences shown in FIG. 7.

Referring to FIG. 22B, the coil antennas may be formed on different planes with respect to different axes. For example, the first and second coil antennas 2221 and 2222 may form loops with respect to X- and Y-axes, respectively. The first and second coil antennas 2221 and 2222 may place a shielding material (not shown) therebetween, thereby preventing interference therebetween.

In an embodiment of the present disclosure, the first or second coil antenna 2221 or 2222 may be an FPCB antenna.

The multi-layers of an FPCB are connected with patterns, thereby forming layered loops.

In an embodiment of the present disclosure, the first or second coil antenna 2221 or 2222 may form a loop winding at least part of the housing of the electronic device. The coil antenna may be implemented in such a way that one part is located under the front display of the electronic device and the other part is located under the back of the electronic device. The coil antenna may be implemented with an FPCB or to use at least part of the outer body of the electronic device.

Figure 23:
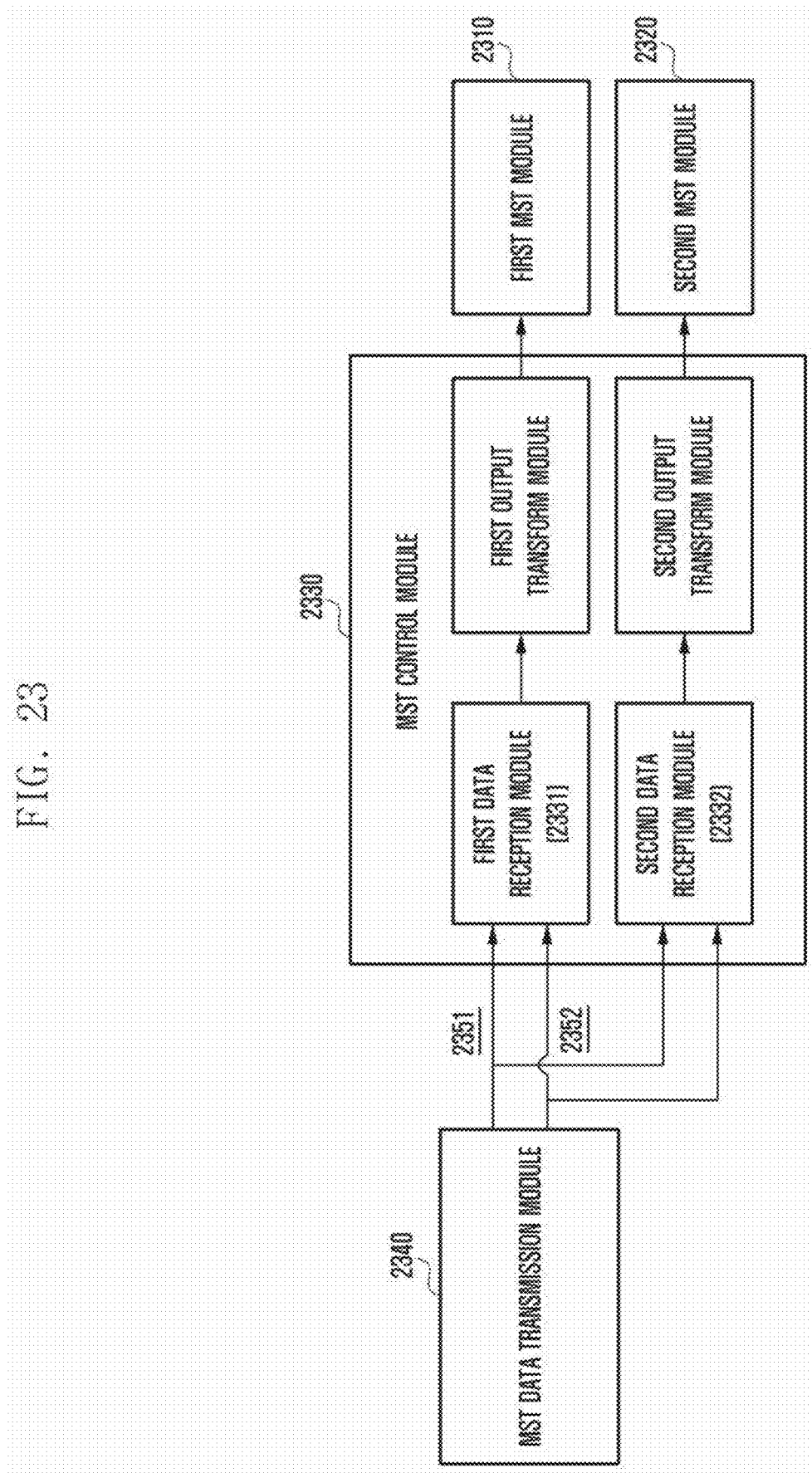
FIGS. 23 to 25 are block diagrams showing electronic devices including a number of MST modules according to various embodiments of the present disclosure.
Figure 24:
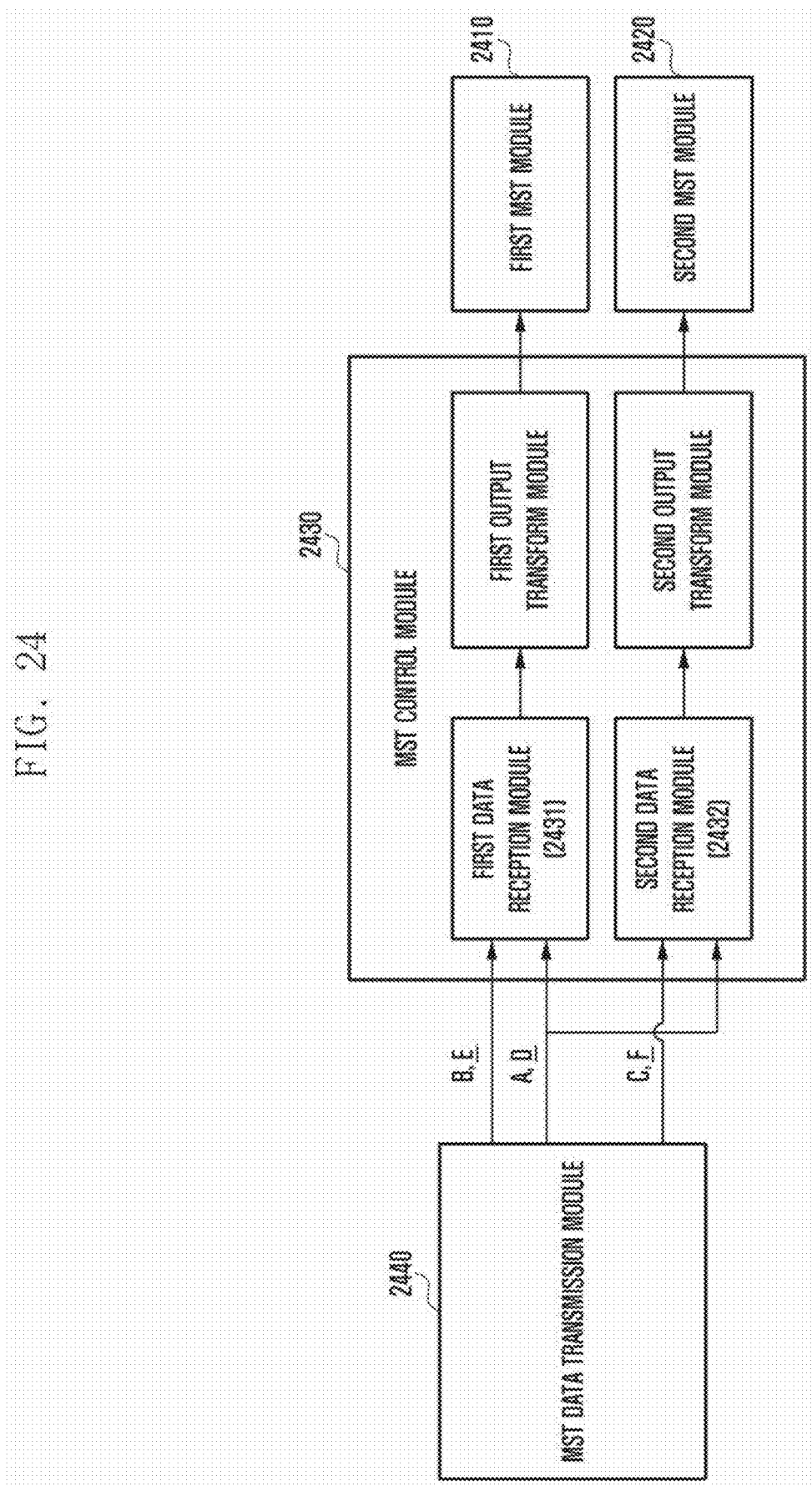
Figure 25:
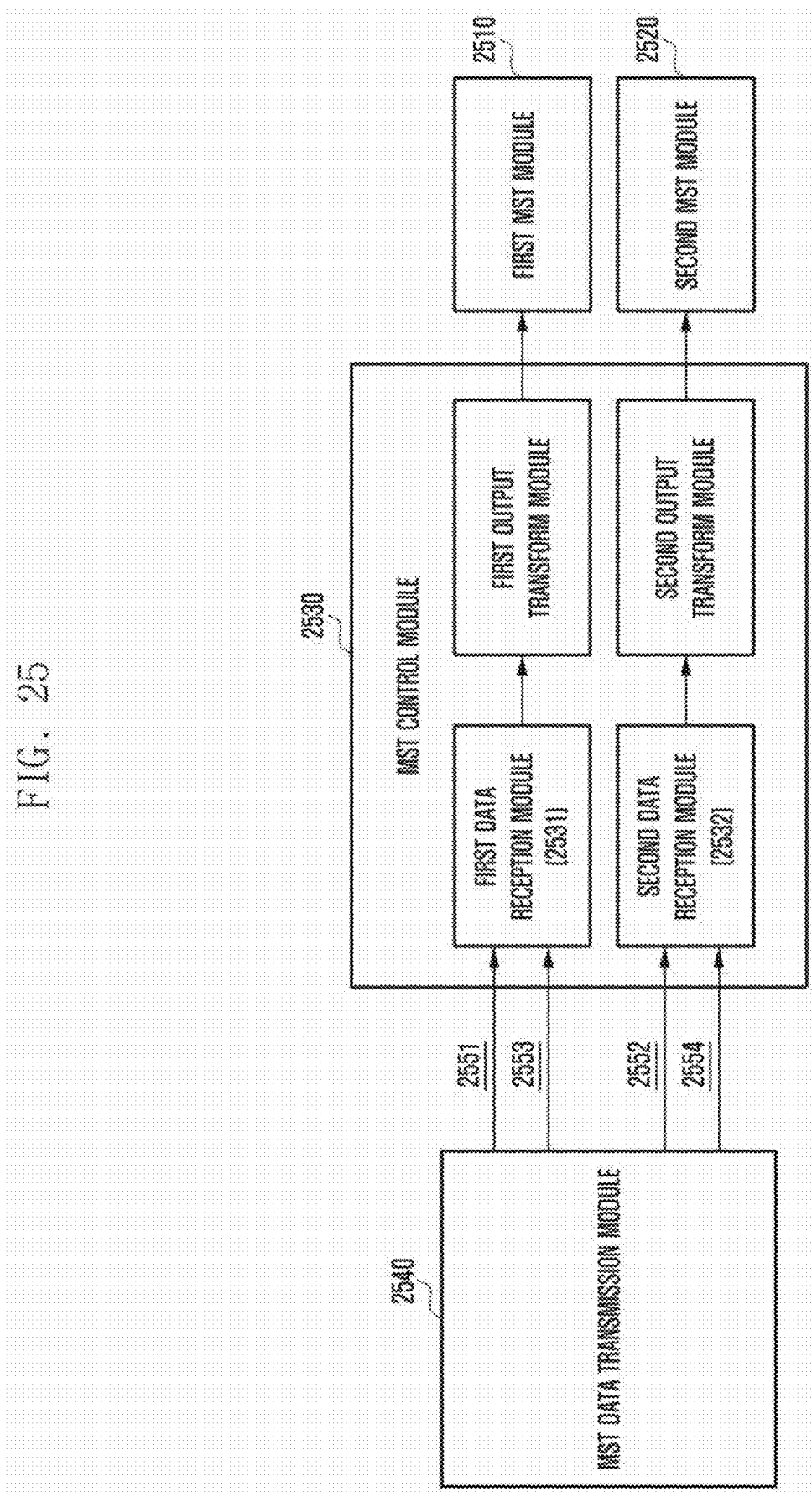

FIGS. 23, 24, and 25 are block diagrams showing electronic devices including a number of MST modules according to various embodiments of the present disclosure.

Referring to FIG. 23, first and second MST modules 2310 and 2320 are capable of transmitting the same data to an external device. The first MST module is capable of including a coil antenna that differs in type from that of the second MST module 2320. The first and second MST modules 2310 and 2320 are located apart from each other. The first and second MST modules 2310 and 2320 may receive different levels of voltage or different amount of current, respectively. The MST control module 2330 includes first and second data reception modules 2331 and 2332 which are capable of receiving at least one identical signal from an MST data transmission module 2340. For example, the MST data transmission module 2340 may transmit an MST signal 2351 containing the same payment information (e.g., data shown in FIGS. 17A and 17B) to the first and second data reception modules 2331 and 2332 of the MST control module 2330. In addition, the MST data transmission module 2340 may transmit a control signal 2352 for activating the first and second MST modules 2310 and 2320 to the first and second data reception modules 2331 and 2332. The MST control module 2330 receives the control signal 2352 and controls the first and second MST modules 2310 and 2320 to emit the MST signal 2351 to the outside. The first data reception module 2331 and a first output transform module may be formed into a signal module. The second data reception module 2332 and a second output transform module may be formed into a signal module.

Referring to FIG. 24, an MST data transmission module 2440 transmits an MST signal A containing the same payment information (e.g., sequences shown in FIG. 7) to first and second data reception modules 2431 and 2432. The MST data transmission module 2440 also transmits control signals B and C to first and second data reception modules 2431 and 2432 to independently control first and second MST modules 2410 and 2420, respectively. The first and second MST modules 2410 and 2420 are activated sequentially according to the individual control signals and emit part of the individual MST signals. For example, the first MST module 2410 is first activated and transmits sequences sequentially (e.g., in order of a sequence 710 and a sequence 720). The second MST module 2420 is activated and transmits sequences sequentially (e.g., in order of a sequence 730 and a sequence 740).

In an embodiment of the present disclosure, the first and second MST modules 2410 are 2420 may be alternately activated and emit MST signals to an external device (e.g., a POS terminal). For example, the first MST module 2410 is first activated to emit a sequence (e.g., a sequence 710) and then the second MST module 2420 is activated to emit a sequence (e.g., a sequence 720). The first MST module 2410 is activated again to emit a sequence (e.g., a sequence 730) and then the second MST module 2420 is activated again to emit a sequence (e.g., a sequence 740).

In an embodiment of the present disclosure, the first and second MST modules 2410 and 2420 may be selectively activated according to the state of the UE. For example, when the UE activates short-range wireless communication (e.g., NFC communication) using a loop antenna near the first MST module 2410 or when the UE activates cellular network wireless communication using an adjacent antenna, the MST control module 2430 activates the second MST module 2420 to emit an MST signal. For example, when the UE activates the first MST module 2410 and/or the second MST module 2420 and emits an MST signal using the activated module to an external device (e.g., a POS terminal), the external device may not recognize the MST signal. In this case, the user may move the UE so that it can be recognized by the external device (e.g., the user may move the UE off the POS terminal and then tag it thereto). The UE enables a sensor to detect this operation, thereby simultaneously activating the first and second MST modules 2410 and 2420. For example, UE may activate the second MST module 2420 (e.g., a second coil antenna 2222 shown in FIG. 22B) when the screen is displayed in portrait mode and the first MST module 2410 (e.g., a first coil antenna 2221 shown in FIG. 22B) when the screen is displayed in landscape mode.

In an embodiment of the present disclosure, the MST data transmission module 2440 transmits a control signal D for activating first and second MST modules 2410 and 2420 to the first and second data reception modules 2431 and 2432. The MST data transmission module 2440 transmits MST signals E and F containing different payment information to the first and second data reception modules 2431 and 2432, respectively. For example, the MST data transmission module 2440 may transmit MST signals containing Track 1 information and Track 2 information to the first and second data reception modules 2431 and 2432, respectively. The MST signal containing Track 1 information is transmitted to the first MST module 2410 via a first output transform module 2451. The first MST module 2410 emits the received MST signal. Similarly, the MST signal containing Track 2 information is transmitted to the second MST module 2420 via a second output transform module 2452. The second MST module 2420 emits the received MST signal. The first data reception module 2431 and the first output transform module 2451 may be formed into a signal module. The second data reception module 2432 and the second output transform module 2452 may be formed into a signal module.

Referring to FIG. 25, an MST data transmission module 2540 is capable of transmitting MST signals 2551 and 2552 containing the different payment information to the first and second data reception modules 2531 and 2532 of an MST control module 2530, respectively. For example, the MST data transmission module 2540 may transmit sequences 710 and 720 to the first data reception module 2531 and sequences 730 and 740 to the second data reception module 2532. In addition, the MST data transmission module 2540 transmit different control signals 2553 and 2554 to the MST control module 2530 to independently control the first and second MST modules 2510 and 2520. For example, after receiving the control signals 2553 and 2554, the MST control module 2330 controls the first MST module 2510 to sequentially emit sequences 710 and 720 to the outside, and then the second MST module 2520 to sequentially emit sequences 730 and 740 to the outside. The first data reception module 2531 and a first output transform module may be formed into a signal module. The second data reception module 2532 and a second output transform module may be formed into a signal module.

Figure 26:
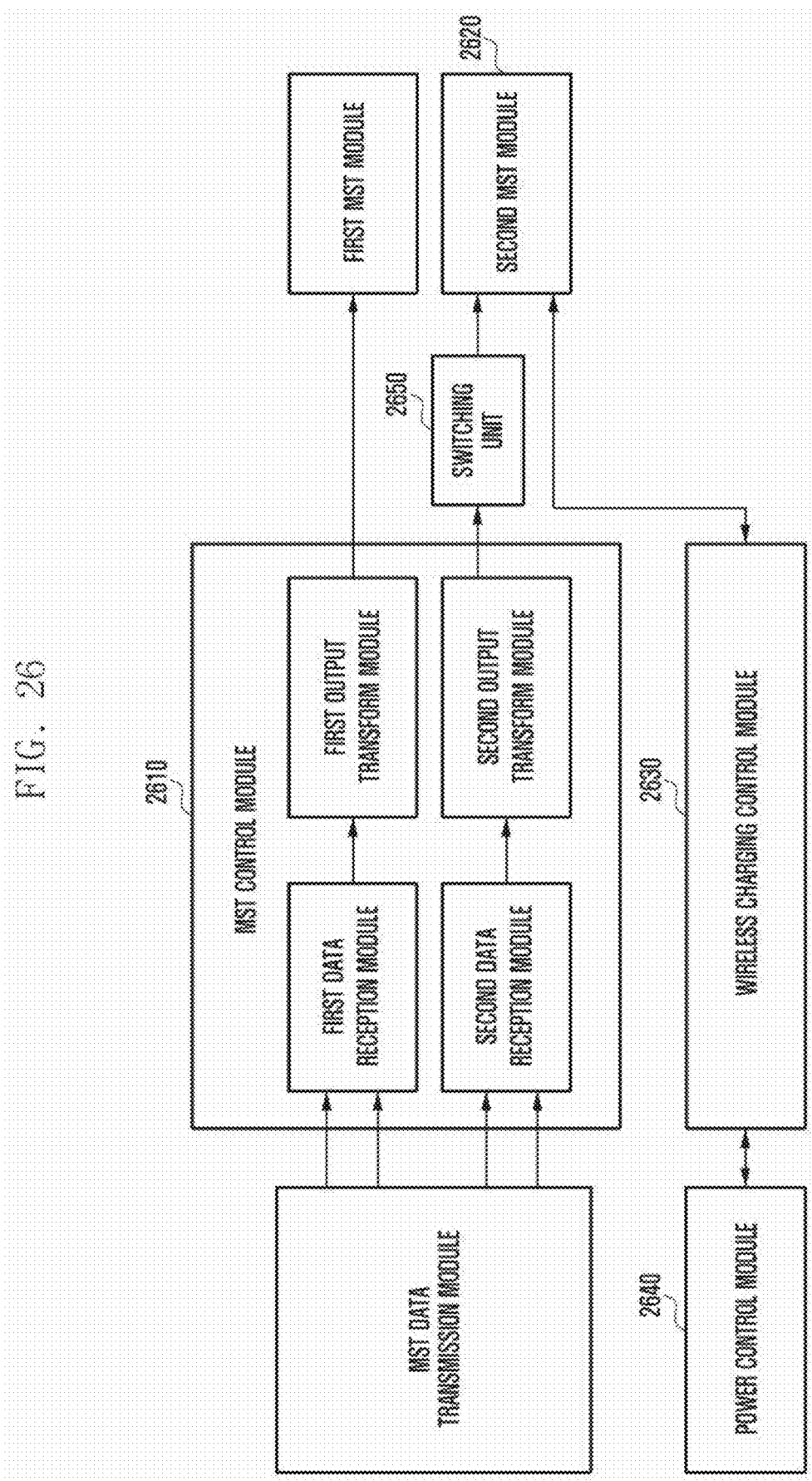
FIGS. 26 to 28 are block diagrams showing electronic devices capable of sharing at least one of a number of MST modules with another short-range wireless communication according to various embodiments of the present disclosure.
Figure 27:
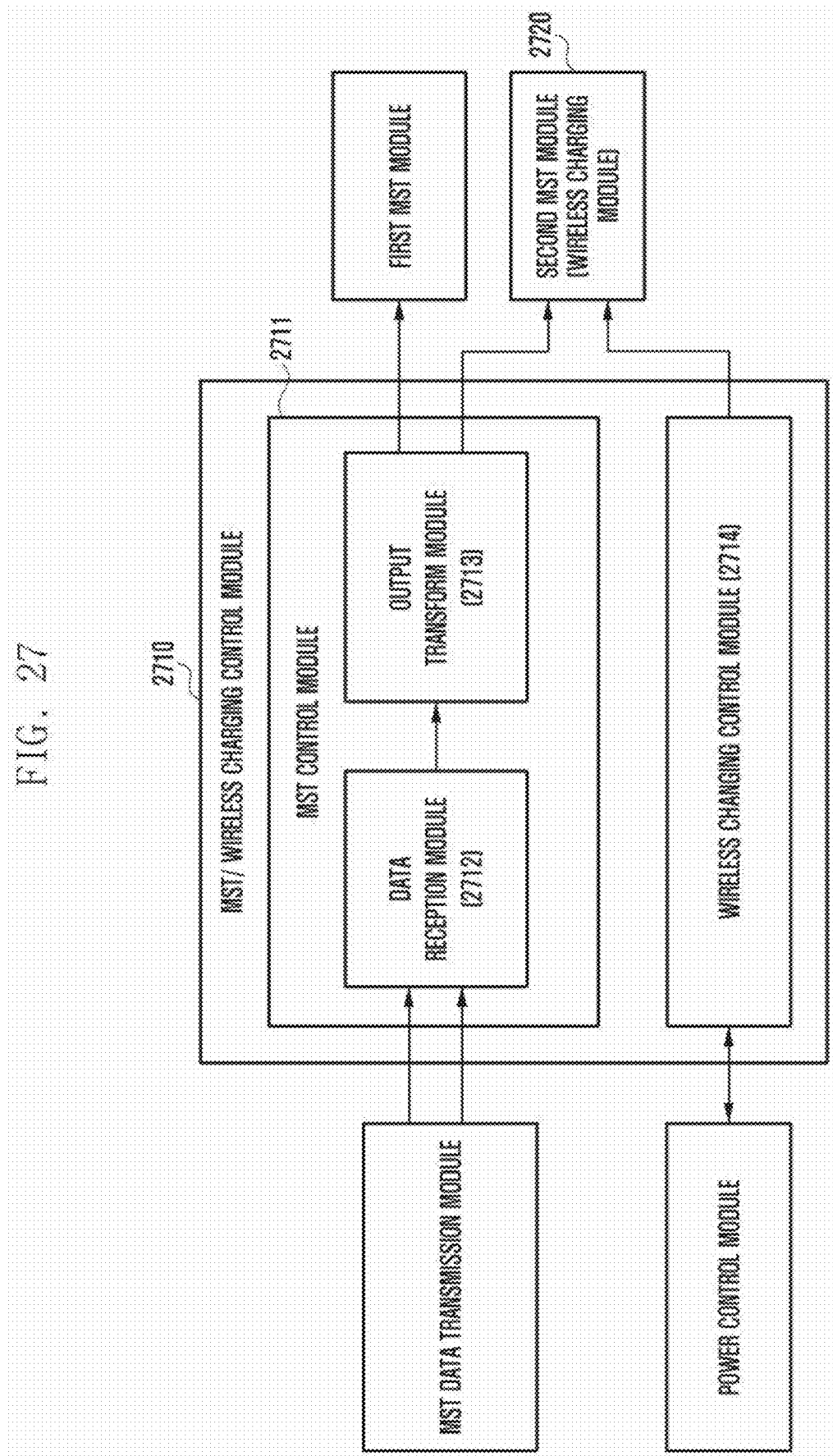
Figure 28:
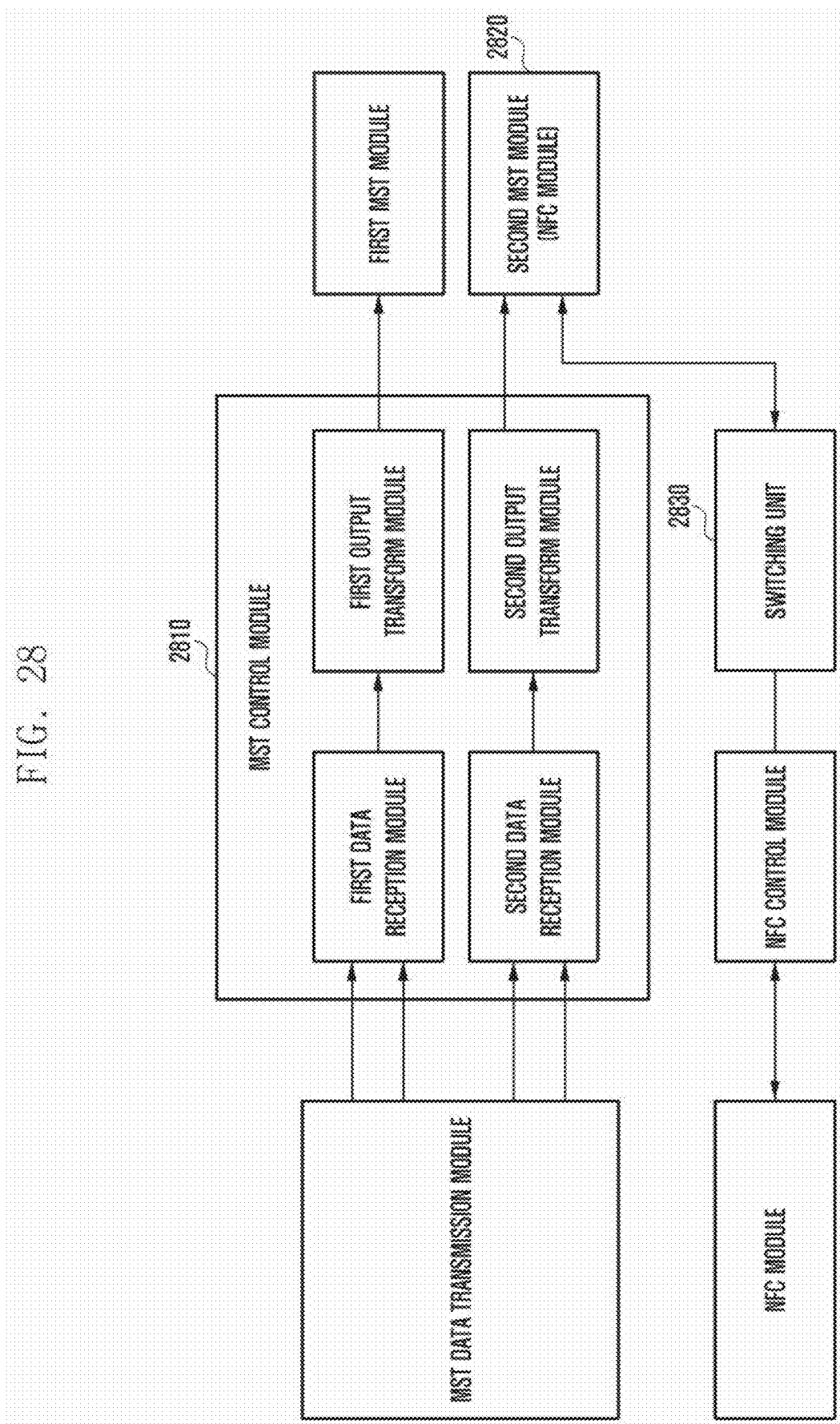

FIGS. 26, 27, and 28 are block diagrams showing electronic devices capable of sharing at least one of a number of MST modules with another short-range wireless communication according to various embodiments of the present disclosure.

Referring to FIG. 26, an MST control module 2610 is capable of including a switching unit 2650. The switching unit 2650 interrupts (opens) the connection between the second MST module 2620 and the MST control module 2610 so that the second MST module 2620 is connected to the wireless charging control module 2630 and serves as a wireless charging module (or a wireless charging coil antenna). The wireless charging control module 2630 is capable of further including an alternate current (AC)/direct current (DC) converter, a rectifier, and the like. The power control module 2640 may be included in the electronic device. In an embodiment of the present disclosure, the second MST module 2620 may include a coil antenna of an inductance of approximately 10 µH.

Referring to FIG. 27, the electronic device (e.g., the electronic device 11 shown in FIG. 1A) is capable of using at least one of a number of MST modules, e.g., a second MST module 2720, as a resonant coil antenna for wireless charging. The MST/wireless charging control module 2710 is capable of including an MST control module 2711 and a wireless charging control module 2714. The MST control module 2711 includes a data reception module 2712 and an output transform module 2713.

Referring to FIG. 28, the electronic device (e.g., the electronic device 11 shown in FIG. 1A) is capable of using at least one of a number of MST modules, e.g., a second MST module 2820, as an NFC coil antenna. When the second MST module 2820 is used as an NFC coil antenna, the electronic device may further include a switching unit 2830 to adjust the number of turns or an inductance in the coil antenna. When the electronic device uses at least one of the MST modules, e.g., a second MST module 2820, as an MST module for other short-range wireless communication (e.g., NFC communication), the MST control module 2810 may further include a switch for disconnecting from the MST module for other short-range wireless communication, i.e., the second MST module 2820.

FIG. 29 is a diagram showing an antenna device according to various embodiments of the present disclosure.

Referring to FIG. 29, an antenna device 2900 is installed to an electronic device (e.g., the electronic device 11 shown in FIG. 1A). The antenna device 2900 is capable of including first and second loop antennas 2910 and 2920, a communication module 2930, and a switch 2940. The communication module 2930 is capable of including first, second, and third communication modules 2931, 2932, and 2933, and four contacts 2934~2937.

In various embodiments of the present disclosure, the first communication module 2931 is electrically connected to the first loop antenna 2910 via the first and second contacts 2934 and 2935, and performs transmission/reception of electromagnetic waves for short-range wireless communication. For example, the first communication module 2931 is a resonance charging module, e.g., alliance for wireless power (A4WP), and receives electromagnetic waves for charging via the first loop antenna 2910.

In various embodiments of the present disclosure, the second communication module 2932 is electrically connected to the second loop antenna 2920 via the third and fourth contacts 2936 and 2937, and performs transmission/reception of electromagnetic waves for short-range wireless communication. For example, the second communication module 2932 serves as an NFC module.

In various embodiments of the present disclosure, the third communication module 2933 is electrically connected to the first and second loop antennas 2910 and 2920 via the contacts 2934~2937 and the switch 2940, and performs transmission/reception of electromagnetic waves for short-range wireless communication (e.g., wireless power consortium (WPC) or MST). For example, when the switch 2940 is turned on, electric current flows along the following path the third communication module 2933, the first contact 2934, the first loop antenna 2910, the second contact 2935, the switch 2940, the third contact 2936, the second loop antenna 2920, the fourth contact 2937 and the third communication module 2933. For example, the first loop antenna 2910 and the second loop antenna 2920 form a path by the switch 2940. Therefore, the third communication module 2933 performs transmission/reception of electromagnetic waves via the path.

In various embodiments of the present disclosure, the operation of the switch 2930 (turning on/off) is controlled by the communication module 2940 or a control module (e.g., application processor (AP)) of the electronic device. Although the embodiment shown in FIG. 29 is implemented in such a way that the switch 2930 is included in the communication module 2930, it should be understood that the present disclosure is not limited thereto. For example, the switch 2930 may be installed to any location only if it can connect the first and second loop antennas 2910 and 2920 to each other. Alternatively, the location to where the switch 2930 will be installed may be determined, considering the length of a path, the number of turns in a path, an inductance of a path, and the like, so that a particular frequency of the third communication module 2933 can be selected as a resonance frequency.

Figure 30A:
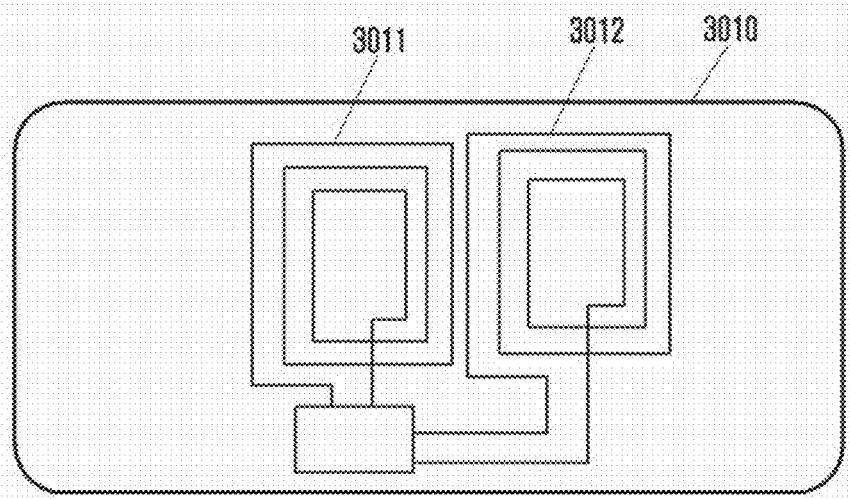
FIG. 30A is a diagram showing a number of coil antennas in an electronic device according to various embodiments of the present disclosure.
Figure 30B:
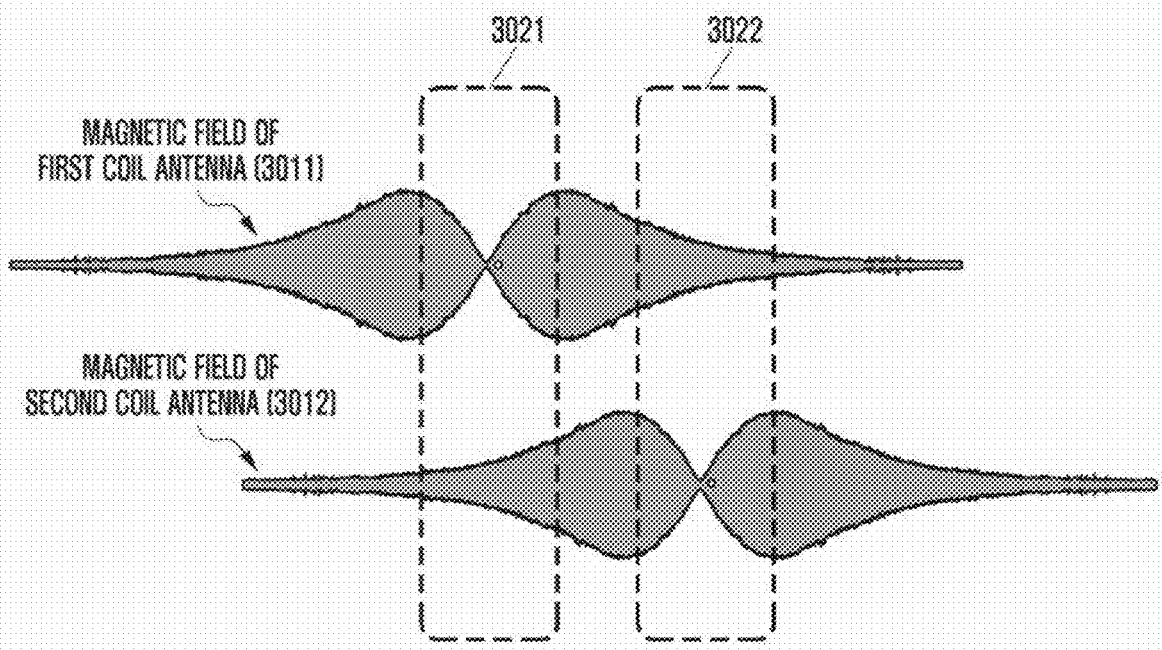
FIG. 30B is a diagram showing a null point and an intensity of magnetic field produced in a number of coil antennas according to various embodiments of the present disclosure.

FIG. 30A is a diagram showing a number of coil antennas in an electronic device according to various embodiments of the present disclosure, and FIG. 30B is a diagram showing a null point and an intensity of magnetic field produced in a number of coil antennas according to various embodiments of the present disclosure.

Referring to FIG. 30A, an electronic device 3010 (e.g., the electronic device 11 shown in FIG. 1A) is capable of including first and second coil antennas 3011 and 3012. The first and second coil antennas 3011 and 3012 produce magnetic fields according to received current.

The top diagram of FIG. 30B shows the intensity of magnetic fields and the null point, produced by and occurred due to the first coil antenna 3011 (or are recognized by an external device, e.g., a POS terminal. The bottom diagram of FIG. 30B shows the intensity of magnetic fields and the null point, produced by and occurred due to the second coil antenna 3012.

Referring to FIG. 30B, a first null point 3021 that occurred due to the first coil antenna 3011 and the second null point 3022 due to the second coil antenna 3012 may not overlap with each other. The first and second coil antennas 3011 and 3012 may perform transmission of MST signals periodically or alternately. For example, the first and second coil antennas 3011 and 3012 may transmit an MST signals to the outside 16 times in total (i.e., eight times each antenna), where one time is one second. Therefore, the null points occur periodically and alternately, e.g., from the first null point 3021 to the second null point 3022 or vice versa. When an external device (e.g., a POS terminal) is located in the first null point 3021, it may not receive payment information from the first coil antenna 3011. Although the external device receives payment information, it may not recognize the received payment information. In this case, the external device (e.g., a POS terminal) receives an MST signal containing payment information from the second coil antenna 3012 and makes a payment. As described above, the electronic device 3010 is capable of driving a number of coil antennas so that the null point occurs alternately or sequentially, thereby increasing the success rate of payment.

Figure 31A:
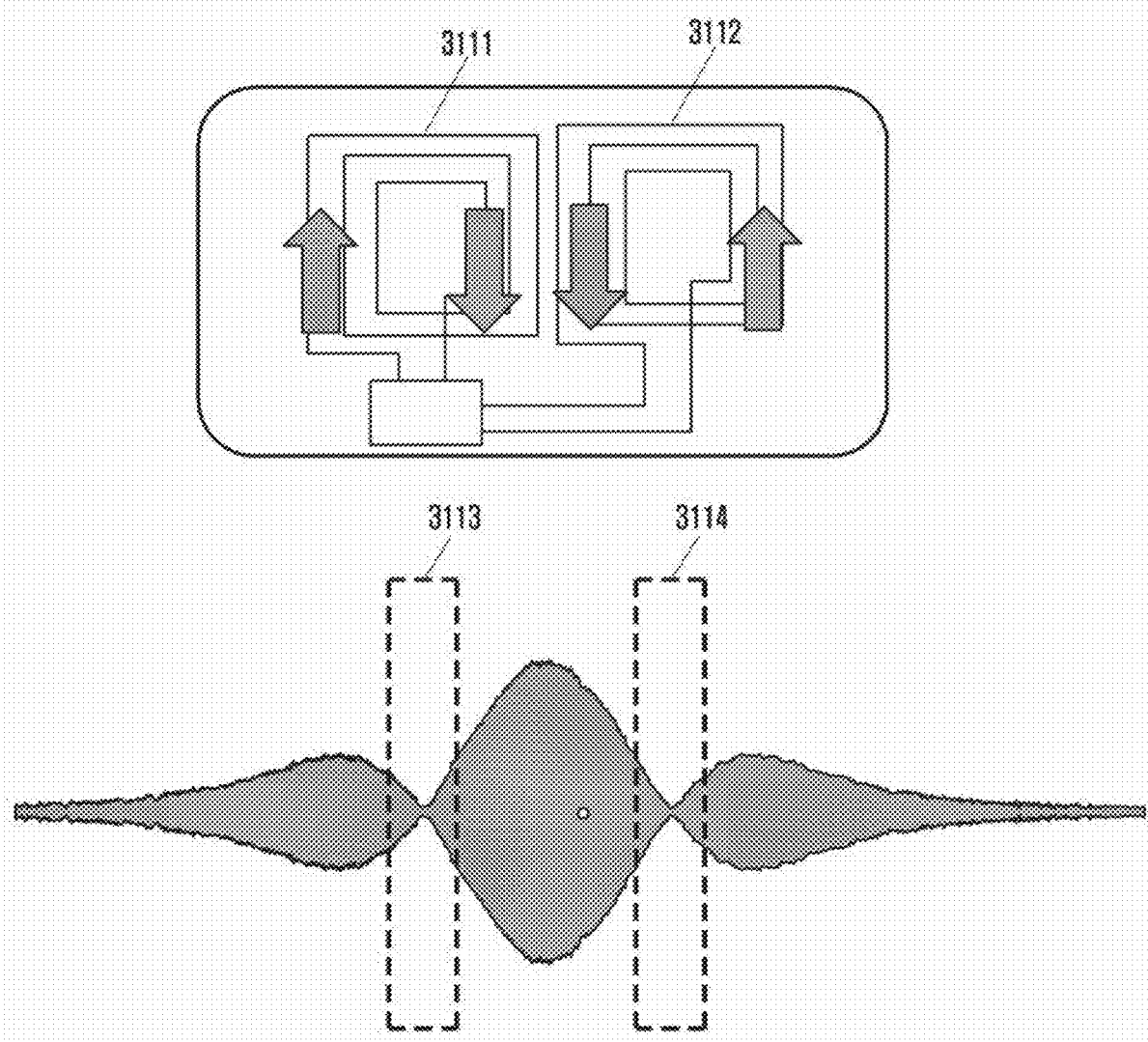
FIG. 31A is a diagram showing a number of coil antennas in an electronic device according to various embodiments of the present disclosure.
Figure 31B:
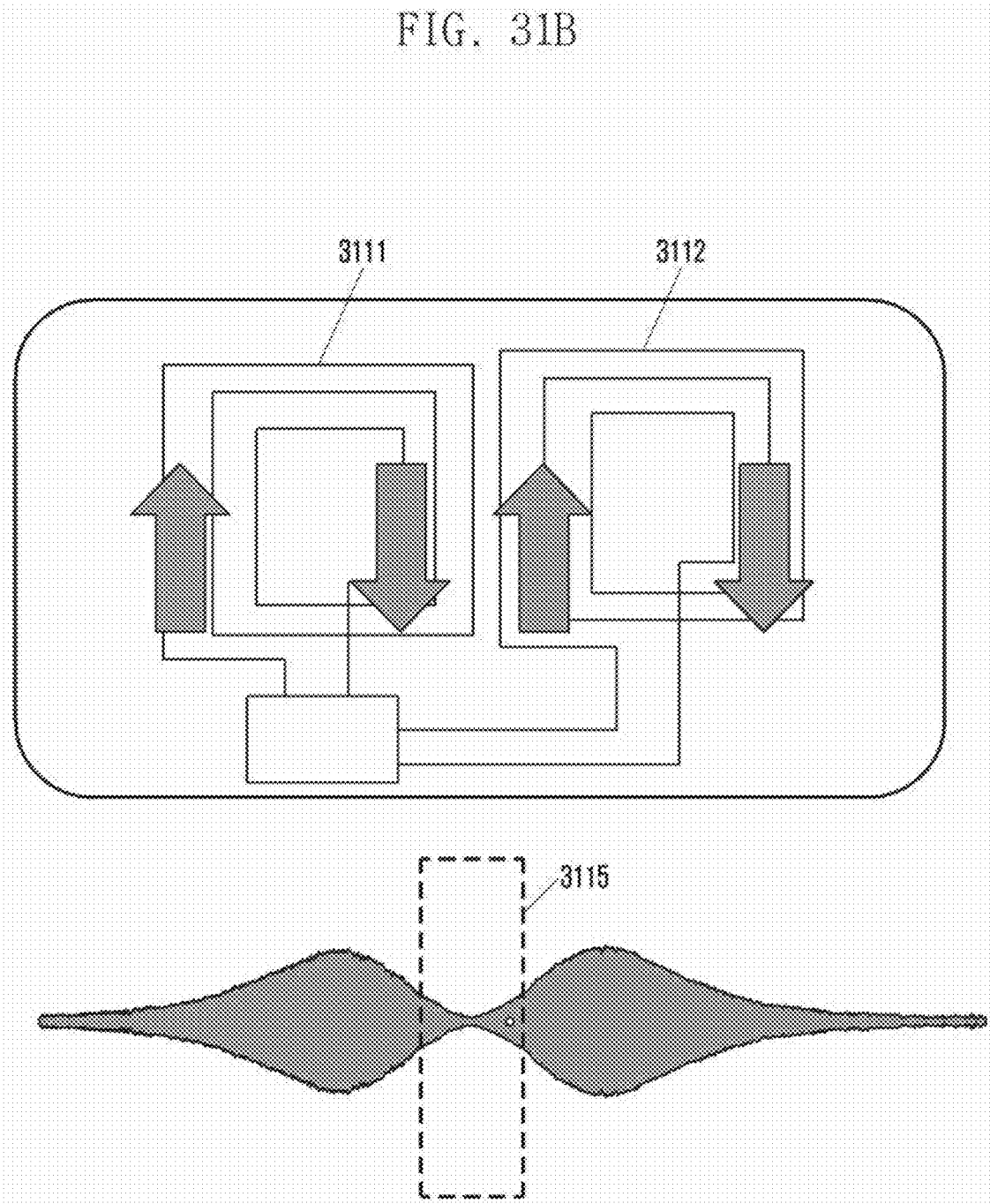
FIG. 31B is a diagram showing a null point and an intensity of magnetic field created in a number of coil antennas according to various embodiments of the present disclosure.

FIG. 31A is a diagram showing a number of coil antennas in an electronic device according to various embodiments of the present disclosure, and FIG. 31B is a diagram showing a null point and an intensity of magnetic field created in a number of coil antennas according to various embodiments of the present disclosure.

Referring to FIGS. 31A and 31B, first and second coil antennas 3111 and 3112 are capable of simultaneously operating to emit MST signals. As shown in FIGS. 31A and 31B, the first and second coil antennas 3111 and 3112 may be installed to the left and right areas of an electronic device (e.g., a smartphone), respectively.

Referring to FIG. 31A, the first and second coil antennas 3111 and 3112 may receive current simultaneously, while the directions of current flow are opposite to each other. For example, the first coil antenna 3111 forms a path in the clockwise direction, while the second coil antenna 3112 forms a path in the counterclockwise direction. In this case, the directions of current are same at the center portion, which results in the largest intensity of magnetic fields. This condition also causes null points around the center portion, e.g., two null points 3113 and 3114 at both sides of the center portion.

Referring to FIG. 31B, the directions of current flow in the first and second coil antennas 3111 and 3112 may be same. In this case, the directions of current are opposite to each other at the center portion, which results in the smallest intensity of magnetic fields. This condition also causes a null point 3115 at the area between the two antennas, i.e., the center portion.

As described above, as the electronic device with a number of coil antennas simultaneously operates its coil antennas, while varying the directions of current flow therein (e.g., the directions of current are same or opposite), it can also vary the null points periodically. For example, the electronic device simultaneously operates a number of coil antenna, varying the directions of current flow therein, so that the null points are created alternately, thereby increasing the success rate of payment.

The electronic device is capable of operating a number of coil antennas sequentially as described above refer to FIGS. 30A and 30B. Alternatively, the electronic device is capable of operating a number of coil antennas simultaneously, varying the directions of current, as described above refer to FIGS. 31A and 31B. Alternatively, the electronic device is capable of operating a number of coil antennas using both the operating methods described above. Therefore, the electronic device is capable of varying the null point using the operating methods, thereby increasing the success rate of payment.

FIGS. 32A, 32B, 32C, and 32D show diagrams that describe a method of using a number of coil antennas according to various embodiments of the present disclosure.

Figure 32B:
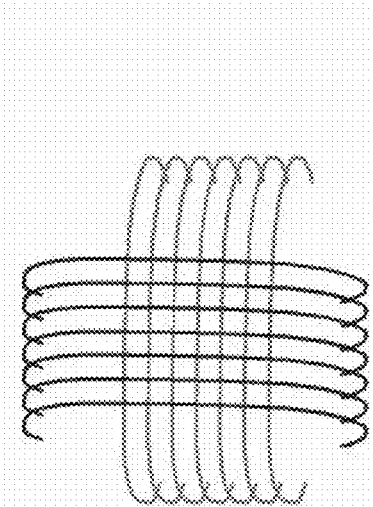
FIGS. 32A to 32D illustrate diagrams that describe a method of using a number of coil antennas according to various embodiments of the present disclosure.
Figure 32D:
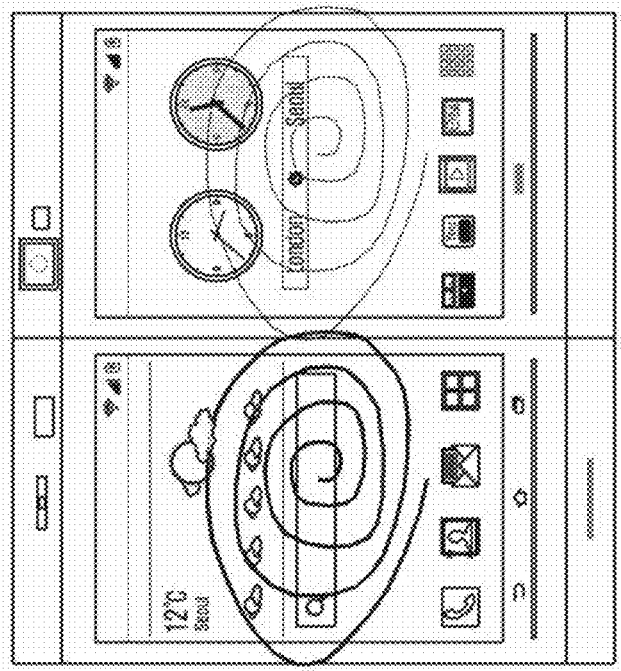
Figure 32A:
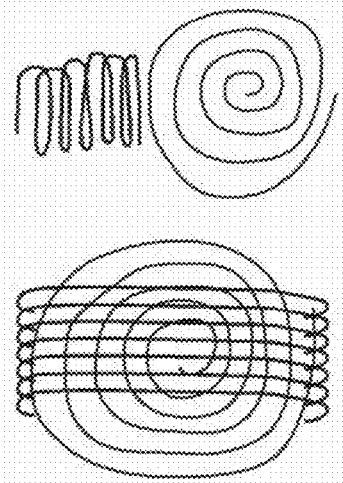
Figure 32C:
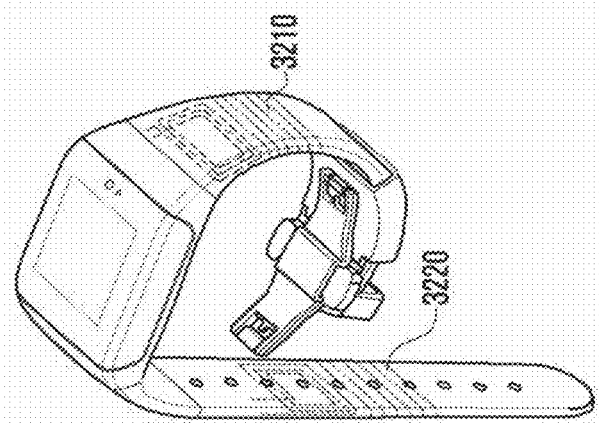

Referring to FIGS. 32A to 32D, a number of coil antennas for electronic devices according to the present disclosure may be implemented in various forms, such as a flat coil antenna and a solenoid antenna, shown in FIG. 32A, and a form of antennas shown in FIG. 32B which is similar to that of FIG. 22B. When a number of coil antennas are employed by a wearable device (e.g., a smart watch), they may be implemented, as shown in FIG. 32C, in such a way that first and second coil antennas 3210 and 3220 are installed to first and second watch straps respectively. Alternatively, a number of coil antennas may be installed to the wearable device (e.g., a smart watch) in such a way that at least one of them is installed to at least one watch strap. As shown in FIG. 32D, when an electronic device is configured to include two or more displays, e.g., LCDs, they may include separate coil antennas under the LCD backs, respectively.

In an embodiment of the present disclosure, the electronic device with a number of coil antennas may operate all of them simultaneously or parts of them according to times. The coil antennas may be enabled selectively according to an angle, a motion, and the like, of the electronic device (e.g., tagging information), with respect to an external device. The electronic device may show a well-recognized area via the output device.

FIGS. 33A, 33B, and 33C are diagrams showing formats of data recorded in tracks of magnetic cards according to various embodiments of the present disclosure.

Referring to FIGS. 33A to 33C, magnetic cards store data according to Track 1, Track 2 and Track 3. A card reading apparatus may include a header and a coil configured to read data from magnetic stripe tracks of a magnetic card. The track of a magnetic card (i.e., a magnetic black line) is swiped over the header of the rail of a card reading apparatus (a card reader), the lines of magnetic force passing through the coil connected to the header change. The change in the lines of magnetic force induces current in the card reading apparatus. The card reading apparatus is capable of reading and processing data recorded in the card track from the induced current.

The electronic device may include a module for storing data recoded in tracks of a magnetic card and performing magnetic communication, e.g., an MST module. The MST module is capable of transmitting magnetic field signals carrying the recorded data of tracks to a card reading apparatus via the antenna. After receiving the magnetic field signals, the card reading apparatus induces the same current as the magnetic card is swiped over the header of the card reading apparatus. For example, as the user places the electronic device near the card reading apparatus or touches the card reading apparatus with the electronic device, thereby making payment for charges.

Figure 34A:
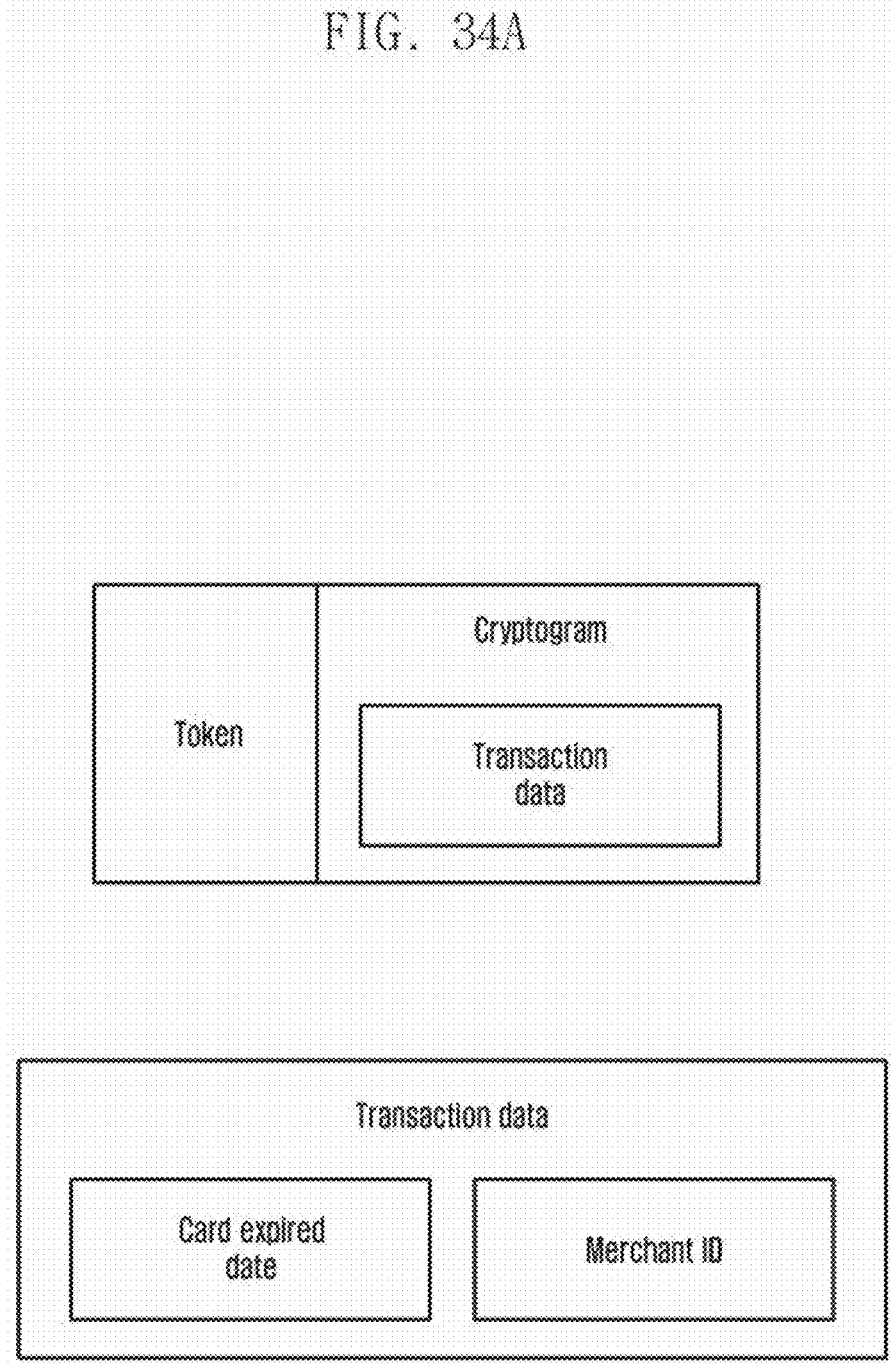

FIGS. 34A and 34B are diagrams that describe data transmission methods according to various embodiments of the present disclosure.

Referring to FIGS. 34A and 34B, the data carried by an MST signal from the MST module may be transmitted via tokens as shown in FIG. 34A. In order to make a payment using tokens, at least part of the data of Track 1, 2, or 3, instead of Track 1, Track 2, or Track 3, is substituted with a token or cryptogram. As shown in FIG. 34B, PANs of Track 1, Track 2 and Track 3 are substituted with Tokens. ADDITIONAL DATA and DISCRETIONARY DATA of Track 1 and Track 2 and USE AND SECURITY DATA and ADDITIONAL DATA of Track 3 are substituted with cryptograms. The substituted values are converted to bits and then the converted bits are carried by MST signals to a card reading apparatus. When using the data format of tracks, the card reading apparatus may transmit the token information to a corresponding card issuing company, without processing the track data. The token may contain an identifier (ID) for identifying a card. Alternatively, the token may contain information for identifying a card issuing company. Transaction data may contain expiration date of a card, merchant ID, information created by combining parts of transaction-related information with each other, and the like.

In various embodiments of the present disclosure, the electronic device e.g., electronic device 11 shown in FIG. 1A) includes a first cover configuring the front side of the electronic device, a second cover configuring the back side of the electronic device, a memory contained in a hollow area formed between the first and second covers, a display at least part of which is contained in the hollow area and which is disclosed through the first cover, a processor that is contained in the hollow area and is electrically connected to the memory, and at least one loop antenna which is contained in the hollow area and electrically connected to the processor. The memory stores instructions that enable the processor to store data corresponding to Track 1, Track 2, and Track 3 of a magnetic card in the memory, and emit a magnetic field signal containing data corresponding to at least two of the Track 1, Track 2 and Track 3, for one cycle, via the at least one loop antenna.

In various embodiments of the present disclosure, the instructions enable the processor to emit a magnetic field signal containing reversal data, created as the binary numbers of the data corresponding to the Track 1 or Track 2 are arranged in reverse order, for one cycle.

In various embodiments of the present disclosure, the instructions enable the processor to emit a first magnetic field signal containing data corresponding to one of the Track 1, Track 2 and Track 3, periodically, a number of times, and then a second magnetic field signal containing reversal data, created as the binary numbers of the data for the first magnetic field signal and another data corresponding to one of the other tracks are arranged in reverse order, periodically a number of times.

In various embodiments of the present disclosure, the instructions enable the processor to emit the second magnetic field signal at the same cycle as the first magnetic field signal.

In various embodiments of the present disclosure, after emitting the second magnetic field signal, periodically, a number of times, the instructions enable the processor to emit a third magnetic field signal containing the data, periodically, a number of times, and a fourth magnetic field signal containing the reversal data and the data, periodically, a number of times.

In various embodiments of the present disclosure, the instructions enable the processor to emit the third magnetic field signal at a longer cycle than the processor emits the first magnetic field signal.

In various embodiments of the present disclosure, the instructions enable the processor to emit the fourth magnetic field signal at a longer cycle than the processor emits the second magnetic field signal.

In various embodiments of the present disclosure, the instructions enable the processor to emit the fourth magnetic field signal at the same cycle as the third magnetic field signal.

In various embodiments of the present disclosure, the instructions enable the processor to emit a magnetic field signal containing data, created as part of data corresponding to tracks is substituted by a token, for one cycle.

In various embodiments of the present disclosure, the instructions enable the processor to determine to emit the magnetic field signal, according to at least part of inputs received by the display and/or at least one sensor.

In various embodiments of the present disclosure, the sensor includes a fingerprint sensor.

In various embodiments of the present disclosure, the instructions enable the processor to emit the same magnetic field signal via a number of loop antennas.

In various embodiments of the present disclosure, the instructions enable the processor to sequentially select a number of loop antennas and emit the same magnetic field signal in selected order of loop antennas.

In various embodiments of the present disclosure, the instructions enable the processor to emit magnetic field signals of other tracks via a number of loop antennas.

In various embodiments of the present disclosure, the instructions enable the processor to stop the emission of the magnetic field signal in response to a user input and/or a signal created by at least one sensor.

In various embodiments of the present disclosure, the electronic device (e.g., the electronic device 11 shown in FIG. 1A) includes a housing including a first side and a second side facing the direction opposite to the first side, a UI (e.g., display module 160) disclosed through the first side, a memory in the housing, a processor that is contained in the housing and is electrically connected to the memory and the UI, and at least one conductive pattern (e.g., loop antenna) which is contained in the housing or formed as part of the housing and is electrically connected to the processor. The memory temporarily stores first payment information in a first format and second payment information in a second format. For example, the memory may temporarily store information regarding at least two of the following: Track 1, Track 2, Track 3, and a token. The memory stores instructions which enable the processor to create a number of signal sequences using the first payment information and/or second payment information, and magnetically emit the signal sequences to the outside, via the conductive pattern. At least one of the signal sequences includes pulses representing the entirety of the first payment information and/or the second payment information.

In various embodiments of the present disclosure, the instructions enable the processor to emit the signal sequences to the outside in response to a user's single input (e.g., a user's fingerprint 1370) received by the UI.

In various embodiments of the present disclosure, at least one signal sequence includes pulses sequentially representing the entirety of the first payment information and the second payment information.

In various embodiments of the present disclosure, the signal sequences include a first signal containing pulses of a first pulse cycle, and a second signal containing pulses of a second pulse cycle that differs from the first pulse cycle.

In various embodiments of the present disclosure, the signal sequences include a first signal, a second signal created after a first time interval from the first signal, and a third signal created after a second time interval, which differs from the first time interval, from the second signal.

In various embodiments of the present disclosure, at least one of the signal sequences includes pulses representing information in the reverse order to the entirety of the first payment information and the second payment information.

In various embodiments of the present disclosure, the memory temporarily stores third payment information in a third format. The memory stores instructions which enable the processor to create a number of signal sequences using at least one of the first payment information, the second payment information and the third payment information, and magnetically emit the signal sequences to the outside, via the conductive pattern. At least one of the signal sequences includes pulses representing the entirety of at least one of the first payment information, the second payment information and the third payment information.

FIG. 35 is a flowchart that describes a payment method according to various embodiments of the present disclosure.

Referring to FIG. 35, an electronic device (e.g., the electronic device 11 shown in FIG. 1A) displays a card selection screen in operation 3510. For example, the electronic device executes a payment application in response to user inputs and displays an image corresponding to a card to be used for payment.

The electronic device performs user authentication in operation 3520. For example, the electronic device authenticates a user in such a way as to, obtain a user's fingerprint via a biometric sensor 107, determines whether the obtained fingerprint matches a stored fingerprint, and authenticates the user when the obtained fingerprint matches a stored fingerprint. It should be understood that the user authentication of the electronic device may also be implemented with other methods, such as iris recognition by a camera, electrocardiogram (ECG) pattern recognition by an ECG sensor, as well as fingerprint recognition, or a combination thereof.

When user authentication has been completed in operation 3520, the electronic device emits an MST signal corresponding to the selected card image in operation 3530. When the electronic device satisfies a preset condition to stop the creation of signals, it stops the emission of the MST signal. Examples of the case that an electronic device satisfies a condition to stop the creation of signals are cases that the electronic device has received a payment complete message from a payment server, the electronic device recognizes that a preset period of time has elapsed since an MST signal started to be created, the electronic device recognizes that UE (or the electronic device) is moving, the electronic device detects a sound indicating that payment has been completed via the microphone, the electronic device receives a user input for terminating a payment procedure, and the like.

In an embodiment of the present disclosure, when user authentication has been completed, an electronic device (e.g., the electronic device 11 shown in FIG. 1A) is capable of creating sequences in various combination. For example, the electronic device may create sequences 16 times in total for 20 seconds by combining a simple transmission sequence with a complex transmission sequence. The electronic device programs the most efficient sequence combination, cycle, pulse timing, and the like, via a field test, according to countries or regions, and emits MST signals based on the programmed results. The electronic device identifies a country or a region using a country code, GPS information, and the like, and performs a payment process, using MST, based on the programmed information corresponding to the identified country or region.

In an embodiment of the present disclosure, when user authentication has been completed, an electronic device (e.g., the electronic device 11 shown in FIG. 1A) is capable of emitting a simple transmission sequence (e.g., an MST signal containing Track 2 information a number times). When user authentication has been completed again after a period of time has elapsed, the electronic device may re-emit an MST signal in another method that differs from the previous method. For example, the electronic device may vary cycle, pulse timing, and the like. The electronic device may also vary information included in the MST signal to information according to a complex transmission sequence.

In an embodiment of the present disclosure, when payment by a simple transmission sequence has failed, the user will take the electronic device off a reader and then tags it thereto again. In this case, the electronic device may recognize the reader via the sensor (e.g., acceleration sensor 103, gyro sensor 105, proximity sensor, HRM sensor, and the like). According to the tagging operation, the electronic device may alter an MST signal in at least one of the following an emission cycle, pulse timing and sequence, and then emits the altered MST signal.

In an embodiment of the present disclosure, when user authentication has been completed, an electronic device (e.g., the electronic device 11 shown in FIG. 1A) alters at least one of the following an emission cycle, pulse timing and sequence, each time the user taps the electronic device against a reader, and then emits an MST signal.

In an embodiment of the present disclosure, an electronic device (e.g., the electronic device 11 shown in FIG. 1A) determines the remaining battery capacity or the temperature of the battery. When the electronic device ascertains that the battery power is being consumed rapidly or the battery is being heated up by internal process, it may emit a simple transmission sequence.

In an embodiment of the present disclosure, an electronic device (e.g., the electronic device 11 shown in FIG. 1A) alters at least one of the following: an emission cycle, pulse timing and sequence, according to cellular communication, and emits an MST signal. For example, when the electronic device is implemented to service GSM, it may adjust an emission cycle of an MST signal so that the MST signals cannot be affected by the TDMA cycle.

In an embodiment of the present disclosure, an electronic device (e.g., the electronic device 11 shown in FIG. 1A) receives characteristics of a POS terminal, related to, e.g., tracks, emission cycle, and the like, from a beacon terminal installed in a store, and adjusts at least one of the following: an emission cycle, pulse timing and sequence, based on the receives values.

In various embodiments of the present disclosure, a method of operating an electronic device (e.g., the electronic device 11 shown in FIG. 1A) includes displaying objects related to a card to make a payment, performing user authentication in response to a payment request of a user, and after completing the user authentication, controlling a magnetic field communication module to emit a magnetic field signal containing data corresponding to two or more of Track 1, Track 2 and Track 3 of the card, for one cycle.

In various embodiments of the present disclosure, the method further includes controlling a magnetic field communication module to emit a magnetic field signal containing reversal data, created as the binary numbers of the data corresponding to the Track 1 or Track 2 are arranged in reverse order, for one cycle.

In various embodiments of the present disclosure, the method further includes controlling a magnetic field communication module to emit a first magnetic field signal containing data corresponding to one of the Track 1, Track 2 and Track 3, periodically, a number of times, and then a second magnetic field signal containing reversal data, created as the binary numbers of the data for the first magnetic field signal and another data corresponding to one of the other tracks are arranged in reverse order, periodically a number of times.

Figure 36:
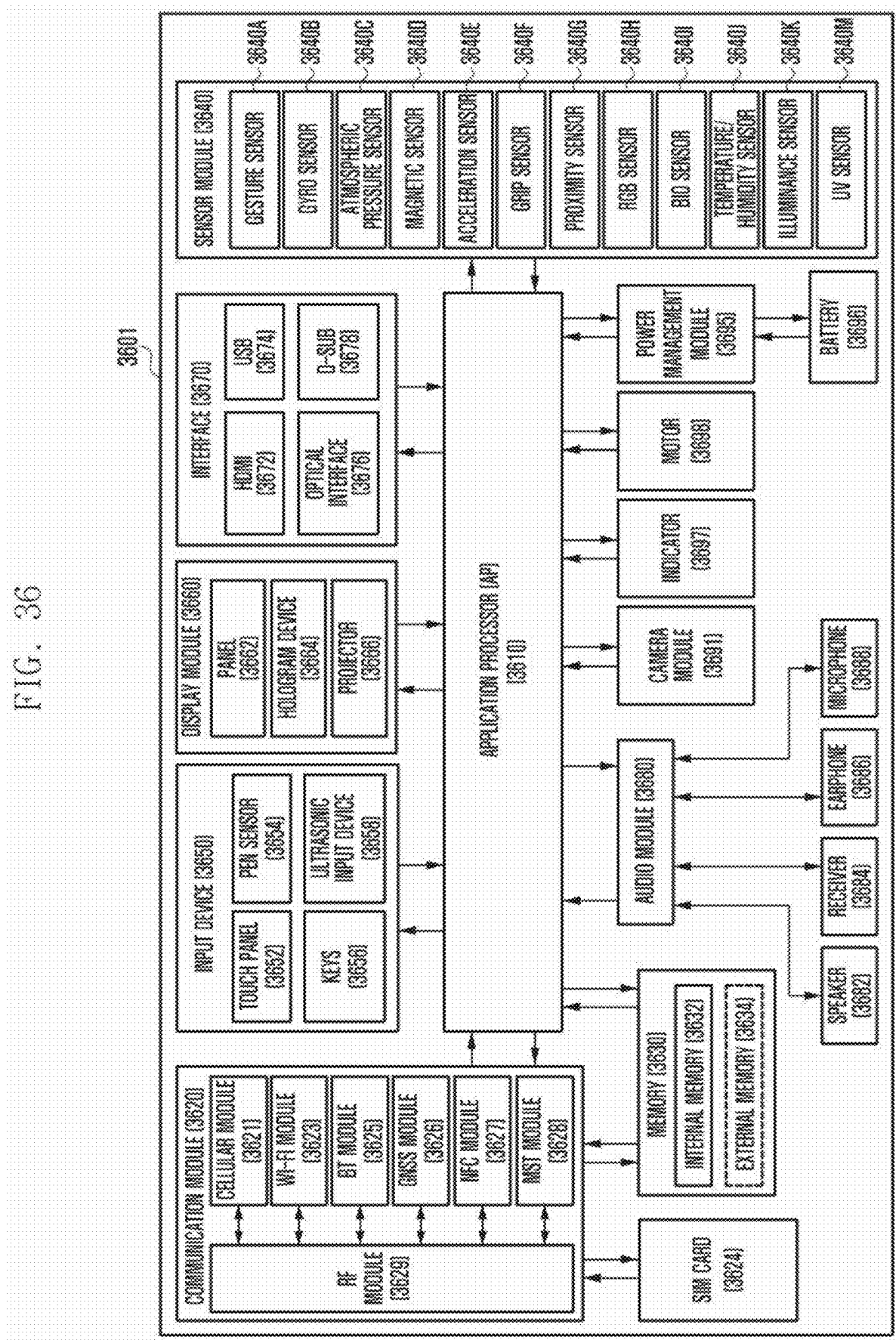
FIG. 36 is a block diagram showing an electronic device according to various embodiments of the present disclosure.

FIG. 36 is a block diagram showing a configuration of an electronic device according to various embodiments of the present disclosure.

Referring to FIG. 36, an electronic device 3601 is capable of including part or all of the components in the electronic device 10 shown in FIGS. 1A and 1B. The electronic device 3601 is capable of including one or more processors 3610 (e.g., APs), a communication module 3620, a subscriber identification module (SIM) 3624, a memory 3630, a sensor module 3640, an input device 3650, a display 3660, an interface 3670, an audio module 3680, a camera module 3691, a power management module 3695, a battery 3696, an indicator 3697, and a motor 3698.

The processor 3610 is capable of driving, for example, an OS or an application program to control a plurality of hardware or software components connected to the processor 3610, processing various data, and performing operations. The processor 3610 may be implemented as, for example, a system on chip (SoC). According to an embodiment of the present disclosure, the processor 3610 may further include a graphics processing unit (GPU) and/or an image signal processor (ISP). The processor 3610 may also include at least part of the components shown in FIG. 36, e.g., a cellular module 3621. The processor 3610 is capable of loading commands or data received from at least one of other components (e.g., a non-volatile memory) on a volatile memory, processing the loaded commands or data. The processor 3610 is capable of storing various data in a non-volatile memory.

The communication module 3620 may include the same or similar configurations as the communication interface 17 shown in FIGS. 1A and 1B. For example, the communication module 3620 is capable of including the cellular module 3621, Wi-Fi module 3623, BT module 3625, GNSS module 3626 (e.g., a GPS module, GLONASS module, BeiDou module or Galileo module), NFC module 3627, MST module 3628, and RF module 3629.

The cellular module 3621 is capable of providing a voice call, a video call, an SMS service, an internet service, and the like, through a communication network, for example. According to an embodiment of the present disclosure, the cellular module 3621 is capable of identifying and authenticating an electronic device 3601 in a communication network by using a SIM 3624 (e.g., a SIM card). According to an embodiment of the present disclosure, the cellular module 3621 is capable of performing at least part of the functions provided by the processor 3610. According to an embodiment of the present disclosure, the cellular module 3621 is also capable of including a communication processor (CP).

Each of the Wi-Fi module 3623, the BT module 3625, the GNSS module 3626, and the NFC module 3627 is capable of including a processor for processing data transmitted or received through the corresponding module. The MST module 3628 is capable of including a processor for processing data transmitted or received through the corresponding module. According to embodiments of the present disclosure, at least part of the cellular module 3621, the Wi-Fi module 3623, the BT module 3625, the GNSS module 3626, the NFC module 3627, and the MST module 3628 (e.g., two or more modules) may be included in one integrated chip (IC) or one IC package.

The RF module 3629 is capable of transmission/reception of communication signals, e.g., RF signals. The RF module 3629 is capable of including a transceiver, a power amp module (PAM), a frequency filter, a low noise amplifier (LNA), an antenna, and the like. According to an embodiment of the present disclosure, at least one of the following modules: the cellular module 3621, the Wi-Fi module 3623, the BT module 3625, the GNSS module 3626, the NFC module 3627, and the MST module 3628 is capable of transmission/reception of RF signals through a separate RF module.

The SIM module 3624 is capable of including a card including a SIM and/or an embodied SIM. The SIM module 3624 is also capable of containing unique identification information, e.g., IC card ID (ICCID), or subscriber information, e.g., international mobile subscriber identity (IMSI).

The memory 3630 (e.g., the memory 103 shown in FIGS. 1A and 1B) is capable of including a built-in memory 3632 or an external memory 3634. The built-in memory 3632 is capable of including at least one of the following: a volatile memory, e.g., a dynamic random access memory (DRAM), a static RAM (SRAM), a synchronous DRAM (SDRAM), and the like, and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., an NAND flash memory, an NOR flash memory, and the like), a hard drive, a solid state drive (SSD), and the like.

The external memory 3634 is also capable of including a flash drive, e.g., a compact flash (CF), a secure digital (SD), a micro-SD, a mini-SD, an extreme digital (xD), a multimedia card (MMC), a memory stick, and the like. The external memory 3634 is capable of being connected to the electronic device 3601, functionally and/or physically, through various interfaces.

The memory 3630 is capable of storing payment information and a payment application serving as one of the application programs 104D. The payment information may refer to credit card numbers and personal identification numbers (PINs), corresponding to a credit card. The payment information may also include user authentication information, e.g., fingerprints, facial features, voice information, and the like.

When the payment application is executed by the processor 3610, it may enable the processor 3610 to perform an interaction with the user to make payment (e.g., displaying a screen to select a card (or a card image) and obtaining information (e.g., a card number) corresponding to a selected card (e.g., a pre-specified card) from payment information), and an operation to control magnetic field communication (e.g., transmitting the card information to an external device (e.g., a card reading apparatus) through the NFC module 3627 or MST module 3628).

The sensor module 3640 is capable of measuring/detecting a physical quantity or an operation state of the electronic device 3601, and converting the measured or detected information into an electronic signal. The sensor module 3640 is capable of including at least one of the following: a gesture sensor 3640A, a gyro sensor 3640B, an atmospheric pressure sensor 3640C, a magnetic sensor 3640D, an acceleration sensor 3640E, a grip sensor 3640F, a proximity sensor 3640G, a color sensor 3640H (e.g., a red, green and blue (RGB) sensor), a biometric sensor 3640I, a temperature/humidity sensor 3640J, an illuminance sensor 3640K, and an ultraviolet (UV) sensor 3640M. Additionally or alternatively, the sensor module 3640 is capable of further including an E-nose sensor, an electromyography (EMG) sensor, an electroencephalogram (EEG) sensor, an ECG sensor, an infrared (IR) sensor, an iris sensor and/or a fingerprint sensor. The sensor module 3640 is capable of further including a control circuit for controlling one or more sensors included therein. In some embodiments of the present disclosure, the electronic device 3601 is capable of including a processor, configured as part of the processor 3610 or a separate component, for controlling the sensor module 3640.

In this case, while the processor 3610 is operating in sleep mode, the processor is capable of controlling the sensor module 3640.

The input device 3650 is capable of including a touch panel 3652, a (digital) pen sensor 3654, a key 3656, or an ultrasonic input unit 3658. The touch panel 3652 may be implemented with at least one of the following: a capacitive touch system, a resistive touch system, an IR touch system, and an ultrasonic touch system. The touch panel 3652 may further include a control circuit. The touch panel 3652 may also further include a tactile layer to provide a tactile response to the user.

The (digital) pen sensor 3654 may be implemented with a part of the touch panel or with a separate recognition sheet. The key 3656 may include a physical button, an optical key, or a keypad. The ultrasonic input unit 3658 is capable of detecting ultrasonic waves, created in an input tool, through a microphone 3688, and identifying data corresponding to the detected ultrasonic waves.

The display 3660 (e.g., the display 106 shown in FIGS. 1A and 1B) is capable of including a panel 3662, a hologram unit 3664, or a projector 3666. The panel 3662 may include the same or similar configurations as the display 16 shown in FIGS. 1A and 1B. The panel 3662 may be implemented to be flexible, transparent, or wearable. The panel 3662 may also be incorporated into one module together with the touch panel 3652. The hologram unit 3664 is capable of showing a stereoscopic image in the air by using light interference. The projector 3666 is capable of displaying an image by projecting light onto a screen. The screen may be located inside or outside of the electronic device 3601. According to an embodiment of the present disclosure, the display 3660 may further include a control circuit for controlling the panel 3662, the hologram unit 3664, or the projector 3666.

The interface 3670 is capable of including an HDMI 3672, a USB 3674, an optical interface 3676, or a D-sub-miniature (D-sub) 3678. The interface 3670 may be included in the communication interface 17 shown in FIGS. 1A and 1B. Additionally or alternatively, the interface 3670 is capable of including a mobile high-definition link (MHL) interface, an SD card/MMC interface, or an infrared data association (IrDA) standard interface.

The audio module 3680 is capable of providing bidirectional conversion between a sound and an electronic signal. At least part of the components in the audio module 3680 may be included in the input/output interface 15 shown in FIGS. 1A and 1B. The audio module 3680 is capable of processing sound information input or output through a speaker 3682, a receiver 3684, earphones 3686, microphone 3688, and the like.

The camera module 3691 refers to a device capable of taking both still and moving images. According to an embodiment of the present disclosure, the camera module 3691 is capable of including one or more image sensors (e.g., a front image sensor or a rear image sensor), a lens, an ISP, a flash (e.g., an LED or xenon lamp), and the like.

The power management module 3695 is capable of managing power of the electronic device 3601. According to an embodiment of the present disclosure, the power management module 3695 is capable of including a power management IC (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, and the like. The battery gauge is capable of measuring the residual capacity, charge in voltage, current, or temperature of the battery 3696. The battery 3696 takes the form of either a rechargeable battery or a solar battery.

The indicator 3697 is capable of displaying a specific status of the electronic device 3601 or a part thereof (e.g., the processor 3610), e.g., a boot-up status, a message status, a charging status, and the like. The motor 3698 is capable of converting an electrical signal into mechanical vibrations, such as, a vibration effect, a haptic effect, and the like. Although not shown, the electronic device 3601 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, and the like.

Each of the elements described in the present disclosure may be formed with one or more components, and the names of the corresponding elements may vary according to the type of the electronic device. In various embodiments of the present disclosure, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 37:
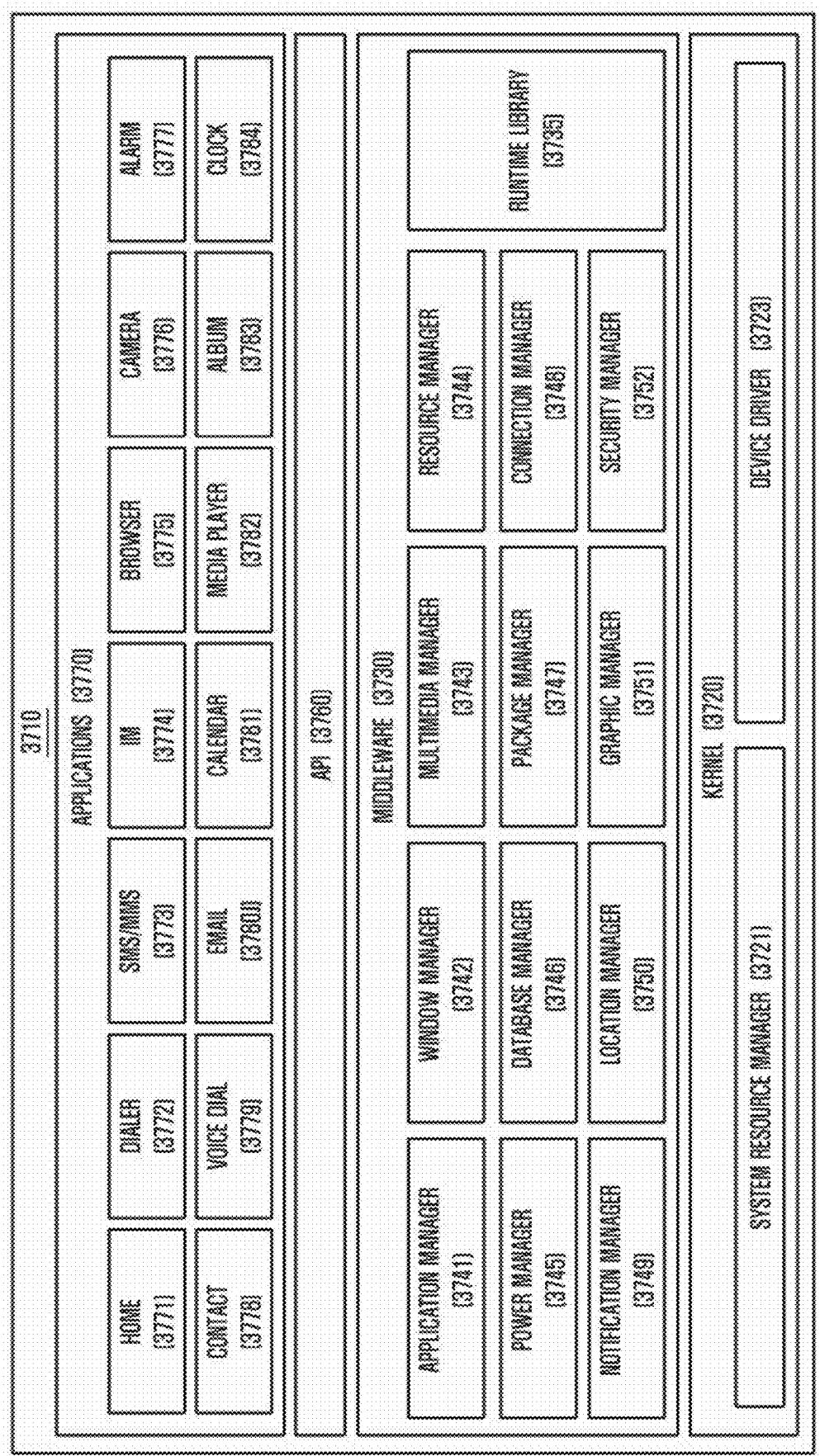
FIG. 37 is a block diagram showing a program module according to various embodiments of the present disclosure.

FIG. 37 is a block diagram of a programming module according to various embodiments of the present disclosure.

Referring to FIG. 37, according to an embodiment of the present disclosure, a program module 3710 (e.g., program module 14 shown in FIGS. 1A and 1B) is capable of including an OS for controlling resources related to the electronic device (e.g., the electronic device 11 shown in FIG. 1A) and/or various applications (e.g., application programs 14D shown in FIGS. 1A and 1B) running on the OS. The OS may be Android, iOS, Windows, Symbian, Tizen, Bada, and the like.

The program module 3710 is capable of including a kernel 3720, middleware 3730, API 3760 and/or applications 3770. At least part of the program module 3710 may be preloaded on the electronic device or downloaded from a server (e.g., an electronic device 19A or 19B, server 106, and the like).

The kernel 3720 (for example, the kernel 14A) may include a system resource manager 3721 and/or a device driver 3723. The system resource manager 3721 may include, for example, a process manager, a memory manager, and a file system manager. The system resource manager 3721 may perform a system resource control, allocation, and recall. The device driver 3723 may include, for example, a display driver, a camera driver, a BT driver, a shared memory driver, a USB driver, a keypad driver, a Wi-Fi driver, and an audio driver. Further, according to an embodiment of the present disclosure, the device driver 312 may include an inter-process communication (IPC) driver.

The middleware 3730 may provide a function required in common by the applications 3770. Further, the middleware 3730 may provide a function through the API 3760 to allow the applications 3770 to efficiently use limited system resources within the electronic device. According to an embodiment of the present disclosure, the middleware 3730 (for example, the middleware 104B) may include at least one of a runtime library 3735, an application manager 3741, a window manager 3742, a multimedia manager 3743, a resource manager 3744, a power manager 3745, a database manager 3746, a package manager 3747, a connection manager 3748, a notification manager 3749, a location manager 3750, a graphic manager 3751, and a security manager 3752.

The runtime library 3735 may include, for example, a library module used by a complier to add a new function through a programming language while the applications 3770 are executed. According to an embodiment of the present disclosure, the runtime library 3735 executes input and output, management of a memory, a function associated with an arithmetic function and the like.

The application manager 3741 may manage, for example, a life cycle of at least one of the applications 3770. The window manager 3742 may manage GUI resources used on the screen. The multimedia manager 3743 may detect a format required for reproducing various media files and perform an encoding or a decoding of a media file by using a codec suitable for the corresponding format. The resource manager 3744 manages resources, such as a source code, a memory, a storage space, and the like, of at least one of the applications 3770.

The power manager 3745 may operate together with a basic input/output system (BIOS) to manage a battery or power and provides power information required for the operation. The database manager 3746 may manage generation, search, and change of a database to be used by at least one of the applications 3770. The package manager 3747 may manage an installation or an update of an application distributed in a form of a package file.

The connection manager 3748 may manage, for example, a wireless connection, such as Wi-Fi or BT. The notification manager 3749 may display or notify a user of an event, such as an arrival message, an appointment, a proximity alarm or the like, in a manner that does not disturb the user. The location manager 3750 may manage location information of the electronic device. The graphic manager 3751 may manage a graphic effect provided to the user or a UI related to the graphic effect. The security manager 3752 provides a general security function required for a system security or a user authentication. According to an embodiment of the present disclosure, when the electronic device (for example, the electronic device 11) has a call function, the middleware 3730 may further include a telephony manager for managing a voice of the electronic device or a video call function.

The middleware 3730 is capable of including modules configuring various combinations of functions of the above described components. The middleware 3730 is capable of providing modules specialized according to types of OSs to provide distinct functions. The middleware 3730 may be adaptively configured in such a way as to remove part of the existing components or to include new components.

The API 3760 (for example, API 133) may be a set of API programming functions, and may be provided with a different configuration according to an OS. For example, in Android or iOS, a single API set may be provided for each platform. In Tizen, two or more API sets may be provided.

The applications 3770 (e.g., the application programs 14D) may include one or more applications for performing various functions, e.g., home 3771, dialer 3772, SMS/MMS 3773, instant message (IM) 3774, browser 3775, camera 3776, alarm 3777, context 3778, voice dial 3779, email 3780, calendar 3781, media player 3782, album 3783, clock 3784, health care (e.g., an application for measuring amount of exercise, blood sugar level, and the like), and environment information (e.g., an application for providing atmospheric pressure, humidity, temperature, and the like).

According to an embodiment of the present disclosure, the applications 3770 are capable of including an application for supporting information exchange between an electronic device (e.g., the electronic device 11 shown in FIG. 1A) and an external device (e.g., electronic devices 19A and 19B), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, and the like) to external devices (e.g., electronic devices 19A and 19B). In addition, the notification relay application is capable of receiving notification information from external devices to provide the received information to the user.

The device management application is capable of managing (e.g., installing, removing or updating) at least one function of an external device (e.g., electronic devices 19A and 19B) communicating with the electronic device. Examples of the function are a function of turning-on/off the external device or part of the external device, a function of controlling the brightness (or resolution) of the display, applications running on the external device, services provided by the external device, and the like. Examples of the services are a call service, messaging service, and the like.

According to an embodiment of the present disclosure, the applications 3770 are capable of including an application (e.g., a health care application of a mobile medical device, and the like) specified attributes of an external device (e.g., electronic devices 19A and 19B). According to an embodiment of the present disclosure, the applications 3770 are capable of including applications received from an external device (e.g., a server 19C, electronic devices 19A and 19B). According to an embodiment of the present disclosure, the applications 3770 are capable of including a preloaded application or third party applications that can be downloaded from a server. It should be understood that the components of the program module 3710 may be called different names according to types of OSs.

According to various embodiments of the present disclosure, at least part of the program module 3710 can be implemented with software, firmware, hardware, or any combination of two or more of them. At least part of the program module 3710 can be implemented (e.g., executed) by a processor (e.g., the processor 3610). At least part of the programming module 3710 may include modules, programs, routines, sets of instructions or processes, and the like, in order to perform one or more functions.

Various embodiments of the present disclosure provide a handheld electronic device capable of transmitting, to a card reading apparatus, card information carried by magnetic field signals, and thus making payment for costs. Various embodiments also provide a handheld electronic device capable of making payment for costs, and the like, through communication with a card reading apparatus, although the apparatus is not equipped with an NFC module, without modifying the existing solution, as if a magnetic card is used against the apparatus. Therefore, the present disclosure is capable of leading to activating offline mobile payment.

The term 'module' as used in various embodiments of the present disclosure may mean a unit including one of hardware, software, and firmware or any combination of two or more of them. The 'module' may be interchangeable with the term 'unit,' 'logic,' 'logical block,' 'component,' or 'circuit.' The 'module' may be the smallest unit of an integrated component or a part thereof. The 'module' may be the smallest unit that performs one or more functions or a part thereof. The 'module' may be mechanically or electronically implemented. For example, the 'module' according to various embodiments of the present disclosure may include at least one of the following: application-specific IC (ASIC) chips, field-programmable gate arrays (FPGAs), and programmable-logic devices for performing certain operations, which are now known or will be developed in the future.

At least part of the method (e.g., operations) or system (e.g., modules or functions) according to various embodiments can be implemented with instructions as programming modules that are stored in computer-readable storage media. One or more processors (e.g., the processor 3610) can execute instructions, thereby performing the functions. An example of the computer-readable storage media may be a memory 3630. At least part of the programming modules can be implemented (executed) by a processor. At least part of the programming module may include modules, programs, routines, sets of instructions or processes, and the like, in order to perform one or more functions.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Modules or programming modules according to various embodiments may include one or more components, remove part of them described above, or include new components. The operations performed by modules, programming modules, or the other components, according to various embodiments of the present disclosure, may be executed in serial, parallel, repetitive or heuristic fashion. Part of the operations can be executed in any other order, skipped, or executed with additional operations.

Various embodiments of the present disclosure provide an electronic device capable of transmitting, to a card reading apparatus, payment information carried by magnetic field signals, and thus making payment for charges. Various embodiments also provide a handheld electronic device capable of making payment for charges, and the like, without errors, as if a magnetic card is used against the apparatus. Therefore, the present disclosure is capable of leading to activating offline mobile payment.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
  a memory;
  a display;
  a magnetic secure transmission (MST) circuitry configured to transmit an electromagnetic signal corresponding to first payment information;
  a near field communication (NFC) circuitry configured to transmit an electromagnetic signal corresponding to second payment information;
  an MST coil electrically connected with the MST circuitry, the MST coil including a first group of turns and a second group of turns, the second group of turns being not concentric with the first group of turns;
  an NFC coil electrically connected with the NFC circuitry; and
  a processor operatively connected to the memory, the display, the MST circuitry, and the NFC circuitry,
  wherein the memory stores instructions that enable the processor to:
    store data corresponding to Track 1, Track 2, and Track 3 of a magnetic card in the memory,
    control the MST circuitry to emit an electromagnetic signal containing data corresponding to at least one of the Track 1, Track 2, and Track 3, periodically, a number of times, via the MST coil,
    receive a signal from an external device through the NFC circuitry while emitting an electromagnetic signal using the MST circuitry, and
    based on receiving the signal from the external device, stop emitting an electromagnetic signal using the MST circuitry, and
  wherein, when viewed in a direction substantially perpendicular to a rear surface of the electronic device, the NFC coil is at least partially intersected with at least one of the first group of turns or the second group of turns.
2. The electronic device of claim 1, wherein, when viewed in the direction substantially perpendicular to the rear surface of the electronic device, at least another group of the first group of turns or the second group of turns is substantially surrounded by the NFC coil.

3. The electronic device of claim 1, wherein the first group of turns is distributed in a first area, and the second group of turns is distributed in a second area smaller than the first area.

4. The electronic device of claim 1, wherein when viewed in the direction substantially perpendicular to the rear surface of the electronic device, the MST coil is formed asymmetrically with respect to a center of the MST coil.

5. The electronic device of claim 1, wherein the instructions enable the processor to control the MST circuitry to emit an electromagnetic signal containing reversal data, created as binary numbers of the data corresponding to the Track 1 or Track 2 are arranged in a reverse order, periodically, a number of times.

6. The electronic device of claim 1, wherein the instructions enable the processor to control the MST circuitry to emit:
a first electromagnetic signal containing data corresponding to one of the Track 1, Track 2 and Track 3, periodically, a number of times, and
a second electromagnetic signal containing reversal data, created as binary numbers of the data for the first electromagnetic signal and another data corresponding to one of the other tracks are arranged in a reverse order, periodically a number of times.

7. The electronic device of claim 6, wherein the instructions enable the processor to control the MST circuitry to emit the second electromagnetic signal at the same cycle as the first electromagnetic signal.

8. The electronic device of claim 6, wherein the instructions enable the processor to control the MST circuitry to emit:
after emitting the second electromagnetic signal, periodically, a number of times, a third electromagnetic signal containing the data, periodically, a number of times, and
a fourth electromagnetic signal containing the reversal data and the data, periodically, a number of times.

9. The electronic device of claim 8,
wherein the instructions enable the processor to control the MST circuitry to emit the third electromagnetic signal at a longer cycle than the MST circuitry emits the first electromagnetic signal and control the MST circuitry to emit the fourth electromagnetic signal at a longer cycle than the MST circuitry emits the second electromagnetic signal, and
wherein the fourth electromagnetic signal and the third electromagnetic signal are emitted at the same cycle.

10. The electronic device of claim 1, wherein the instructions enable the processor to control the MST circuitry to emit an electromagnetic signal containing data, created as part of data corresponding to tracks substituted by a token, for one cycle.

11. The electronic device of claim 1,
wherein the instructions enable the processor to determine to emit the electromagnetic signal using the MST circuitry, according to at least part of inputs received by the display and at least one sensor, and
wherein the sensor comprises a fingerprint sensor.

12. The electronic device of claim 1, wherein the instructions enable the processor to stop emitting the electromagnetic signal using the MST circuitry in response to a user input and a signal created by at least one sensor.

13. An electronic device comprising:
a touchscreen display;
a memory;
a magnetic secure transmission (MST) circuitry configured to transmit an electromagnetic signal corresponding to at least one of first payment information and second payment information;
a near field communication (NFC) circuitry configured to transmit an electromagnetic signal corresponding to third payment information;
an MST coil electrically connected with the MST circuitry, the MST coil including a first group of turns and a second group of turns, the second group of turns being not concentric with the first group of turns;
an NFC coil electrically connected with the NFC circuitry; and
a processor operatively connected to the memory, the touchscreen display, the MST circuitry and the NFC circuitry,
wherein the memory temporarily stores the first payment information in a first format and the second payment information in a second format,
wherein the memory stores instructions which enable the processor to:
create a number of electromagnetic signal sequences using the first payment information and the second payment information,
control the MST circuitry to emit the electromagnetic signal sequences, periodically, a number of times, via the MST coil,
receive a signal from an external device through the NFC circuitry while emitting an electromagnetic signal using the MST circuitry, and
based on receiving the signal from the external device, stop emitting an electromagnetic signal using the MST circuitry,
wherein at least one of the electromagnetic signal sequences comprises pulses representing an entirety of the first payment information and the second payment information, and
wherein, when viewed in a direction substantially perpendicular to a rear surface of the electronic device, the NFC coil is at least partially intersected with at least one of the first group of turns or the second group of turns.

14. The electronic device of claim 13, wherein, when viewed in the direction substantially perpendicular to the rear surface of the electronic device, at least another group of the first group of turns or the second group of turns is substantially surrounded by the NFC coil.

15. The electronic device of claim 13, wherein the first group of turns is distributed in a first area, and the second group of turns is distributed in a second area smaller than the first area.

16. The electronic device of claim 14, wherein when viewed in the direction substantially perpendicular to the rear surface of the electronic device, the MST coil is formed asymmetrically with respect to a center of the MST coil.

17. The electronic device of claim 13, wherein the instructions enable the processor to control the MST circuitry to emit the electromagnetic signal sequences in response to a user's single input received by the touchscreen display.

18. The electronic device of claim 13, wherein at least one of the electromagnetic signal sequences comprises:
pulses sequentially representing the entirety of the first payment information and the second payment information.

19. The electronic device of claim 13, wherein the electromagnetic signal sequences comprise:
- a first signal containing pulses of a first pulse cycle; and
- a second signal containing pulses of a second pulse cycle that differs from the first pulse cycle.

20. The electronic device of claim 13, wherein the electromagnetic signal sequences comprise:
- a first signal;
- a second signal created after a first time interval from the first signal; and
- a third signal created after a second time interval, which differs from the first time interval, from the second signal.

21. The electronic device of claim 13, wherein at least one of the electromagnetic signal sequences comprises:
- pulses representing information in a reverse order to the entirety of the first payment information and the second payment information.

22. The electronic device of claim 13,
- wherein the memory temporarily stores fourth payment information in a format different from the first format and the second format,
- wherein the memory stores instructions which enable the processor to:
- create a number of other electromagnetic signal sequences using at least one of the first payment information, the second payment information and the fourth payment information, and
- control the MST circuitry to emit the other electromagnetic signal sequences via the MST coil, and
- wherein at least one of the other electromagnetic signal sequences comprises pulses representing the entirety of at least one of the first payment information, the second payment information and the fourth payment information.

* * * * *